US010051878B2

(12) United States Patent
Helling et al.

(10) Patent No.: US 10,051,878 B2
(45) Date of Patent: Aug. 21, 2018

(54) AQUEOUS PROCESSING OF OILSEED PRESS CAKE

(75) Inventors: Richard K. Helling, Midland, MI (US); Thomas G. Patterson, Westfield, IN (US); Stewart J. Campbell, Cochrane (CA)

(73) Assignee: Dow AgroSciences LLC, Indianapolis, IN (US)

( * ) Notice: Subject to any disclaimer, the term of this patent is extended or adjusted under 35 U.S.C. 154(b) by 1688 days.

(21) Appl. No.: 12/377,823

(22) PCT Filed: Aug. 22, 2007

(86) PCT No.: PCT/US2007/076521
§ 371 (c)(1),
(2), (4) Date: May 28, 2010

(87) PCT Pub. No.: WO2008/024840
PCT Pub. Date: Feb. 28, 2008

(65) Prior Publication Data
US 2010/0234569 A1    Sep. 16, 2010

Related U.S. Application Data

(60) Provisional application No. 60/839,256, filed on Aug. 22, 2006.

(51) Int. Cl.
| A23K 1/00 | (2006.01) |
| A23J 1/14 | (2006.01) |
| A23K 10/37 | (2016.01) |
| A23K 20/147 | (2016.01) |
| A23K 50/80 | (2016.01) |
| A23L 33/115 | (2016.01) |
| A23L 33/185 | (2016.01) |

(52) U.S. Cl.
CPC .............. *A23J 1/14* (2013.01); *A23K 10/37* (2016.05); *A23K 20/147* (2016.05); *A23K 50/80* (2016.05); *A23L 33/115* (2016.08); *A23L 33/185* (2016.08); *Y02A 40/818* (2018.01); *Y02P 60/877* (2015.11)

(58) Field of Classification Search
CPC ........ A23K 1/146; A23K 1/14; A23K 1/3055; A23K 1/188; A23K 1/1631; A23K 20/147; A23K 50/80; A23K 10/37; A23L 1/3006; A23L 33/115; A23L 33/185; Y02P 60/877
USPC ............... 426/648, 656, 425, 417, 807, 805
See application file for complete search history.

(56) References Cited

U.S. PATENT DOCUMENTS

| 3,043,826 A * | 7/1962 | Beaber et al. ................ 530/378 |
| 3,126,932 A * | 3/1964 | Moran et al. ............ A23N 7/00 426/482 |
| 3,758,452 A * | 9/1973 | Owen .......................... 530/377 |
| 3,895,003 A | 7/1975 | Swain et al. |
| 3,972,861 A | 8/1976 | Gardner, Jr. et al. |
| 4,075,361 A * | 2/1978 | Oberg .......................... 426/655 |
| 4,859,371 A * | 8/1989 | Diosady et al. ................ 554/14 |
| 4,889,921 A * | 12/1989 | Diosady et al. .............. 530/377 |
| 5,225,230 A * | 7/1993 | Seaman et al. ............... 426/634 |
| 5,625,130 A | 4/1997 | Grant et al. |
| 5,936,069 A * | 8/1999 | Johnson .................... A23J 1/14 426/44 |
| 6,063,947 A * | 5/2000 | DeBonte .................. A01H 5/10 426/601 |
| 6,159,715 A * | 12/2000 | Porter et al. .................. 435/170 |
| 6,270,736 B1 * | 8/2001 | Barnes et al. ................ 422/268 |
| 6,323,392 B1 * | 11/2001 | Charne ........................ 800/270 |
| 6,955,831 B2 * | 10/2005 | Higgs et al. .................. 426/630 |
| 2005/0136162 A1 | 6/2005 | Kvist et al. |
| 2006/0111578 A1 * | 5/2006 | Arhancet et al. ................ 554/8 |
| 2007/0207244 A1 * | 9/2007 | Crank .......................... 426/489 |
| 2008/0166469 A1 * | 7/2008 | Schweizer ................ A23J 1/14 426/656 |
| 2010/0068336 A1 * | 3/2010 | Singh et al. ...................... 426/2 |

OTHER PUBLICATIONS

Davin. Qual. Plant Foods Hum Nutr. vol. 33, (1983) pp. 153-160.*
International Search Report for International Application No. PCT/US2007/76521, 8 pages.
Imbeach et al. The Prediction of the Digestible Amino Acid Supply in barley-Soybean Meal or Canola Meal Diets and Pancreatic Enzyme Secretion in Pigs J.Anita Sci. 1988, vol. 66, p. 1409-1417.
Caviedes, Aqueous Processing of Rapeseed (Canola), Thesis of Degree of Master of Applied Science, University of Toronto, 1996, p. 1-147.

* cited by examiner

*Primary Examiner* — Chhaya Sayala
(74) *Attorney, Agent, or Firm* — Faegre Baker Daniels LLP

(57) ABSTRACT

The subject invention relates in part to novel steps in canola and other oil seed processing, including milling to achieve a significant particle size reduction, extraction of higher levels of protein from the starting material, the use of presscake as a starting material, and the production of a precipitated protein concentrates containing a nutritionally significant amount of oil. The subject invention also provides optimal pH ranges for extraction and recovery steps in these novel processes. The subject processes can be applied to, and offer similar advantages to, other oilseeds and vegetable matter, such as sunflower seeds and flax seeds. The subject invention also includes novel feed compositions.

11 Claims, 13 Drawing Sheets

Particle Size Distribution of Milled Nexera Canola Press Cake Samples, Before Alkaline Extraction.

Particle Size Distribution of Milled Nexera Canola Press Cake Samples, After Alkaline Extraction Effect of Milling Treatment on the Protein
Extraction of Nexera Canola Press Cake

FIGURE 5
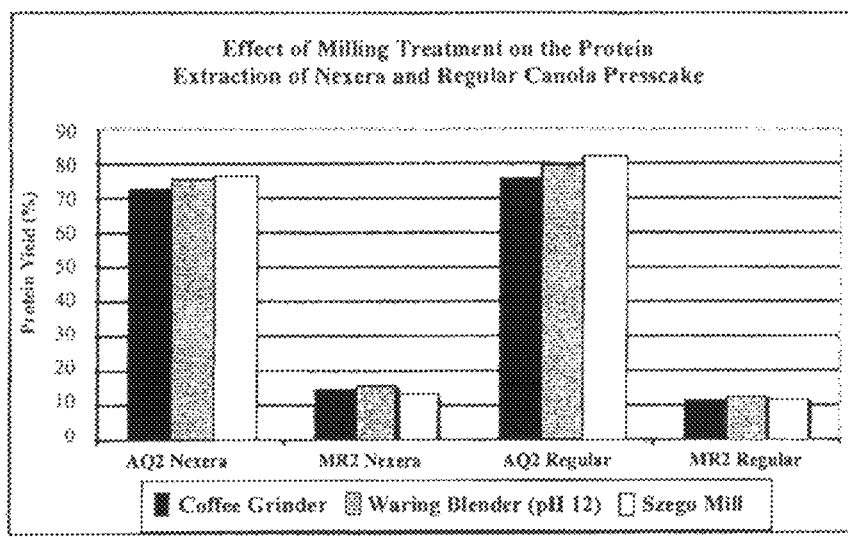
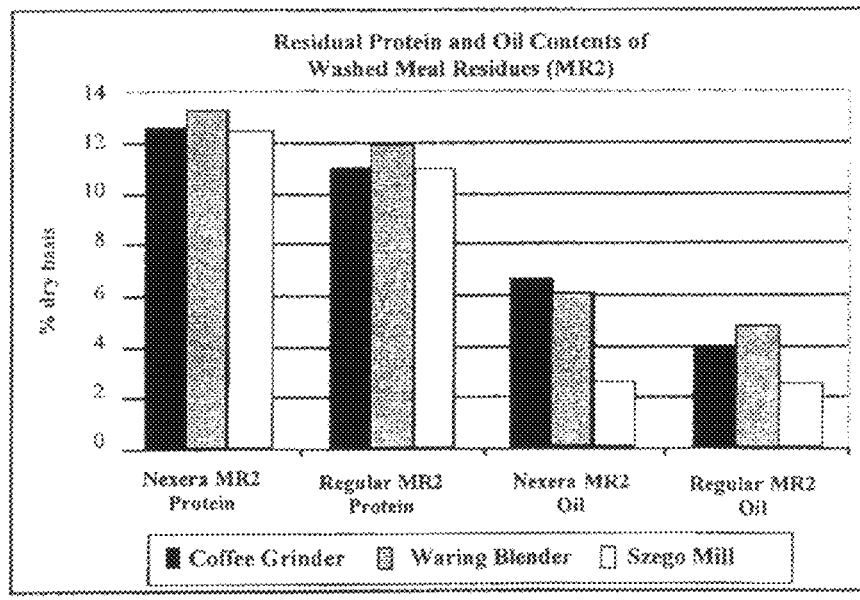
FIGURE 6

AQUEOUS PROCESSING OF OILSEED PRESS CAKE

CROSS REFERENCE TO RELATED APPLICATION

This application is a National Stage filing of PCT International Application Serial No. PCT/US2007/076521, filed Aug. 22, 2007, which claims the benefit of U.S. Provisional Application No. 60/839,256, filed Aug. 22, 2006, the disclosures each of which are expressly incorporated herein by reference.

BACKGROUND OF THE INVENTION

Canola grain is valued primarily for its high-quality oil. Canola oil processing economics is hindered by the relatively low value of the non-oil portion of the canola seed, which constitutes over 50% of the mass of the incoming grain.

The meal from conventional canola crushing and solvent extraction has a low value, due to the presence of antinutritional compounds, and a low quality protein. Phytate, phenolics, and residual glucosinolates are common problems for feed and food from all the materials (meal, white flake, press cake, and whole seed), depending on the applications. Their impact on aqueous or alcohol based processes varies depending on the desired end product.

Canola or rapeseed consists of approximately 40% oil and 60% non-oil constituents. In commercial processing, most of the oil is removed from the seed by expelling and solvent extraction. In processing systems based on solvent extraction, the non-oil material initially exists as a solvent laden white flake or marc. Typically, solvent is removed from the white flake by a process that involves application of steam and heat to generate a final desolventized-toasted product called meal. The meal contains about 35% protein and is sold as a feed ingredient for inclusion in diets fed to a variety of classes of animals including swine, poultry and cattle.

Canola seed protein has excellent feeding value. The protein is rich in methionine and lysine, with a good balance of essential amino acids. Rapeseed protein concentrate had the highest protein efficiency ratio (PER) of all of vegetable protein sources reported. As such canola or rapeseed protein, in itself, can be considered to be exceptional in comparison to other plant proteins. Dephytinized rapeseed protein concentrate could replace high quality fishmeal in diets fed to rainbow trout without adversely affecting growth performance and feed efficiency of the fish.

However, monogastric animals do not fully utilize the protein feeding value of canola or rapeseed protein when the protein is supplied in the conventional form as part of the meal. Non-dehulled, desolventized, toasted canola meal contains high levels of fiber. Fiber has little nutritional value for animals such as fish, chickens and young pigs and thus dilutes the protein and energy content of the meal. Further, antinutritional factors, such as phenolics, associated with the meal may have a negative impact on the performance of monogastric animals such as pigs, chickens and fish. In addition, the toasting process typically employed during preparation of the final meal product decreases the protein solubility of the meal and has been shown to decrease lysine digestibility when fed to chickens.

Still further, canola meal also contains exceptionally high levels of phytic acid. Phytic acid is the storage form of phosphorus in the seed and is poorly digested by monogastric species. Phytic acid can form complexes with minerals, amino acids, and proteins and thereby decreases nutrient digestibility. Further, the phosphorus in the phytic acid molecule is largely unavailable to the animal and is voided with the feces. Given this poor digestibility of phytate-phosphorus, diets must be formulated with sufficient available dietary phosphorus to meet the requirements of the animal; this tends to increase the cost of the ration. In addition, undigested phosphorus in the manure can be damaging to the environment and is of considerable concern in areas of intensive livestock production. Overall, the high fiber and high phytate content of canola meal limits the feeding value as a protein source for monogastric animals.

Ruminant animals, such as cattle, can extract energy from fiber through fermentation in the rumen. Further, rumen microbes can efficiently hydrolyze phytate; thus, the potential for antinutritional effects and damage to the environment from dietary phytic acid is less of a concern in feeding ruminant animals. Highly soluble protein is rapidly hydrolysed and utilized by microbes in the rumen. Protein that is resistant to degradation in the rumen but is largely digested during subsequent passage through the small intestine has the highest protein feeding value for ruminant animals. Thus, as feed ingredients for ruminant animals, the highly soluble proteins in canola seed are of lower feeding value than the fraction of total canola proteins that are relatively insoluble.

Considerable prior work in this area has focused on methods to achieve efficient protein extraction from oilseed-based starting material followed by concentration or isolation of the protein into a single high valued product. For example, U.S. Pat. No. 5,658,714 relates to a soy protein isolate wherein defatted soy flour slurry is prepared and adjusted to a pH such that the protein becomes solubilized. U.S. Pat. No. 4,420,425 relates to a method of producing proteins from nonbinding oilseeds such as soybeans and peanuts by solubilization and ultrafiltration. U.S. Pat. No. 5,989,600 relates to a method for improving the solubility of vegetable proteins, which methods comprise treating the vegetable protein source with a phytase enzyme, and treating the vegetable protein source with a proteolytic enzymes.

Incidentally, the use of enzymes to increase the yield of oil from canola pressing and extraction is not a new idea. Previous work has shown that carbohydrases are effective in this role, but their cost is not supported by the incrementally improved yield. Use of phytase enzymes is also a well-established concept. A newer idea is to use a white-rot fungus to decrease the phenolic content of canola products. Phenolics likely contribute to excessive color and taste of canola protein products, so their removal could allow these to have a higher value.

U.S. Pat. No. 3,966,971 relates to vegetable protein source materials that are dispersed in water at a pH in the range of 2 to 6 with an acid phytase included therein. The acidic extract containing soluble protein is separated and dried to yield a solid protein. A protease can also be used to improve the characteristics of the protein.

U.S. Pat. No. 4,435,319 teaches that protein can be extracted from sunflower meal by treating an aqueous slurry of the meal with an acid at a pH between 4.0 and 7.0. The soluble and insoluble residues are separated, and the insoluble material is continually treated with an acid solution until the desired extraction of protein is attained. The extracted proteins are then recovered by precipitation or by ultrafiltration.

U.S. Pat. No. 3,635,726 describes a procedure for the production of a soy protein isolate by extraction of the soy starting material under alkaline conditions whereby the pH is above the isoelectric pH of glycinin. After separating the extract from the insoluble residue the pH of the extract is reduced to the isoelectric pH of glycinin to induce protein precipitation.

U.S. Pat. No. 4,418,013 relates to a substantially undenatured protein isolate formed from certain legumes and oil seeds, typically rapeseed (canola), by extracting protein from the source material with water and then diluting the resulting protein solution with more water. The dilution forms a dispersion of protein aggregates which are settled from the dispersion.

U.S. Pat. No. 4,889,921 relates to the use of pH changes and membrane filtration to extract and separate protein fractions from oilseeds. This method has been used on canola and mustard meals, with the general target of food-quality material.

WO 95/27406 teaches that phytase can be added to water suspension of a soy-based starting material. Under controlled conditions of pH and temperature the phytate content is reduced.

Tzeng et al. (Journal of Food Science 1990. 55:1147-1156) describe production of canola protein materials by alkaline extraction, precipitation, and membrane processing.

U.S. Pat. No. 2,762,820 to Sugarman ("Process for simultaneously extracting oil and protein from oleaginous materials"), for example, describes a process for simultaneously extracting oil and protein from oil seeds. Peanuts are exemplified. Whole peanuts are ground to a slurry in an aqueous alkaline solution. The pH is then lowered, and heat is applied. Subsequent steps are then used to separate the protein and the oil.

More recently, two approaches in the area of aqueous processing of canola involve the use of toasted or hexane-extracted meal or white flake as the feed material for aqueous extraction, and the use of mechanical methods to separate protein-rich materials from a mild aqueous extraction.

The technology of the first approach is described in WO 03/053157 A1; U.S. Pat. No. 5,844,086; WO 97/27761; and in U.S. Patent Application 2005/0031767 A1. In these approaches, an aqueous salt solution is used to solubilize proteins from defatted (hexane-extracted) canola meal, and the proteins are recovered by chilling to get a sticky "protein micellar mass." Those patent references teach that the mild pH and low temperature extraction minimizes denaturing of the proteins and maximizes the quality of the protein product.

Defatted meal from dehulled grain has been used to reduce the color of the protein products. The published yields of the process are low, with less than 40% of the protein extracted. The products from this aqueous processing of canola and their functionality for food applications are described in WO 03/075673 A1; WO 03/034836 A1; and WO 02/089598 A1. There are three main canola proteins: 2S (napin—albumin), 7S, and 12S (cruciferin) protein. Micellar mass contains primarily the 7S protein, and the 2S goes preferentially to the filtered isolate product (material that was soluble after the first protein precipitation step). The 12S protein is in both products but is more likely to be in the protein micellar mass.

Regarding the second approach, U.S. Pat. No. 6,800,308 B2 and WO 2004/047548 A1 describe mainly mechanical methods to separate protein-rich materials from a mild aqueous extraction. This approach may also use phytase enzyme to dephytinize the material and may induce curdling with heat. The products of these processes are primarily used as animal feed, particularly fish feed, rather than human food markets.

US 2005/0136162 A1 describes aqueous milling combined with enzymatic treatment and heat to create a range of products isolated by centrifugation, evaporation, and filtration. Overall protein extractions of 71-76% in four different protein-containing fractions are reported therein in Examples 1 and 4.

Before the subject invention, it was not possible to profitably obtain saleable feed and food protein products out of canola presscake, whole seed, white flake, or meal via aqueous extraction.

BRIEF SUMMARY OF THE INVENTION

The subject invention reflects major shifts in paradigms in the art of canola processing, including milling (with preferred equipment) that achieves a significant particle size reduction, extraction of higher levels of protein from the starting material, the use of presscake as a starting material, and the production of a precipitated protein concentrates containing a nutritionally significant amount of oil. The subject invention also provides optimal pH ranges for extraction and recovery steps in these novel processes. The subject processes can be applied to, and offer similar advantages to, other oilseeds, such as sunflower seeds and flax seeds. The subject invention also includes novel feed compositions.

BRIEF DESCRIPTION OF THE FIGURES

FIG. 3A illustrates Nexera canola before alkaline extraction. FIG. 3B illustrates regular canola before alkaline extraction.

FIG. 5 illustrates a comparison of the protein yields of Nexera and Regular canola press cakes. The Regular Canola press cake gave higher protein yields in the AQ2 extracts. However, with higher starting protein content and the amounts of protein and oil remaining in the MR2 (FIG. 6), the mass of protein liquefied into the AQ2 per unit of starting press cake was higher with Nexera press cake than with Regular press cake (FIG. 7).

FIG. 6 illustrates residual protein and oil content of washed meal residues (MR2).

DETAILED DESCRIPTION OF THE INVENTION

Figure 1:
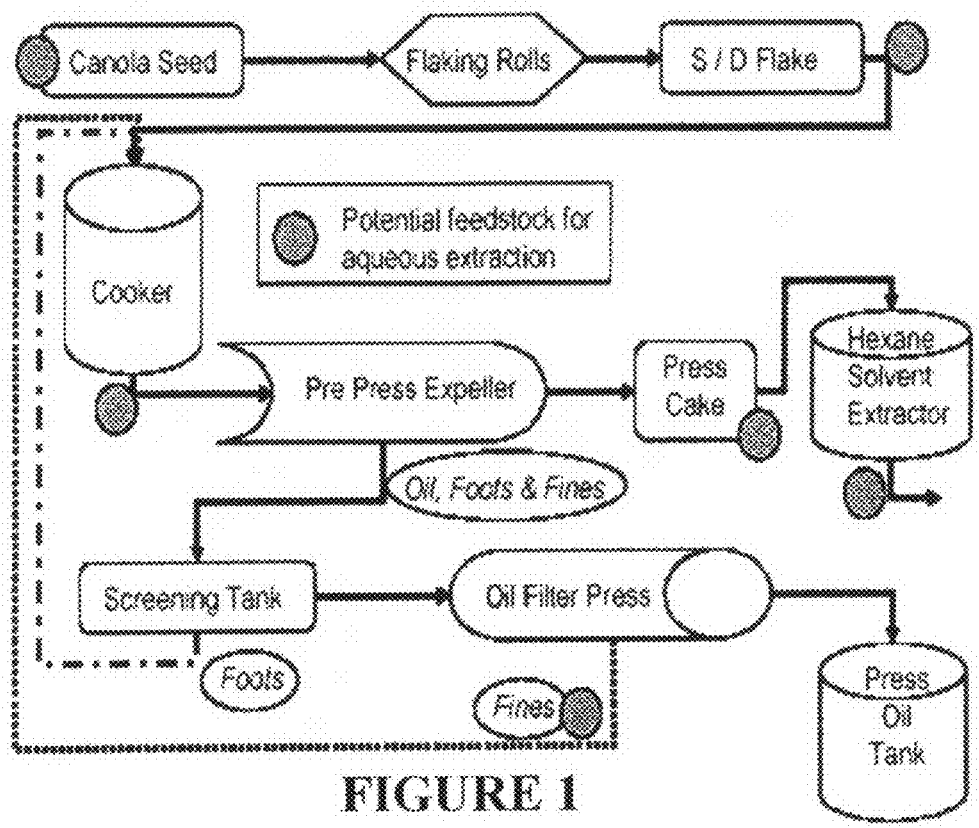
FIG. 1 illustrates a simplified process flow diagram for conventional canola crushing and also indicates possible feed sources for an aqueous extraction process.

Before the subject invention, it was not possible to profitably obtain saleable feed and food protein products out of canola presscake, whole seed, white flake, or meal via aqueous extraction. The subject invention relates in part to the identification of surprising, new, preferred processes for aqueous milling of press cakes to extract and recover protein fractions.

The recovery of over 80% of protein is superior compared to published reports of other aqueous processes. The subject processes have unique and novel attributes. The precipitated protein concentrate (PPC) has higher oil content than other vegetable protein concentrates, making it a good product for fish feed. The subject invention includes a method in which precipitated protein concentrates (PPC, greater than 50% total protein) and soluble protein isolates (SPI, greater than 80% total protein) are produced from canola.

There are many possible forms of vegetable material for use in extraction of oils and proteins. These include crushed seeds, press cake (seeds that that have been pressed to expel oils, but have not been subject to a solvent or other chemical extracts), white flake (seeds that have been crushed, and extracted with a solvent such as hexane to remove more oil), and the meal from a conventional crushing and solvent extraction process.

The subject invention preferably involves the use of canola presscake as a starting material, the use of an aggressive grinding process that results in a measurable reduction in particle size, solubilization of residual oil and protein through an alkaline (pH>10) aqueous extraction, separation of the oil-water emulsion from the aqueous fraction by centrifugation, removal of phytic acid from the aqueous fraction by treatment with calcium salts, and precipitation of a protein concentrate by adjusting the pH of the aqueous phase to pH<5, recovery of a soluble protein isolate from the aqueous phase by ultrafiltration/diafiltration and freeze or spray drying.

Of these steps, some of the most important, according to the subject invention, are milling (with preferred equipment) that achieves a significant particle size reduction, extraction of higher levels of protein from the starting material, the use of presscake as a starting material, and the production of a PPC containing a nutritionally significant amount of oil.

In examples of the subject invention, press cakes were wet milled using a large laboratory scale "Szegö Mill" and an orbital ring-roller type mill developed at the University of Toronto. A water-to-cake ratio of 7 to 15 and a double-pass milling procedure were used. The resulting particle size was typically 50-60 microns. A lower water-to-cake ratio should be possible if a Szegö Mill were installed in a continuous process with a positive feed for the coarse ground slurry of canola press cake. In the laboratory, press cake slurries were fed only by gravity to the Szegö mill. Centrifugations were done using a standard lab swinging bucket centrifuge.

The subject invention provides optimal ranges for particle size of milled canola grain. Prior work on aqueous extraction of proteins from vegetable matter has not generally specified the kind of contacting required for maximum extraction of the proteins. Prior work also generally used agitation of solids with water in a stirred vessel. According to one aspect of the subject invention, particle size of the vegetable material is very important for maximizing protein extraction. It was found that aggressive milling of press cake increases the protein yield. In addition, the particle size is preferably achieved when the size reduction is done in the presence of water. Preferred ranges are mean particle sizes less than 100 microns, especially when a significant fraction (approximately 10-25%) are <10 microns. This is a target range for milling, so some variance can exist in the final product.

The subject invention also provides optimal pH ranges for extraction and recovery steps in these novel processes. For example, some preferred ranges are from pH 10 to pH 14, with a preferred target range between pH 11 and pH 12.5. Some preferred ranges for precipitation are from pH 1 to pH 5, with a preferred working range of pH 2-3.5. The subject alkali extraction is more robust than prior processes, so it can thus be applied to dehulled presscake in addition to conventional, non-dehulled presscake. It may also be applied to solvent extracted dehulled white flake.

The subject invention provides a surprising, new aqueous process that effectively deals with emulsions and provides advantages such as a lower water to cake ratio, avoiding the need to dry hulls, and less phenolics (although some can still be present from the meats). Dehulling before aqueous extraction is also an option.

Processes of the subject invention can be applied across a wide spectrum of canola materials, such as seed, presscake, white flake, and meal. However, according to the subject invention, presscake is a preferred starting material. Defatted canola white flake is another possibility as there is no oil in the white flake, which would make the process cheaper and simpler for protein recovery.

The presence of oil and emulsions are major differences between seed and presscake extraction, versus white flake or meal extraction. Oil and emulsions are present only with seed and press cake. Thus, white flake was heretofore a preferred starting material for aqueous extraction because a major processing cost was eliminated from the protein isolation process.

The meal from conventional canola crushing and solvent extraction has a low value, due to the presence of anti-nutritional compounds and a low quality protein. Phytate, phenolics, and residual glucosinolates are common problems for feed and food from all the materials (meal, white flake, press cake, and whole seed), depending on the applications. Their impact on the aqueous or alcohol based processes varies depending on the desired end product.

Aqueous extraction of crushed seeds produces a large volume of an emulsion phase from which it can be difficult to recover oil, a valuable component of the seeds. Thus, in terms of oil yield, press cake, white flake, and meal should be preferred to seeds. Conventional pressing and solvent extraction uses a high temperature process to remove residual solvent, which can degrade the quality and quantity of the remaining protein, so meal should be the worst starting material for protein extraction. From these thoughts, one would expect white flake or press cake to the preferred starting materials for aqueous extraction. However, many prior efforts have focused on trying to upgrade oilseed meal or white flake, rather than presscake or whole seed.

Another difference is the present use of press cake (both single and double) as the feed material. FIG. 1 shows a simplified process flow diagram for conventional canola crushing and also indicates possible feed sources for an aqueous extraction process. Single press cake is produced from grain which has been flaked and cooked, but not de-hulled or exposed to solvents. Double press cake, which is not produced in most current canola crushing plants, is simply a second pressing of the meal from a single press, typically after a second heating step, to free additional oil without using a solvent. According to the subject invention, using presscake offers some unique advantages that are not previously described or suggested, including: less heat history and degradation of proteins, complete avoidance of organic solvents, and the ability to recover most of the oil as free oil from the presses. By removing the majority of the oil before contacting water, the amount of emulsion made and the quantity of water required should be greatly reduced compared to wet milling of grains.

The subject aqueous processes typically produce three protein products: a precipitated protein concentrate (PPC), soluble protein isolate (SPI) and a meal residue (in general, MR, or MR1 or MR2 if referring to a specific degree of washing or flowsheet label). The meal residue is similar to the current meal, and would be useful as a ruminant feed. The SPI is a high quality protein that may be useful in food applications.

PPCs of the subject invention have several novel features. One is the oil content, an unexpected attribute of our process. We had expected the oil from an aqueous extraction of press cake to go essentially completely into the emulsion phase (EM1), but some oil components (hexane extractables) are preferentially bound to the PPC. This is potentially of great utility in using the PPC as a fish feed, since oil is often added into fish rations for its energy content. The PPC also has low phytate content and low crude fiber content, both of which make it suitable for monogastric animals. Crude fiber (which contains cellulose, hemicellulose, and lignin) was analyzed using the method outlined in AOAC (1984), Official Methods of Analysis, 11$^{th}$ Ed., Association of Official Analytical Chemists, Washington, D.C.

The canola precipitated protein concentrate (PPC) and soluble protein isolate (SPI) of the subject invention are preferably targeted for different feed markets. SPI solubility adds value, especially for certain feed formulations such as calf starter. Generally for food uses, protein products are purchased based on physical/chemical functionality, color, and taste; they are not purchased on the basis of nutrition.

The subject processes can be applied to, and offer similar advantages to, other oilseeds, such as sunflower seeds, flax seeds, safflower, and sesame seeds.

Food compositions for humans can be produced according to the subject processes, as well as feed compositions for other animals, including cows, fish, chicken, pigs and the like.

Various formulations and feeds can be made from the products of the subject processes. Examples include nutraceuticals (a feed or food that has had its nutritional value enhanced by pharmaceuticals, also spelled as nutriceutical). Various additives, flavoring, and the like can also be combined with the subject feed and food compositions. Such additives and agents can increase the food acceptability, palatability, and/or digestibility of the feed/food to the target animal. Additives can further increase the already-good nutritional content of foods and feeds produced according to the subject invention.

For example, it is believed that primary modes of feed detection by fish are through olfaction or sight, but the taste of the item is the main factor in determining whether the item is swallowed or rejected (Adron and Mackie, 1978). There appears to be a well-defined and species-specific tuning of the taste receptors of fish for the particular cues present in their feed items (Goh and Tamura, 1980). Many researchers and feed manufacturers have attempted to add substances to fish feeds to enhance palatability and feed acceptance. This focus has taken particular importance in the production of larval and starter feeds, where feed acceptability is a major concern.

Carr (1982) identified four major characteristics of feeding stimulants for fish that were derived from animal tissues: (1) they have a low molecular weight (<1,000), (2) they contain nitrogen, (3) they are nonvolatile and water-soluble, and (4) they are amphoteric (have both acid and base properties simultaneously). Several substances or groups of substances for which these generalizations apply, such as amino acids, betaine, and inosine, have improved feeding behavior in carnivorous and omnivorous species (as reviewed by Atema [1980], Carr [1982], Mackie [1982], Adams and Johnsen [1986a], Rumsey [1986]). Harada (1989) has shown that some dipeptides elicit a greater feeding response than either of the constituent amino acids presented alone for abalone. Few data exist on feeding stimulants for herbivorous species, but in four studies using Zillii's tilapia (Adams and Johnsen, 1986a,b; Johnsen and Adams, 1986; Adams et al., 1988), organic acids along with certain amino acids were found to be stimulatory. Feeding was stimulated by the organic acid, dimethyl-β-propiothetin, in goldfish, common carp, and tilapia (Nakajima et al., 1989).

When data on the effectiveness of the various feeding stimulants containing amino nitrogen are considered, a pattern seems to emerge relating to the feeding behavior of the fish and the type of compounds that are stimulatory. In general, carnivores show the greatest positive response to alkaline and neutral substances, such as glycine, proline, taurine, valine, and betaine, while herbivores respond more to other components.

The subject invention also includes blends of feed compositions, comprising one or more of the subject press cakes. Also included in the subject invention are one or more presscakes of the subject invention combined with different oil seed sources. See e.g. WO 2007056823, U.S. Pat. Nos. 7,176,350, 7,211,286 (WO 20903/075673), and 7,211,288, and published U.S. applications 20070004908, 20070065567, 20070015910, 20060286269, and 20070014909. One reason for such blends is to obtain feeds with particular amino acid profiles, particularly with respect to the essential amino acids. For example, soy feed is high in the essential amino acid lysine, while canola/Brassica is high in the essential amino acid methionine. Other sources can be used to supply higher levels of tryptophan (another essential amino acid), for example. Protein fractions of the subject invention are also especially useful for high-protein sports drinks, such as versions of GATORADE.

All patents, patent applications, provisional applications, and publications referred to or cited herein are incorporated by reference in their entirety to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLES

Example 1—Use of Presscake for Improved Protein Extraction

An aqueous extraction process was examined on four types of feed material (seeds, presscake, white flake, and commercial meal) for which Nexera™ canola seeds were the ultimate starting material. The white flake was obtained in the laboratory by extracting the oil from a sample of Nexera press cake (Soxhlet method with hexane). The resulting defatted press cake was then air dried. The same aqueous extraction process was used: the vegetable mater was wet milled so that a significant fraction (about 10-25%) of material was less than 10 microns in diameter, the pH was made alkaline (>10), solids removed (to produce a meal residue, "MR1"), emulsion removed (EM1), and MR1 was washed with water to produce the final meal residue ("MR2"). The liquids separated from the MR2 and EM1 were polish filtered to create an aqueous alkaline stream with soluble proteins (AQ2). The AQ2 stream can be further treated by a variety of means (pH changes, centrifugations, filtrations, ultrafiltrations, diafiltrations, and the like) to produce precipitated and soluble protein fractions, but in these experiments, we measured the protein in AQ2 a quantitative measure of the protein extracted—a direct measure of a key performance description for a protein extraction process.

Figure 2:
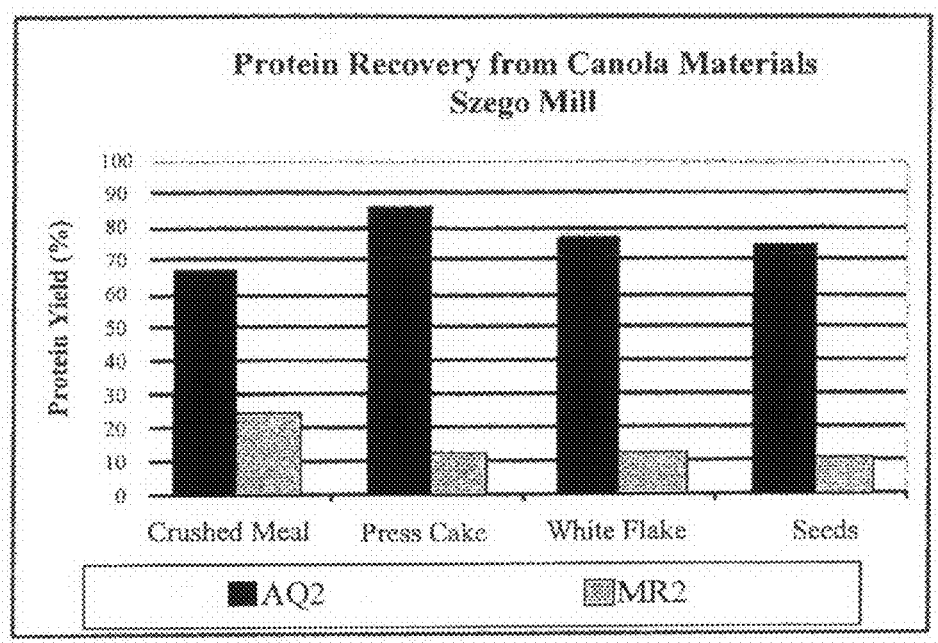
FIG. 2 illustrates protein recovery from four types of canola starting materials processed using the Szegö Mill.

The results of the runs are shown in FIG. 2. Press cake is clearly the preferred feed stock in terms of protein yield. The difference between press cake and white flake was surprising. Table 1 shows distribution of oil and protein following milling with Szegö Mill and alkaline extraction of Nexera crushed meal and presscake. Table 2 shows distribution of oil and protein following milling with Szegö Mill and alkaline extraction of Nexera crushed meal and white flake.

TABLE 1

Distribution of Oil and Protein following Milling with Szegö Mill and Alkaline Extraction of Nexera Crushed Meal and Presscake

| Sample and Analysis | Material | Mass As is (g) | Mass Dry basis (g) | Volume (ml) | Moisture Content (%) | Total Solids Dry basis (%) | Protein Concentration Dry basis (%) | Protein Mass (g) | Protein Yield (%) | Oil Concentration Dry basis (%) | Oil Mass (g) | Oil Yield (%) |
|---|---|---|---|---|---|---|---|---|---|---|---|---|
| Nexera Presscake | Starting Material | 300.00 | 276.75 | | 7.75 | | 37.46 | 103.67 | 100 | 19.5 | 53.97 | 100 |
| | AQ$_2$ | | 153.72 | 4024.1 | | 3.82 | 2.21 | 88.93 | 85.8 | 5.86 | 8.73 | 16.2 |
| | MR$_1$ | 587.1 | 125.23 | | 78.67 | | 18.68 | 23.39 | 22.6 | 6.54 | 8.19 | 15.2 |
| | MR$_2$ | 552.6 | 105.10 | | 80.98 | | 11.58 | 12.17 | 11.7 | 5.82 | 6.12 | 11.3 |
| | EM | 58.97$^a$ | 37.48$^a$ | | 36.44 | | 6.86$^c$ | 2.57$^c$ | 2.5 | 7.10$^a$ | 26.61 | 49.3 |
| | Loss and Unaccountable | | | | | | | | | | 12.5 | |
| Nexera Meal | Starting Material | 300.00 | 267.36 | | 10.88 | | 42.45 | 113.49 | 100 | 1.09 | 2.91 | 100 |
| | AQ$_2$ | | 125.15 | 3803.8 | | 3.29 | 1.99 | 75.70 | 66.7 | 1.61 | 2.01 | 69.1 |
| | MR$_1$ | 889.16 | 153.74 | | 82.71 | | 30.74 | 47.26 | 41.6 | 9.57 | 0.88 | 30.2 |
| | MR$_2$ | 816.28 | 124.32 | | 84.77 | | 21.00 | 26.11 | 23.0 | 0.42 | 0.52 | 17.9 |
| | EM | | 17.89$^b$ | | ND | | ND | 11.68$^b$ | 10.3$^b$ | ND | 0.38$^b$ | 13.0$^b$ |

$^a$Measured
$^b$Theoretical
$^c$Theoretical. The protein concentration is estimated to be ~4%.

TABLE 2

Distribution of Oil and Protein following Milling with Szegö Mill and Alkaline Extraction of Nexera Seeds and White Flake

| Sample and Analysis | Material | Mass As is (g) | Mass Dry basis (g) | Volume (ml) | Moisture Content (%) | Total Solids Dry basis (%) | Protein Concentration Dry basis (%) | Protein Mass (g) | Protein Yield (%) | Oil Concentration Dry basis (%) | Oil Mass (g) | Oil Yield (%) |
|---|---|---|---|---|---|---|---|---|---|---|---|---|
| Nexera Seeds | Starting Material | 300.00 | 277.11 | | 7.63 | | 28.42 | 78.75 | 100 | 46.68 | 129.35 | 100 |
| | AQ$_2$ | | 109.1 | 4100.8 | | 2.66 | 1.40 | 57.41 | 72.9 | 11.37 | 12.40 | 9.6 |
| | MR$_1$ | 401.4 | 92.36 | | 76.99 | | 11.78 | 10.88 | 13.8 | 7.80 | 7.20 | 5.6 |
| | MR$_2$ | 376.62 | 73.63 | | 80.45 | | 9.59 | 7.06 | 9.0 | 5.41 | 3.98 | 3.1 |
| | EM | 160.73 | 94.38 | | 41.28 | | 15.1* | 14.28 | 18.1 | 71.16 | 67.16 | 62.4 |
| | Loss and Unaccountable | | | | | | | | | | 45.81 | |
| Nexera Meal | Starting Material | 200.00 | 186.36 | | 6.82 | | 46.68 | 86.99 | 100 | 0.43 | 0.80 | 100 |
| | AQ$_2$ | | 109.14 | 2580.15 | | 4.23 | 2.59 | 66.83 | 76.8 | 0.29* | 0.32 | 40.0 |
| | MR$_1$ | 505.1 | 84.5 | | 83.32 | | 23.80 | 20.05 | 23.1 | 0.36* | 0.30 | 37.5 |
| | MR$_2$ | 417.48 | 64.38 | | 84.58 | | 15.66 | 10.08 | 11.6 | 0.29* | 0.36 | 45.0 |
| | Loss and Unaccountable | | 12.84 | | | | | 10.08 | 11.6 | | 0.12 | 15.0 |

*These values were measured using an NMR instrument. The oil concentration in the starting material (white flake) will be determined as well.
$^a$Theoretical value. The real value was estimated to be 8.7%.

The following observations were made based on these experiments and results:

1. Application of the wet milling and alkali extraction procedures to Nexera press cake gave the highest protein recovery in the aqueous phase (FIG. 2).

2. In spite of the washing of Meal Residue 1, there is still 21% protein remaining in the Meal Residue 2 when starting with commercial Nexera meal. Desolventization and toasting of the white flake in the commercial process reduced the solubility of the protein in Nexera meal.

3. There is a considerable amount of a hexane extractable (oil) remaining in the aqueous extract (AQ2) following the wet milling of whole Nexera seeds followed by alkali extraction and centrifugation. Removal of additional hexane extractable in AQ2 by further centrifugation resulted in only 0.2% oil reduction in the dried solids.

4. Alkali extraction of white flake produced an extremely dark colored extract and meal residue. The intensity of the dark color from white flake versus press cake or meal was not expected.

Example 2—Aggressive Milling of Presscake Increases the Protein Yield

The effects of milling conditions were explored by conducting an aqueous extraction process on press cake from a conventional canola meal, but using three different milling methods. The first method was to grind the material dry using a conventional coffee mill. This was the least intensive form of milling. The second was to grind the material wet, in a conventional lab blender (Waring). The third, most vigorous method was to wet mill the solids using a Szegö mill, a high-intensity mill using in mineral processing and other applications.

Figure 3A:
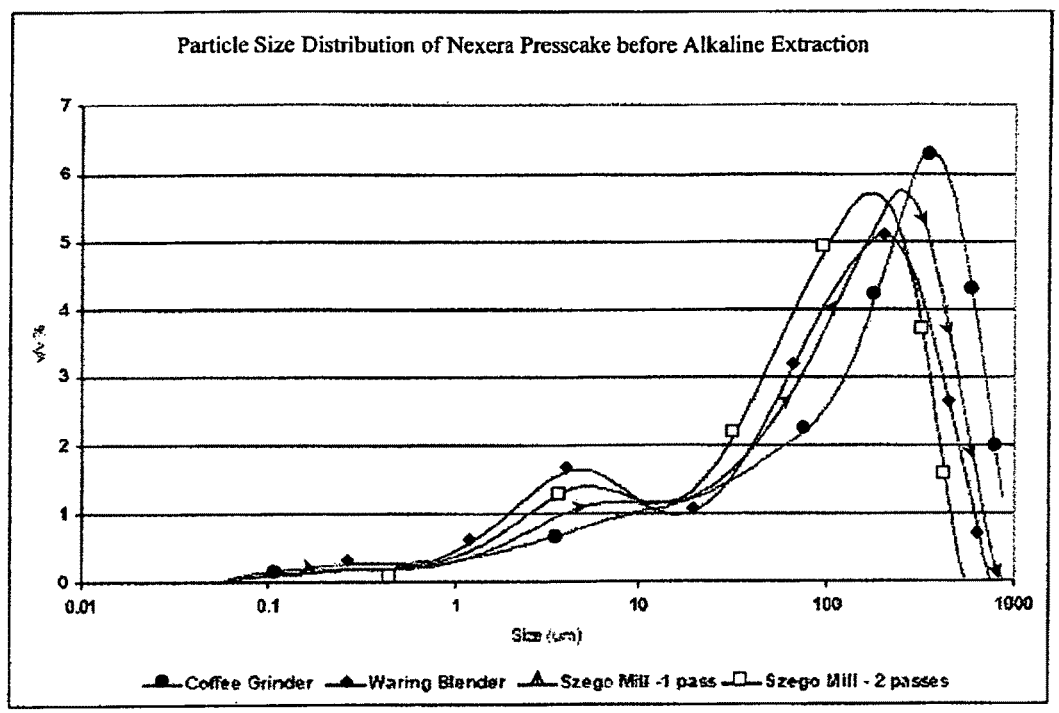
FIGS. 3A and 3B illustrate particle size distribution of Nexera and regular presscake achieved by different milling methods.
Figure 3B:
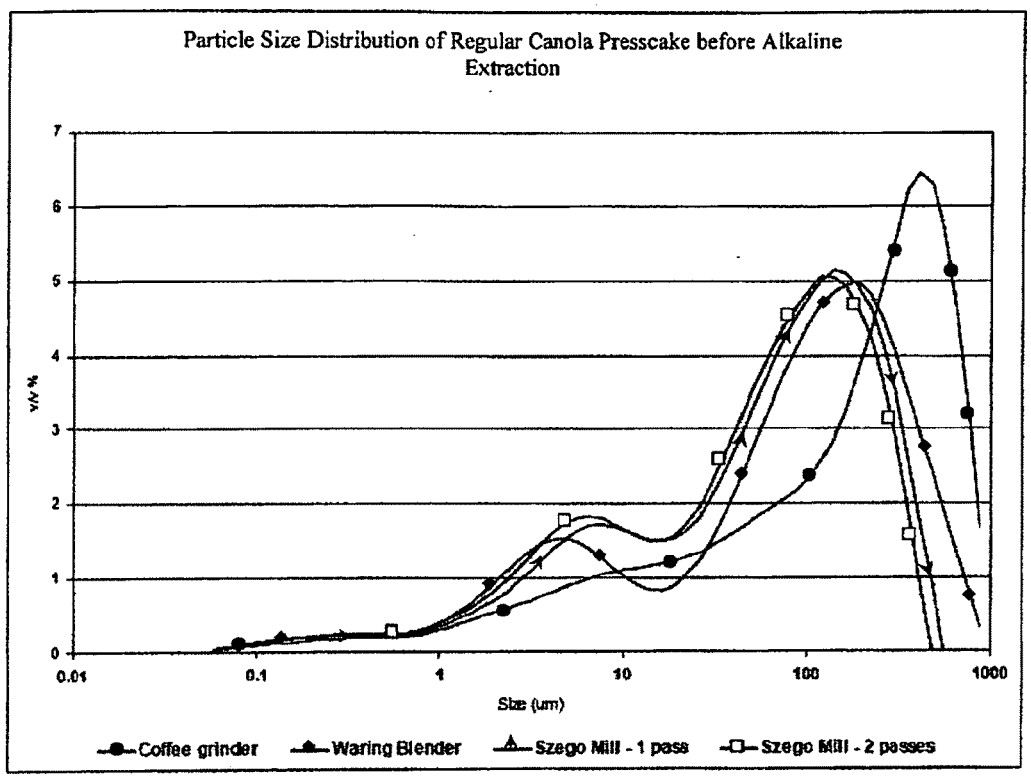
Figure 3C:
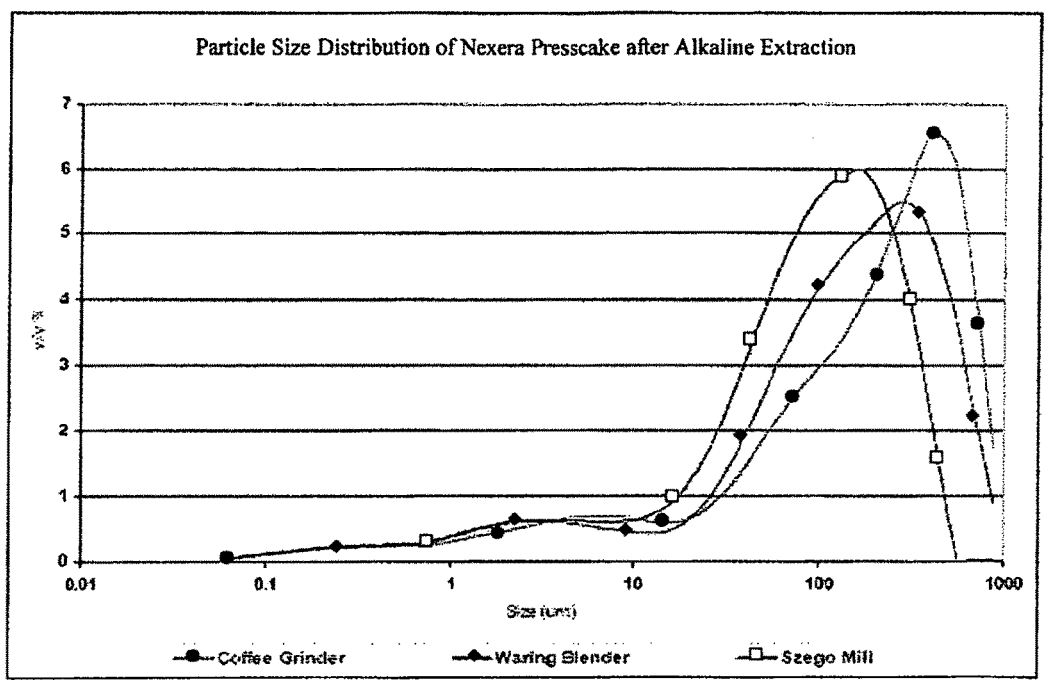
FIG. 3C illustrates particle size distribution of milled Nexera canola press cake samples after alkaline extraction.
Figure 3D:
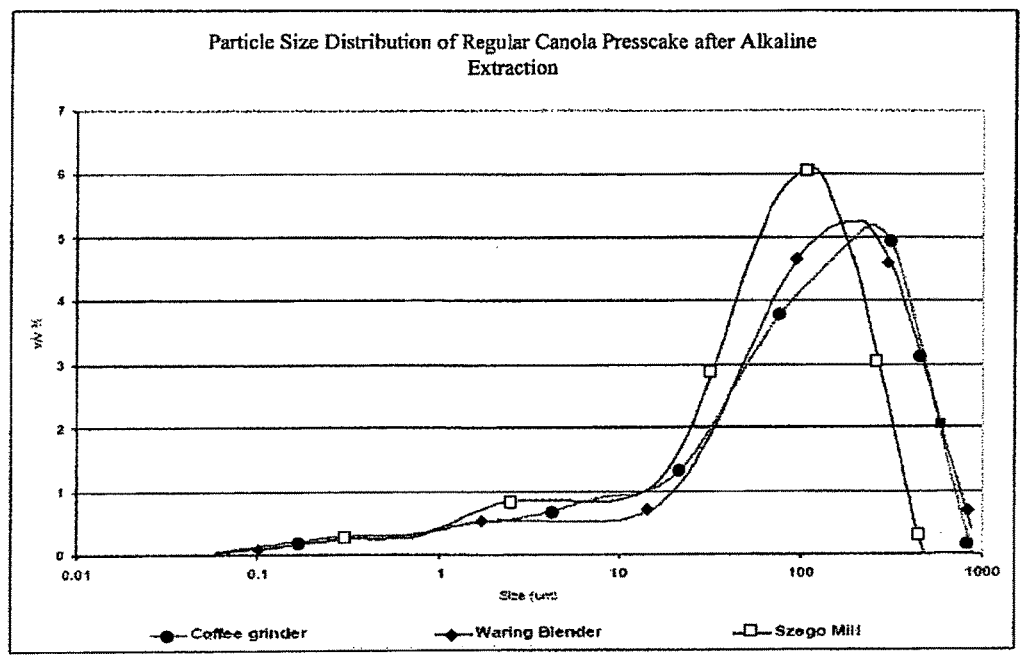
FIG. 3D illustrates particle size distribution of milled regular canola press cake samples after alkaline extraction.
Figure 3E:
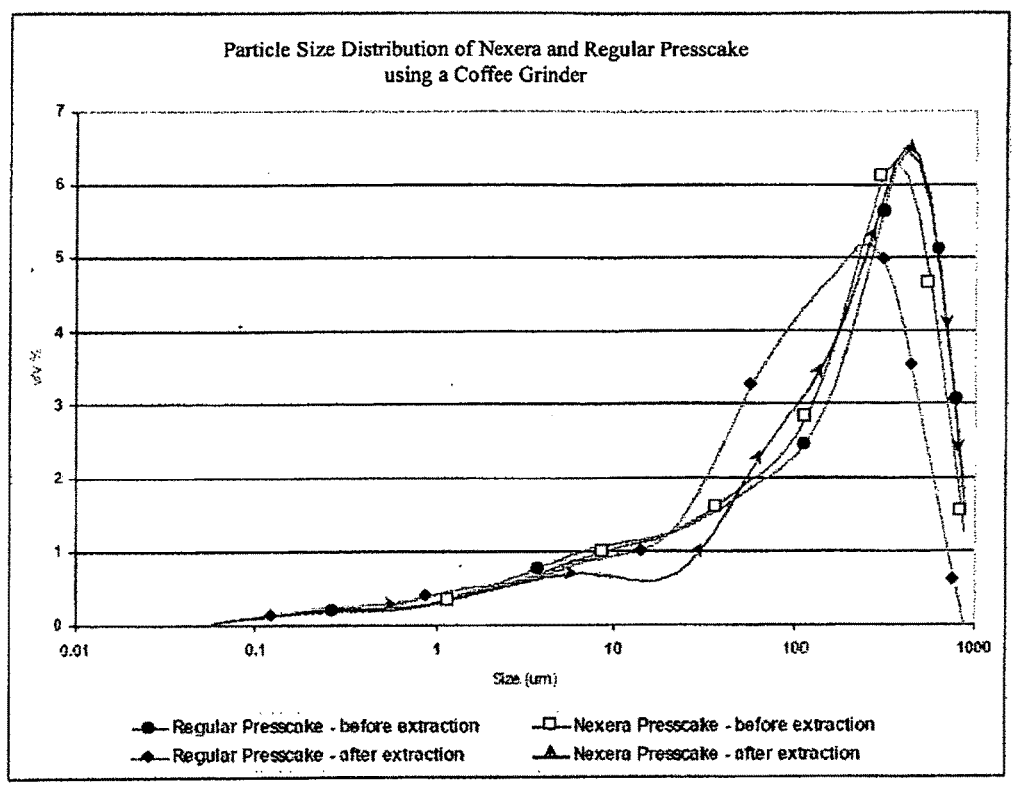
FIG. 3E illustrates particle size distribution of Nexera and regular canola press cake samples using a coffee grinder.

The size reduction of Nexera and regular presscake achieved by different milling methods is shown in FIG. 3A (Nexera canola—before alkaline extract) and FIG. 3B (regular canola—before alkaline extract). As these Figures illustrate, the two wet milling methods made a significant fraction of particles less than 10 micrometers.

Figure 4A:
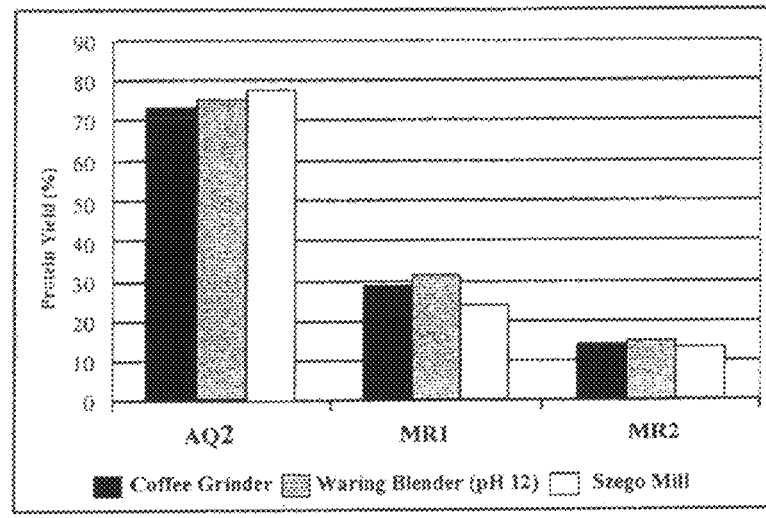
FIG. 4A illustrates the effect of milling treatment on the protein extraction of Nexera canola press cake. This Figure also shows that more protein goes in AQ2, the protein product stream, and less is in the meal residue (MR1) as the intensity of milling increases from coffee mill to Waring blender to Szegö mill.

The results, shown in FIG. 4, show that more protein goes in AQ2, the protein product stream, and less is in the meal residue (MR1) as the intensity of milling increases from coffee mill to Waring blender to Szegö mill.

The following observations were made based on these experiments and results:

1. No free oil was observed in any of the milling experiments after centrifugation of the alkaline slurry starting with either Nexera or Regular canola press cake.

2. The determination of the oil content for AQ2 from the Nexera press cake by each of the milling methods was measured using an NMR instrument. The results are shown in Table 3. The distributions of oil from the Nexera and Regular canola press cake materials were similar.

See Table 4. The greatest amount of residual oil remaining in the AQ2 occurred with use of the Waring blender.

TABLE 3

Distribution of Oil and Protein following Three Milling Treatments and Alkali Extraction of Nexera Canola Press Cake

| Milling Process | Material | Mass As is (g) | Dry basis (g) | Volume (ml) | Moisture Content (%) | Total Solids Dry basis (%) | Protein Concentration Dry basis (%) | Mass (g) | Yield (%) | Oil Concentration Dry basis (%) | Mass (g) | Yield (%) |
|---|---|---|---|---|---|---|---|---|---|---|---|---|
| | Starting Material | 200.0 | | | 7.75 | 184.3 | 34.56 | 69.12 | 100 | 18.03 | 36.06 | 100 |
| Coffee Grinder | AQ$_2$ | | | 2690.6 | | 2.85 | 1.87 | 50.31 | 72.79 | 4.15 | 3.18 | 8.82 |
| | MR$_1$ | 428.67 | 103.31 | | 75.9 | | 18.9 | 19.53 | 28.25 | 10.31 | 10.65 | 29.53 |
| | MR$_2$ | 343.68 | 78.36 | | 77.2 | | 12.59 | 9.87 | 14.28 | 6.63 | 5.19 | 14.39 |
| | EM | 64.61 | 44.96 | | 30.41 | | | 8.94 | 12.93 | | 27.69 | 76.69 |
| Waring Blender | AQ$_2$ | | | 2690.1 | | 3.62 | 1.91 | 51.38 | 74.35 | 5.43 | 5.29 | 14.67 |
| | MR$_1$ | 412.05 | 97.63 | | 77.0 | | 22.1 | 21.58 | 31.22 | 10.23 | 9.99 | 27.70 |
| | MR$_2$ | 330.23 | 76.17 | | 77.6 | | 13.29 | 10.12 | 14.65 | 6.09 | 4.64 | 12.87 |
| | EM | 46.73 | 26.45 | | 43.4 | | | 7.62 | 11.00 | | 26.13 | 72.46 |
| Szego Mill | AQ$_2$ | | | 2661.15 | | 3.38 | 1.99 | 52.95 | 76.61 | 4.37 | 3.93 | 10.90 |
| | MR$_1$ | 413.22 | 87.19 | | 78.9 | | 18.8 | 16.39 | 23.71 | 3.98 | 3.47 | 9.62 |
| | MR$_2$ | 348.75 | 67.31 | | 80.7 | | 12.3 | 8.28 | 11.98 | 2.57 | 1.73 | 4.80 |
| | EM | 72.20 | 42.74 | | 40.8 | | | 7.89 | 11.41 | | 30.4 | 84.3 |

TABLE 4

Distribution of Oil and Protein following Three Milling Treatments and Alkali Extraction of Regular Canola Press Cake

| Milling Process | Material | Mass As is (g) | Dry basis (g) | Volume (ml) | Moisture Content (%) | Total Solids Dry basis (%) | Protein Concentration Dry basis (%) | Mass (g) | Yield (%) | Oil Concentration Dry basis (%) | Mass (g) | Yield (%) |
|---|---|---|---|---|---|---|---|---|---|---|---|---|
| | Starting Material | 200.0 | 190 | | 5.00 | 190 | 31.03 | 62.06 | 100 | 18.63 | 37.26 | 100 |
| Coffee Grinder | AQ$_2$ | | | 2602.9 | | 3.17 | 1.81 | 47.1 | 75.9 | 4.3 | 3.55 | 9.53 |
| | MR$_1$ | 475.81 | 92.78 | | 80.5 | | 14.7 | 13.6 | 21.9 | 9.4 | 8.72 | 23.40 |
| | MR$_2$ | 355.69 | 82.16 | | 76.9 | | 11.0 | 9.0 | 14.6 | 4.0 | 3.29 | 8.83 |
| | EM | 42.87 | 32.23 | | 33.0 | | | 5.96 | 9.5 | | 30.42 | 81.64 |

TABLE 4-continued

Distribution of Oil and Protein following Three Milling Treatments
and Alkali Extraction of Regular Canola Press Cake

| Milling Process | Material | Mass As is (g) | Mass Dry basis (g) | Volume (ml) | Moisture Content (%) | Total Solids Dry basis (%) | Protein Concentration Dry basis (%) | Protein Mass (g) | Protein Yield (%) | Oil Concentration Dry basis (%) | Oil Mass (g) | Oil Yield (%) |
|---|---|---|---|---|---|---|---|---|---|---|---|---|
| Waring Blender | AQ$_2$ | | | 2717.2 | | 3.48 | 1.82 | 49.5 | 79.7 | 7.1 | 6.71 | 18.01 |
| | MR$_1$ | 381.36 | 88.09 | | 76.9 | | 13.1 | 11.5 | 18.5 | 8.7 | 7.66 | 20.56 |
| | MR$_2$ | 329.73 | 70.23 | | 78.7 | | 11.9 | 8.4 | 13.5 | 4.7 | 3.30 | 8.36 |
| | EM | 50.8 | 36.21 | | 38.3 | | | 4.16 | 6.8 | | 27.3 | 73.13 |
| Szego Mill | AQ$_2$ | | | 2736.4 | | 3.55 | 1.86 | 50.9 | 82.0 | 5.6 | 5.44 | 14.60 |
| | MR$_1$ | 352.37 | 86.58 | | 75.4 | | 13.5 | 11.7 | 18.9 | 3.1 | 2.68 | 7.19 |
| | MR$_2$ | 320.15 | 70.02 | | 78.1 | | 10.9 | 7.6 | 12.2 | 2.5 | 1.75 | 4.70 |
| | EM | 44.04 | 34.89 | | 26.22 | | | 3.56 | 5.8 | | 30.07 | 80.70 |

3. The characteristics of the emulsion obtained with the Waring blender and the Szegö Mill were similar in appearance and thickness. The emulsions obtained with use of the coffee grinder were difficult to separate and quantify. The emulsion was loose and didn't compact well on centrifugation. Some solids were retained on the filter after vacuum filtration of the aqueous extracts.

4. The meal residues obtained with the Waring Blender and the coffee grinder were similar in appearance and color. The MR had a coarse ground appearance and Dijon mustard brown color.

5. The meal residues obtained with the Szegö Mill were very well mixed, compacted and dark chocolate brown in color. Laboratory separation of the products was easiest with the Szegö Mill treatment.

6. Washing the meal residue (MR1) resulted in the recovery of more liquefied protein and oil from the residue. The washed MR2 from the coffee grinder and Waring blender treatments were more compacted than the corresponding MR1 residues. Visually, there appeared to be some residual oil remaining in the MR2, and this was confirmed analytically. The MR1 and MR2 of the Szegö Mill treatments were more similar in appearance.

Figure 4B:
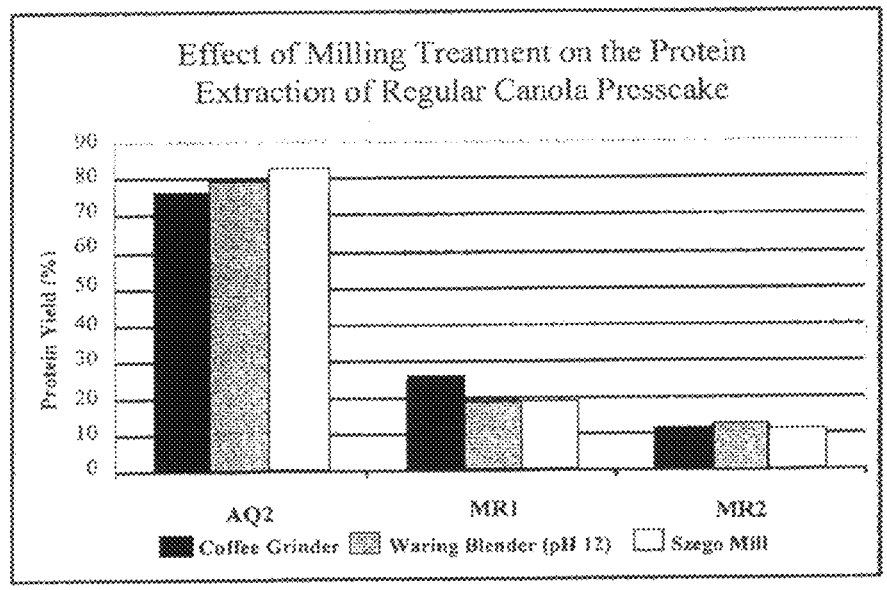
FIG. 4B illustrates the effect of milling treatment on the protein extraction of regular canola press cake.

7. The protein yields of the products are illustrated in FIG. 4B. Protein extraction yields were highest with use of the Szegö Mill. This equated to a 5-8% advantage in the mass of protein liquefied into the AQ2 compared to the comparable coffee mill treatments of Nexera or Regular canola press cake, respectively.

Figure 7:
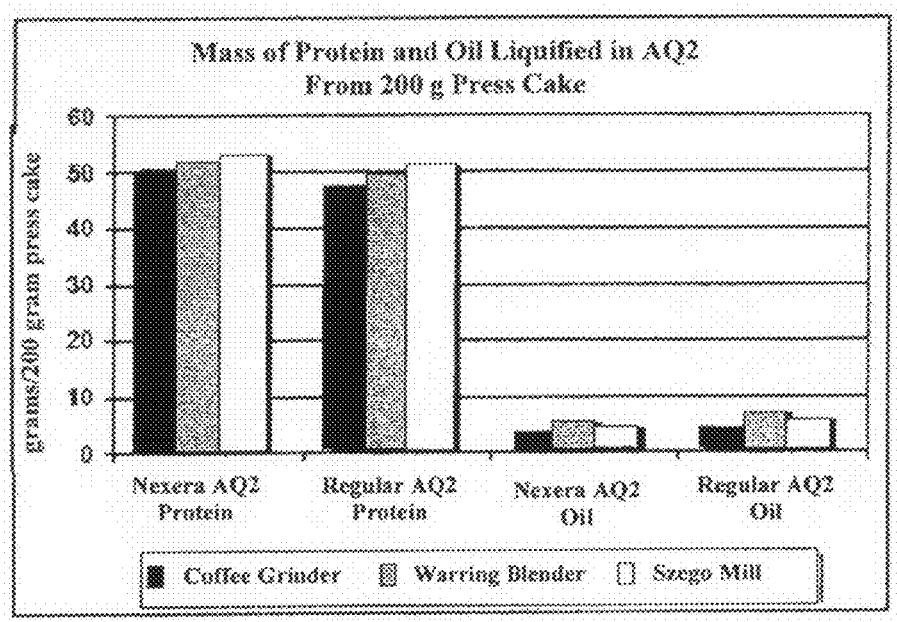
FIG. 7 illustrates mass of protein and oil liquefied in AQ2 from 200 grams of press cake.

8. The protein yields of Nexera and Regular canola press cakes are compared in FIG. 5. The Regular Canola press cake gave higher protein yields in the AQ2 extracts. However, with higher starting protein content and the amounts of protein and oil remaining in the MR2 (FIG. 6), the mass of protein liquefied into the AQ2 per unit of starting press cake was higher with Nexera press cake than with Regular press cake (FIG. 7).

9. Applicability of the process to a variety of Canola types: the amount and quality of the oil and protein produced from a canola press cake is related to the composition of the initial seed material. FIG. 5 shows that increasing extraction of protein into AQ2 with increasing degree of milling for both Nexera seeds and regular canola seeds. FIG. 7 shows similar results, but on an absolute basis (total grams) rather than a relative one. The higher concentration of protein in the Nexera seeds compared to conventional seeds led to a greater mass of protein extracted from the Nexera seeds. Similar results were achieved using regular canola seeds.

Example 3—Development and Comparison of Two Processes

The feed materials for this work were obtained from two commercial canola crushers.
  i. Prepress expellers and hexane solvent extraction were used to produce a blend of expeller and solvent extracted crude canola oil and a residual solvent extracted meal with ~2% residual oil content. The press cake was from Nexera grains.
  ii. Double presscake was produced from regular canola seeds in a commercial plant by using high pressure expellers in series. The products of this process were a crude canola expeller oil and a residual double pressed canola press cake with ~8% residual oil content. This canola meal was not solvent extracted.

The proximate analysis of the process intermediate samples for these two presscake products are presented in Tables 6 & 7.

TABLE 6

Proximate Composition of Single Presscake.

| Material | Moisture (%) | Oil (%, dry basis) | Protein[a] (%) | Phytate[a] (%) | Phenolics[a] (mg/100 g) | NSI[a,b] (%) |
|---|---|---|---|---|---|---|
| Seed | 10.7 | 45 | 40 | 2.92 | 2541 | 25 |
| Cooked flake | 6.2 | 46 | 39 | 3.53 | 2659 | 25 |
| Press cake | 6.5 | 18 | 42 | 4.01 | 3228 | 23 |
| Toasted meal | 10.5 | 1.5 | 42 | 4.27 | 3480 | 14 |

[a]Moisture and oil-free basis
[b]Nitrogen Solubility Index

TABLE 7

Proximate Composition of Double Presscake.

| Material | Moisture (%) | Oil (%, dry basis) | Protein[a] (%) | Phytate[a] (%) | Phenolics[a] (mg/100 g) | NSI[a,b] (%) |
|---|---|---|---|---|---|---|
| Seed | 7.6 | 41 | 43 | 3.10 | 1800 | 25 |
| 1st expeller | 4.7 | 24 | 44 | 3.36 | 1720 | 14 |
| 2nd expeller | 5.9 | 8 | 43 | 4.01 | 1860 | 7 |
| Finished Meal | 5.0 | 8 | 42 | 3.89 | 2001 | 7 |

[a]Moisture and oil-free basis
[b]Nitrogen Solubility Index

Extractability Versus pH

Figure 8:
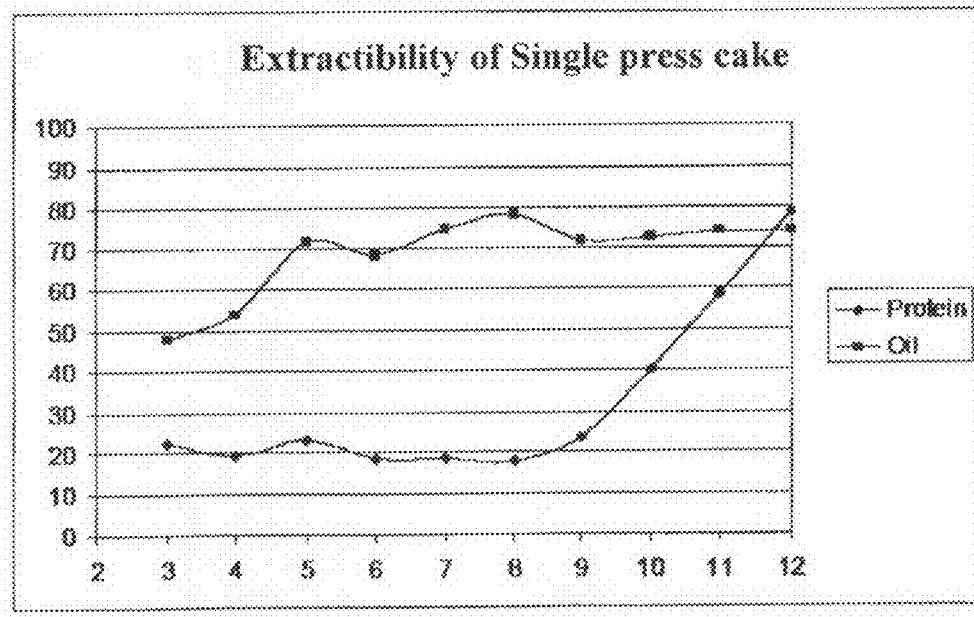
FIG. 8 illustrates the extractability of single press cake.
Figure 9:
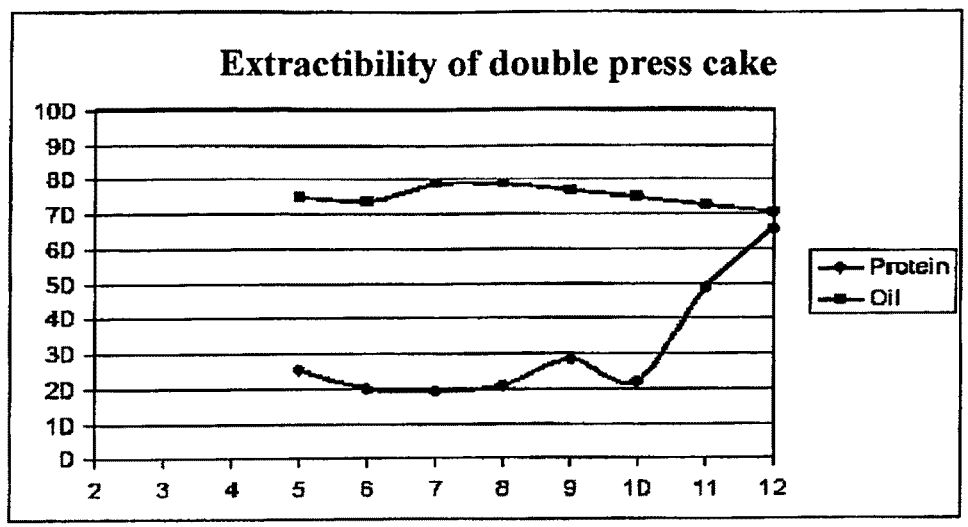
FIG. 9 illustrates the extractability of double press cake.

Data for the weight percentage extraction of protein versus pH were needed to determine the appropriate pH for extraction and recovery steps for the process. These data are shown in FIGS. 8 and 9, and show the potential for high recovery of protein using alkaline conditions for extraction.

Process Options Investigated

Figure 10:
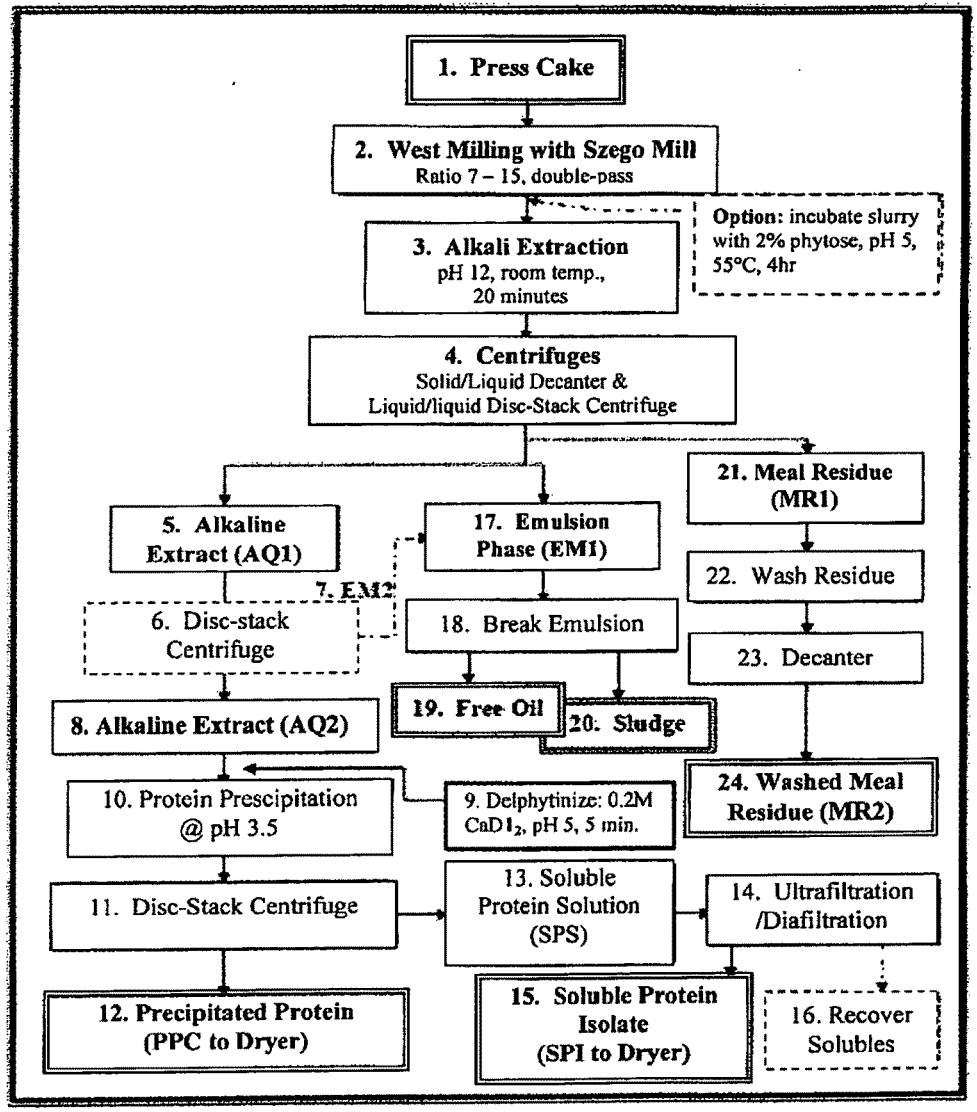
FIG. 10 illustrates Process I: Direct Alkali Extraction with Wet Milled Canola Press Cake.
Figure 11:
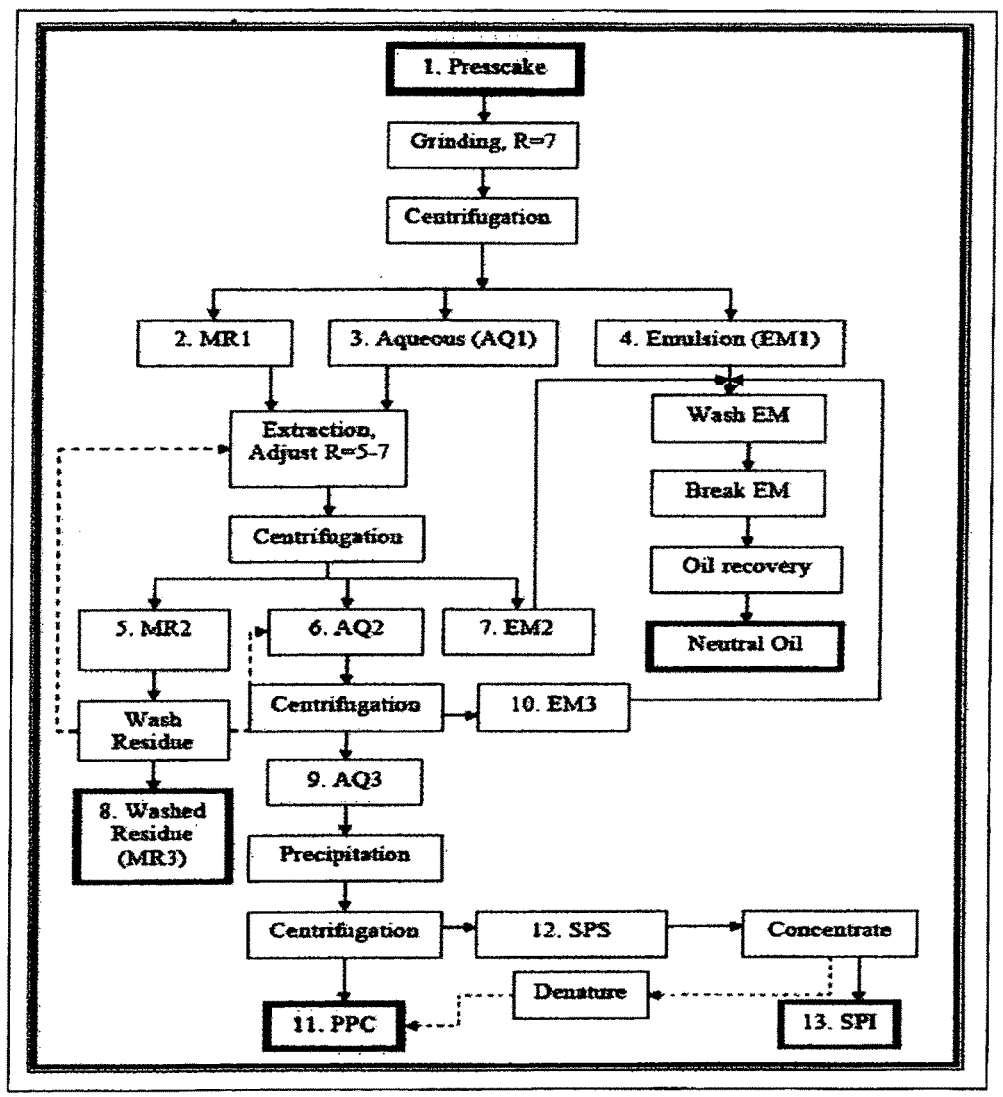
FIG. 11 illustrates Process II: 2-Step Extraction of Wet Milled Canola Press Cake with Emulsion Separation Prior to Alkali Extraction.

Two processing schemes were evaluated to extract protein and oil from single press cake:
  i. Process I—direct alkali extraction of wet milled press cake. This process is simple and does not involve separation of the oil-in-water (O/W) emulsion prior to alkali extraction. FIG. 10 shows Process I: Direct Alkali Extraction with Wet Milled Canola Press Cake.
  ii. Process II—two-stage sequence with O/W emulsion separation after wet milling and prior to alkali extraction. This process scheme was pursued with the intent of removing as much oil as possible from the insolubles prior to alkali extraction, and minimizing the amount of oil that might be retained in the PPC (precipitated protein concentrate). This process involved many additional steps that were more complex than those in Process I. FIG. 11 shows Process II: Two-Step Extraction of Wet Milled Canola Press Cake with Emulsion Separation Prior to Alkali Extraction.

Both processes can produce these products:
  i. Precipitated Protein Concentrate (PPC) with >60% protein and >10% oil content
  ii. Soluble Protein Isolate (SPI) with >90% protein content and less than 2% oil.
  iii. Meal Residue (MR).
  iv. Oil-in-Water Emulsion with oil, protein and phospholipids and trace minerals.
  v. Solubles (containing non protein nitrogen, small peptides and other constituents)—these are materials not recovered as above from the extraction water.

Constituents include non protein nitrogen (NPN), soluble carbohydrates, phytate, small peptides, polyphenolics, and minerals. These should have feed value or could serve as a substrate added to the fermentation of starch grains and cellulosic waste to produce ethanol. The solubles were not investigated further for this work.

Mass Balance Results

Product distributions and yields from single experiments of each process are shown in Tables 8 and 9. Based on the higher yield of PPC and simplicity of Process I (Direct Alkali Extraction), it is a more "preferred" process. Process I requires fewer process steps and equipment than Process II. There was also less material lost in the laboratory with Process I than with Process II.

Approximately 80% of original protein in single press cake can be recovered in Process I as a Precipitated Protein Concentrate (PPC), Soluble Protein Isolate (SPI) and Meal Residue (MR). More than 70% of the oil in the starting canola press cake and a small amount of protein is recovered in an O/W emulsion. The oil in the emulsion and the single press oil account for 90% of the oil in the grain. The oil, PPC and SPI yields from the single press material shown in Tables 8 and 9 were superior to those from the double press cake, so single press material is more preferred than double presscake as a feed material.

TABLE 8

Product Distribution for Process I

| Stream | Material | Mass g | Volume ml | Total Solid g | Protein Concentration, %, dry basis | Protein Mass, g, dry basis | Protein Yield, % of Initial | Oil Concentration, %, dry basis | Oil Mass, g, dry basis | Oil Yield, % of Initial |
|---|---|---|---|---|---|---|---|---|---|---|
| 1 | Starting Material | 100 | | 100 | 31.12 | 31.12 | 100 | 18.23 | 18.23 | 100 |
| 2 | AQ1 | | 1346 | NM | 1.78 | 23.95 | 76.97 | 0.22 | 2.96 | 16.23 |
| 3 | MR1 | 43.6 | | 43.6 | 14.70 | 6.42 | 20.62 | 7.10 | 3.10 | 16.99 |
| 4 | EM1* | 17.4 | | 10.2 | 13.60 | 1.38 | 4.46 | 44.3 | 7.71 | 42.29 |
| 5 | MR2 | 39.4 | | 39.4 | 11.98 | 4.73 | 15.18 | 6.46 | 2.5 | 13.96 |
| 6 | AQ2 | | 1374 | NM | 1.71 | 23.49 | 75.49 | 0.2 | 2.75 | 15.07 |
| 7 | EM2 | 1.5 | | 0.78 | 14.67 | 0.11 | 0.35 | 14.23 | 0.22 | 1.18 |
| 8 | PPC | 25.3 | | 25.3 | 66.51 | 16.81 | 54.01 | 10.54 | 2.67 | 14.61 |
| 9 | SPS | | 1232 | 13.9 | 0.51 | 6.41 | 20.58 | 0 | 0 | 0 |

TABLE 8-continued

Product Distribution for Process I

| Stream | Material | Mass g | Volume ml | Total Solid g | Protein Concentration, %, dry basis | Protein Mass, g, dry basis | Protein Yield, % of Initial | Oil Concentration, %, dry basis | Oil Mass, g, dry basis | Oil Yield, % of Initial |
|---|---|---|---|---|---|---|---|---|---|---|
| 10 | SPI | 5.0 | | 5.0 | 96.4 | 4.82 | 15.49 | 0 | 0 | 0 |
| — | Loss & Unaccountable | — | | — | — | — | ~10$^a$ | — | — | ~28$^b$ |

*Data incorporates results from emulsions produced for emulsion breaking experiments
$^a$By calculation based on recovery of MR2, PPC and SPS
$^b$By calculation based on recovery of MR, PPC, SPI, EM1 and EM2
Red text refers to analysis of recovered products
NM = not measured
SPI was obtained after concentrating SPS by UF/DF

TABLE 9

Product Distribution for Process II

| Stream | Material | Mass g | Volume ml | Total Solid g | Protein Concentration, %, dry basis | Protein Mass, g, dry basis | Protein Yield, % of Initial | Oil Concentration, %, dry basis | Oil Mass, g, dry basis | Oil Yield, % of Initial |
|---|---|---|---|---|---|---|---|---|---|---|
| 1 | Starting Material | 100 | | 100 | 31.12 | 31.12 | 100 | 18.23 | 18.23 | 100 |
| 2 | MR1 | 63.2 | | 63.2 | 33.60 | 21.24 | 68.24 | 14.99 | 9.47 | 51.95 |
| 3 | AQ1 | | 517.6 | NM | 1.77 | 9.16 | 29.43 | 1.16 | 6.00 | 32.93 |
| 4 | EM1 | 3.0 | | 0.61 | 14.42 | 0.44 | 1.39 | 57.05 | 1.72 | 9.43 |
| 5 | MR2 | 39.1 | | 39.1 | 17.09 | 6.67 | 21.44 | 8.29 | 3.23 | 17.76 |
| 6 | AQ2 | | 1130 | NM | 2.00 | 22.6 | 72.63 | 0.36 | 4.01 | 22.32 |
| 7 | EM2 | 12.7 | | 9.49 | 9.15 | 1.18 | 3.79 | 58.37 | 7.51 | 41.19 |
| 8 | MR3 | 32.8 | | 32.8 | 14.32 | 4.69 | 15.09 | 6.9 | 2.26 | 12.42 |
| 9 | AQ3 | | 1122 | NM | 1.97 | 22.01 | 70.85 | 0.22 | 2.47 | 13.53 |
| 10 | EM3 | 1.8 | | 0.45 | 10.22 | 0.18 | 0.59 | 62.84 | 1.13 | 6.20 |
| 11 | PPC | 20.1 | | 2.01 | 68.44 | 13.73 | 44.14 | 11.67 | 2.34 | 12.85 |
| 12 | SPS | | 858.8 | 8.42 | 0.91 | 7.82 | 25.12 | 0 | 0 | 0 |
| 13 | SPI | 5.62 | | 5.62 | 98.70 | 5.47 | 17.83 | 0 | 0 | 0 |
| — | Loss & Unaccountable | — | | — | — | — | ~10$^a$ | — | — | ~18$^b$ |

$^a$By calculation based on recovery of MR3, PPC and SPS
$^b$By calculation based on recovery of MR, PPC, SPI, EM1, EM2, and EM3
Red text refers to analysis of recovered products
NM = not measured
SPI was obtained after drying a concentrated SPS by UF/DF Use of a single press cake could be more readily integrated into traditional canola processing, since most current canola crushers use a single press process. If double press cake were to be processed, an even more simple processing scheme could be contemplated than is shown in Process I. The initial O/W emulsion produced is not broken, but is added back to one of the PPC, SPI or MR, and the blended material dried. While additional free canola oil would not be produced in this situation, the oil, protein and phospholipids (essential to the construction of the O/W emulsion) are nutritionally useful and would add to the feed value of the PPC, SPI or MR. Further optimizations of the double press operating conditions (heating, moisture, and the like) can be performed to improve the quality of the press cake for aqueous extraction.

Product Properties

The proximate analysis of the products from Process I are shown in Table 10.

TABLE 10

Chemical analysis (dry basis) of Canola Products from Canbra Press Cake

| Composition | SPI* | PPC* | MR |
|---|---|---|---|
| Protein, % (Nx6.25) | 96.4 | 66.5 | 14.7 |
| Oil, % | 0 | 10.5 | 15.2 |
| Carbohydrate, % | <0.6 | 17.3 | 54.6 |
| Crude Fiber, % | ND | <0.2 | 12.7 |
| Ash, % | <0.4 | 2.6 | 11.2 |
| Phytate, % | ND | ND | 5.1 |

*Dephytinized with $CaCl_2$
ND = not detected

Based on these analyses, the PPC should be suitable for use in fish and monogastric feeds. PPC contains approximately 66.5% protein, 10.5% oil and 17.3% carbohydrate. The high oil content of the PPC is novel to the subject processes and has not been reported in other competing products. This oil should provide a high energy feed for aquaculture use. The crude fibre contents of PPC and SPI were both very low (<0.2%). The crude fiber content is much lower than the suggested maximum level of crude fiber in fish feed (<5%). The SPI can be used in several feed, food, and industrial applications.

The amino acid profiles for the SPI and PPC are shown in Table 11. These results show that the quality of the PPC and SPI from this process is very good, and can be used for food and feed applications. The PPC contained higher percentages of essential amino acids than SPI, and compares favorably with soy protein concentrate. The PPC obtained from Process I and Process II had similar profiles of amino acids. The PPC profile is similar to those reported in WO 03/075673, WO 03/034836, and WO 02/08598 for 7S and 12S canola proteins. The SPI from both processes were also similar. The SPI profile is similar to the 2S protein reported in WO 03/075673, WO 03/034836, and WO 02/08598.

TABLE 11

Amino Acid Composition of Canola PPC and SPI (g/100 g protein)

| | Process I | |
|---|---|---|
| Amino Acid | PPC | SPI |
| Essential: | | |
| Isoleucine | 5.2 | 3.2 |
| Leucine | 9.1 | 6.2 |
| Lysine | 4.4 | 3.8 |
| Methionine | 2.2 | 2.0 |
| Phenylalanine | 4.7 | 2.5 |
| Threonine | 5.1 | 3.6 |
| Tryptophan | NA | NA |
| Valine | 6.5 | 5.0 |
| Cysteine | NA | NA |
| Non-essential: | | |
| Histidine | 3.0 | 4.0 |
| Tyrosine | 4.5 | 2.2 |
| Aspartic acid | 9.3 | 4.8 |
| Serine | 5.0 | 4.2 |
| Glutamic acid | 16.1 | 31.1 |
| Proline | 5.7 | 10.7 |
| Glycine | 5.2 | 4.7 |
| Alanine | 5.4 | 4.8 |
| Arginine | 8.5 | 7.4 |

Example 4—Emulsion Breaking and Dephytinization

In order to recover valuable free oil from the Oil/Water emulsion phase, the emulsion membrane would need to be ruptured ("broken"). Thermal, chemical (acids & bases), and enzymatic methods were investigated to break the emulsion. The emulsion was broken using a 1% protease from *Bacillus* sp. or by using degumming acids (such as food grade acids typically used for degumming crude canola oil, such as citric or phosphoric acids at 2500 ppm) and heat (such as 85° C.). Approximately 65% of the oil in the O/W can be recovered as free oil. Acid degumming of crude canola oil is a standard process, so this step may be able to use existing equipment and technology.

The use of citric or phosphoric acid at 2500 ppm might be a more cost effective than a 1% protease treatment. However, the yield of free oil achieved using certain protease appears to be higher than the yield from acid treatments.

The PPC and SPI were easily dephytinized. Treatments of the alkali extract with phytase and CaCl2 were equally effective in reducing the phytate contents of the PPC and SPI to well below 1%. Treatment with CaCl2 is expected to be more cost effective than with phytase. However, the dephytinized PPC obtained using CaCl2 treatment was darker in color than the PPC dephytinized using phytase.

Carbohydrase enzyme treatments of a wet milled slurry of canola press cake followed by alkali extraction resulted in only ~3-5% increase in oil and protein liquefaction from the starting canola press cake.

Example 5—Extraction of Sunflower Presscake

Additional oilseed samples are being evaluated for compatibility with the subject system. One of the first examples of this is the use of high oleic sunflower presscake as a feedstock for the process.

A sample of commercially prepared high oleic presscake was received from a crushing plant. The presscake was produced by the screw press extrusion of whole sunflower seed (including hull material). The proximate analysis of the presscake is as listed below in Table 12:

TABLE 12

| % Nitrogen by Combustion as is Moisture Basis | 3.35 |
|---|---|
| % Protein by Combustion as is Moisture Basis | 20.96 |
| % Nitrogen by Combustion 100% DM Basis | 3.57 |
| % Protein by Combustion 100% DM Basis | 22.34 |
| % moisture | 6.17 |
| % Oil (as is) | 16.64 |
| % Oil (DM corrected) | 17.73 |

Samples (25 g) of the sunflower presscake were homogenized using a Polytron homogenizer in 150 mLs tap water containing 10 mM calcium chloride. In some experiments, the pH of the homogenate was adjusted to between pH 11-12 with sodium hydroxide after homogenization, while in others the tissue was homogenized with sufficient sodium hydroxide added to bring the homogenate to between pH 11-12. The sample was either stirred for 20 minutes after homogenization and pH adjustment, or processed immediately after homogenization. After homogenizing and stirring, the sample was filtered through a 60 mesh (250 micron) screen under vacuum, or centrifuged in a swinging bucket centrifuge. After separation of the liquid layer from the tissue residue, the residue was washed with an additional 75-100 mLs of tap water, and the wash was combined with the previous aqueous extract after filtration or centrifugation. The residual tissue residue was dried in a vacuum oven, and designated Meal Residue (MR).

The aqueous extracts were filtered through Whatman #1 paper to remove fine particles, and the solution was brought to 0.2M calcium chloride by the addition of either solid calcium chloride dehydrate or a sufficient volume of 2M calcium chloride. The pH of the solution was lowered to pH 3 to 3.5 by the addition of hydrochloric acid with stirring. The solution was transferred to a centrifuge bottle, and a precipitate was collected by centrifugation. The supernatant solution was decanted, and the tissue pellet was suspended in 100 mLs deionized water acidified to pH 3-4 with hydrochloric acid. The suspension was centrifuged again, and the supernatant was combined with the first supernatant. The pellet was suspended in deionized water, transferred to a flask, frozen, and lyophilized. The recovered mass was designated PPC (precipitated protein concentrate).

The remaining aqueous solution was filtered through celite and placed in dialysis tubing (molecular weight cut off of 1 kda). The samples were dialyzed against deionized water with 4 changes of water over 48 hours. The solution was then transferred to a flask, frozen, and freeze dried. The mass of the recovered, dried material was determined, and the sample was designated SPI (soluble protein isolate).

The recovered samples are being submitted for oil and protein analysis. Table 13 lists the mass recovery of the different fractions from several experiments.

TABLE 13

| Fraction | Batch A | B | C | D | E |
|---|---|---|---|---|---|
| MR | 15.299 | 15.257 | 15.96 | 16.946 | 16.563 |
| PPC | 3.645 | 4.161 | 4.035 | 3.363 | 4.022 |
| SPI | nd | nd | 0.7 | nd | nd |
| % Mass Recovered | 76% | 78% | 80% | 81% | 82% |
| pH adjustment | after homogenization | before homogenization | before homogenization | before homogenization | before homogenization |
| Stirring | 20 minutes | 20 minutes | 20 minutes | not stirred | not stirred |
| Separation | Filtered | Filtered | Filtered | Filtered | centrifuged |

The results show that similar protein fractions can be obtained by the subject aqueous oilseed process techniques using whole sunflower presscake as the feedstock. Table 14 shows content of major fatty acids in sunflower oil from presscake and PPC.

TABLE 14

| Sunflower | Major Fatty Acids (% Total) | | | | | | | |
|---|---|---|---|---|---|---|---|---|
| | C16:0 | C18:0 | C18:1 | C18:2 | C20:0 | C20:1 | C22:0 | C24:0 |
| Presscake Oil | 4.31 | 3.26 | 87.67 | 3.67 | 0.24 | 0.17 | 0.52 | 0.18 |
| PPC Oil | 3.74 | 3.38 | 87.77 | 3.61 | 0.30 | 0.22 | 0.76 | 0.25 |

Example 6—Oil Properties

The compositional properties of the canola presscake oil and the oil component of the PPC were compared. Canola presscake (25 g) was extracted with hexane in a soxhlet extraction apparatus for 6 hours, and the hexane extract recovered by rotary evaporation. Aliquots of PPC (1-2 g) were extracted with hexane (4×20 mLs) by shaking in a sealed tube at room temperature (30 minutes) followed by centrifugation and recovery of the hexane supernatant. The combined hexane extracts were pooled, filtered, the extracted material recovered by rotary evaporation. The recovered hexane extracts were analyzed for fatty acid profile, lipid classes, tocopherol content, and sterol content. The results are shown in the tables below:

TABLE 15

| Canola | Major Fatty Acids (% Total) | | | | | | | |
|---|---|---|---|---|---|---|---|---|
| | C16:0 | C16:1 | C18:0 | C18:1 | C18:2 | C18:3 | C20:0 | C20:1 |
| Presscake Oil | 4.56 | 0.42 | 1.47 | 70.81 | 19.05 | 2.00 | 0.44 | 1.07 |
| PPC Oil | 4.00 | 0.32 | 1.51 | 70.85 | 18.87 | 1.99 | 0.53 | 1.28 |

TABLE 16

| Canola | Lipid Composition | | |
|---|---|---|---|
| | TAG | DAG | PC |
| Presscake Oil | 99.0% | 1.0% | 0.0% |
| PPC Oil | 98.7% | 1.3% | 0.0% |

TABLE 17

| Canola | Tocopherols (ug/g oil) | | | |
|---|---|---|---|---|
| | Alpha | Delta | Gamma | Total |
| Presscake Oil | 221 | 10 | 404 | 634 |
| PPC Oil | 99 | 10 | 259 | 369 |

TABLE 18

| Canola | Free Sterols (ug/g oil) | | | |
| --- | --- | --- | --- | --- |
| | Beta-Silosterol | Brassicasterol | Campesterol | Stigmasterol |
| Presscake Oil | 2,144 | 796 | 1,075 | 64 |
| PPC Oil | 4,044 | 1,551 | 2,085 | 101 |

| Canola | Esterified Sterols (ug/g oil) | | | |
| --- | --- | --- | --- | --- |
| | Beta-Silosterol | Brassicasterol | Campesterol | Stigmasterol |
| Presscake Oil | 3,131 | 665 | 1,910 | nd |
| PPC Oil | 3,208 | 673 | 2,035 | nd |

| | Total Sterols (ug/g oil) | Percent Esterified |
| --- | --- | --- |
| Presscake Oil | 9,785 | 58% |
| PPC Oil | 13,696 | 43% |

The fatty acid and lipid class profiles of the presscake and PPC oil are essentially identical, indicating the PPC oil composition will reflect the composition of the presscake oil. Tocopherol content was reduced in the PPC oil, although the tocopherol profile reflects that of the presscake oil. The PPC oil was somewhat enriched in free sterols relative to the presscake oil, and contained the same amount of esterified sterols. From these results, it can be concluded that the PPC will contain oil that reflects the properties of the original presscake sample, and any nutritional benefits of the presscake oil will be mirrored in the PPC oil.

Example 7—Further Uses and Parameter Change

Methods described herein, relating to presscake alkaline extraction with aggressive particle size reduction and phytate removal, can be used to obtained better protein extraction, low phytate PPC, and oil containing PPC. The subject processes can be extended to other oilseeds, such as sunflower, *B. juncea* (yellow mustard), cottonseed, flax, safflower, rapeseed, and soybean.

Various other feedstocks can be used according to the subject invention. Reduced phenolic canola can be used as a feedstock. Such feedstock includes yellow seedcoat and reduced sinapine (traditional and transgenic) lines. The subject invention includes the use of any reduced phenolic germplasm for any form of protein isolation from canola (including the use of presscake, whole seed, and defatted meal including toasted and whiteflake). Other oilseed preferred feedstocks include high lignan flaxseed and low gossypol cottonseed Other preferred canola feedstocks for novel processing include:
 a. Germplasm with reduced fiber content
 b. Germplasm with certain total protein and oil contents
 c. Germplasm with Natreon profile, or any other high oleic or low linolenic combination
 d. Germplasm with altered cruciferin/napin profiles
 e. Germplasm with improved oil stability
 f. Reduced or low sat germplasm
 g. Germplasm with certain tocopherol and sterol profiles
 h. Reduced shattering or low chlorophyll content germplasm Various modifications can be made to processes exemplified herein, including:
 (1) Use of calcium hydroxide for alkaline extraction/phytate removal
 (2) Suppression of phenolic-protein interactions by additives during extraction
 (3) Treatment of PPC to remove other components, including:
  i. Immobilized lipase treatment to remove oil
  ii. Treatment with carbohydrase enzymes to remove carbohydrate fraction of PPC One skilled in the art, having the benefits of the subject disclosure, will also recognize that this invention enables novel uses for the subject oil emulsions, and novel uses for extracted meal residue for, for example, biogas production, bioethanol production, and building materials.

Example 8—Large Scale Extraction

The extraction of proteins from canola presscake was also accomplished on a larger, continuous scale. 51 kg of canola presscake was milled with 314 kg of water and 9.7 kg of 70% NaOH solution continuously over 350 minutes using a three-head IKA rotor/stator homogenizer to produce a milled slurry with a mean particle size of 108 microns. 198 kg of a meal residue product (7.6 kg of protein) was removed using a decanter centrifuge, and 21 kg of a light emulsion phase was removed from the centrate using a disc stack centrifuge. 11.4 kg of a 62% $CaCl_2$ solution and 3.1 of a 75% HCl solution were added to the heavy phase from the disc stack centrifuge to solubilize phytates and cause certain proteins to precipitate. The precipitated proteins were removed as 72 kg of a slurry using a second disc stack centrifuge, leaving 104 kg of a clarified soluble protein solution. The precipitated protein slurry was later washed with distilled water and passed again through the disc stack centrifuge to produce 67 kg of a washed precipitated protein slurry. The dry-basis composition of this slurry was 64% protein and 26% oil, which is a composition appropriate for applications such as fish feed. Various runs were used to create precipitated protein concentrates (PPCs) with about 18-33% oil, with most runs yielding about 24% oil. Such processes can also be used and further modified according to the subject invention to increase oil content to over 40%.

Example 9—Flaxseed Presscake

Single press presscake of flaxseed was obtained from a commercial source. The sample was ground in a coffee mill to break up large pieces. A 25 gram sample was homogenized with a Polytron for 2 minutes in 200 mL tap water containing 10 mM calcium chloride. The homogenate was adjusted to a pH of 4-4.5 with HCl, and 0.5 mL of a commercial beta-glucanase enzyme complex added. The solution was heated to 45 degrees and stirred for 3 hours. Sodium hydroxide (10N) was added to a pH between pH 11-12, and the solution stirred for 20 minutes. The solution was centrifuged in a swinging bucket centrifuge at 2500 rpm, and the supernatant vacuum filtered through Whatman 113 paper. The meal pellet was suspended in 100 mLs tap water, homogenized for 30 seconds with a Polytron, and the solution centrifuged again and the supernatant filtered and combined with the previous supernatant. The solution was centrifuged in a high speed fixed angle centrifuge rotor at 7000 rpm, and the aqueous layer removed with a pipet and filtered through Whatman 54 paper. The filtrate was stirred and a solution of 2M calcium chloride in 10 mM HCl was added to a final concentration of 0.15M. The solution was adjusted to a pH of 3.5 with hydrochloric acid (5N) and the precipitate isolated by centrifugation in a high speed fixed angle centrifuge rotor at 7000 rpm. The supernatant was decanted, and the pellet suspended in 100 mLs deionized water acidified to pH 3.5 with HCl. The solution was centrifuged again, and the supernatant combined with the previous supernatant. The pellet was suspended in deionized water, and recovered by freeze drying. The pooled supernatants were concentrated by ultrafiltration using a 10 kd molecular cut-off membrane. After concentration, the solution was transferred to dialysis tubing (10 kd MWCO) and dialyzed for 24 hours against deionized water with several changed of water. The dialyzed solution was then recovered by freeze drying.

Table 19 summarizes the recovery of PPC and SPI from the flax presscake.

TABLE 19

| Process Fraction | grams |
| --- | --- |
| Starting Presscake | 25.0 |
| Meal Residue | 9.4 |
| Filtered Residue | 2.7 |
| PPC | 3.6 |
| SPI | 2.3 |

The PPC had an oil content of 18% (hexane extraction). The fatty acid profile of the oil is listed in Table 20:

TABLE 20

| Fatty Acid (% Total) | |
| --- | --- |
| C12:0 | nd |
| C14:0 | nd |
| C16:0 | 7.51 |
| C16:1 | 0.11 |
| C18:0 | 2.44 |
| C18:1 cis 9 | 13.93 |
| C18:1 cis 11 | 1.08 |
| C18:2 | 16.02 |
| C18:3 | 56.57 |
| C20:0 | nd |
| C20:1 | nd |
| C20:2 | nd |
| C22:0 | nd |
| C22:1 | nd |
| C24:0 | nd |
| C24:1 | nd |

Example 10—*Brassica Rapa*

A grain sample of a commercial *B. rapa* variety, AC Parkland, was extruded through a small oilseed press (Taby Type 20, Skeppsta Maskin AB, Täby Skeppsta, SE-705 94, Örebro, Sweden) to produce a presscake that contained 24.0% protein (total N×6.25) and 23.3% oil. A 25 g sample of presscake was homogenized in 200 mLs tap water with a rotor-stator homogenizer at high speed, and the resulting slurry adjusted to pH 11.5 with an aqueous sodium hydroxide solution.

The homogenate was stirred for 20 minutes, then transferred to centrifuge bottles and centrifuged for 5 minutes at 2000 rpm in a centrifuge equipped with a swinging bucket rotor. The supernatant was filtered through a coarse filter paper (Fisherbrand P8) on a Buchner funnel. The solid residue in the centrifuge bottles was resuspended in 100 mLs tap water and centrifuged as before. The supernatants were combined, and the solid meal residue was dried in a vacuum oven at 60 degrees C.

The aqueous solution was transferred to centrifuge bottles and centrifuged in a fixed angle rotor at 7000 rpm for 10 minutes. The bottles were uncapped, and the solid emulsion layer carefully removed with a spatula. The aqueous layer was transferred to a graduated cylinder to determine the recovered volume, then poured into a beaker and stirred.

The solution was adjusted to a concentration of 0.15M CaCl2 by addition of a 2M calcium chloride solution. The pH of the solution was then adjusted to pH 3.5 with the dropwise addition of 5N HCl. The solution was transferred to centrifuge bottles and centrifuged at 7000 rpm in a fixed angle rotor for 10 minutes, and the aqueous supernatant decanted into a flask (SPS solution).

The solid pellet was resuspended in 100 mLs deionized water and centrifuged again at 7000 rpm for 10 minutes. The supernatant (PPC wash solution) was decanted, dialyzed against deionized water in a 5 kd MWCO dialysis bag, then frozen and freeze dried. Only ~80 mg of protein was recovered in this wash solution, indicating little additional recovery of protein from the wash solution. The protein pellet was suspended in a minimum amount of deionized water, transferred to a flask, frozen, and freeze dried. The recovered powder was designated as the PPC-1 fraction. The SPS solution was adjusted to pH 7 with 1N NaOH, and centrifuged to remove a solid precipitate that formed.

The supernatant solution was filtered through a 0.45 um membrane filter, and concentrated on by ultrafiltration using a 5 kd polyethersulfone membrane. After the solution volume had been reduced to ~50 mLs, the solution was diafiltered by adding deionized water to the UF system at the same rate permeate solution was removed. After ~500 mL deionized water had passed through the system, the concentrated-diafiltered protein solution was recovered, frozen, and freeze dried.

The oil content of the PPC-1 protein was determined by exhaustive hexane extraction of an aliquot of freeze dried protein powder. The total N content of the samples were determined by Dumas combustion, and the total protein content calculated as total N×6.25. The product yields are shown in the following table:

TABLE 21

| *Brassica rapa* Presscake | % Protein | % Oil |
| --- | --- | --- |
| Starting Mass | 25.012 | 23.96 | 23% |
| MR-1 | 12.765 | 10.87 | |
| PPC-1 | 3.114 | 73.37 | 12.4% |
| SPI | 1.518 | 93.32 | |

Example 11—*Brassica Juncea*

Grain samples from three varieties of *Brassica juncea*, Zem-1, Zem-2, Uniimk 405, were obtained from a plant breeder. Presscake samples were prepared by extruding whole grain through a small oilseed press (Taby Type 20, Skeppsta Maskin AB, Täby Skeppsta, SE-705 94, Örebro, Sweden) to produce three presscakes.

Protein extracts were prepared by homogenizing 40 g aliquots of presscake starting material in 320 mLs tap water using a rotor-stator homogenizer at high speed. The slurry was adjusted to pH 11-12 with an aqueous sodium hydroxide solution and stirred for 20 minutes. The slurry was then centrifuged for 5 minutes at 2000 rpm in a centrifuge with a swinging bucket rotor (Beckman J-6). The supernatant solution was filtered through a coarse filter paper (Whatman 113) on a Buchner funnel.

The meal pellet was suspended in 160 mLs tap water and centrifuged again, and the supernatant filtered and combined with the previous supernatant. The meal residue was dried in a vacuum oven at 60 degrees C. The filtered aqueous solution was centrifuged at 7000 rpm in 200 mL centrifuge bottles in a fixed angle rotor. The floating emulsion layer was carefully removed with a spatula, and the aqueous layer transferred to a graduated cylinder to determine the total volume.

The solution was then placed in a beaker and stirred, and brought to a concentration of 0.15M CaCl2 by the addition of a 2M CaCl2 solution. A solution of 5N HCl was added to bring the pH to 3.4-3.6, and the resulting slurry centrifuged at 7000 rpm for 10 minutes.

The aqueous layer (SPS) was decanted into a flask, and the remaining pellet suspended in 150-180 mLs deionized water and centrifuged again. The resulting wash solution supernatant was either combined with the SPS solution (Zem-2) or dialyzed against deionized water using 6-8 kd MWCO dialysis tubing and freeze dried.

The wash solutions typically yielded only 200-300 mg protein, indicating only minor amounts of protein were recovered by this step. The washed PPC pellet was suspended in a minimum volume of deionized water, frozen and lyophilized. The SPS solutions was either filtered directly through a 0.45 um membrane filter (Uniimk 405) or adjusted to pH 6.5-7 with 1N NaOH and centrifuged to remove a precipitate prior to filtration (Zem-1 and Zem-2).

The filtered solution was concentrated by ultrafiltration on a 5 kd MWCO membrane system to ~50 mLs, and then diafiltered with ~300 mLs deionized water. The concentrated diafiltered solution was recovered, centrifuged to remove any precipitate that formed, then frozen and freeze dried.

The oil content of the PPC-1 protein was determined by exhaustive hexane extraction of an aliquot of freeze dried protein powder. The total N content of the samples were determined by Dumas combustion, and the total protein content calculated as total N×6.25. The product yields are shown in the following table:

TABLE 22

|  | Grams | % Protein | % Oil |
| --- | --- | --- | --- |
| Zem-2 |  |  |  |
| Presscake | 40.089 | 33.15 | 22.9% |
| Meal Residue | 13.556 | 19.87 |  |
| PPC | 8.285 | 65.06 | 23.8% |
| SPI | 3.092 | 92.20 |  |
| Uniimk 405 |  |  |  |
| Presscake | 40.005 | 34.34 | 30.2% |
| Meal Residue | 13.49 | 20.32 |  |
| PPC | 6.128 | 64.64 | 25.3% |
| SPI | 1.994 | 101.33 |  |
| Zem-1 |  |  |  |
| Presscake | 40.005 | 34.09 | 22.9% |
| Meal Residue | 16 | 15.84 |  |
| PPC | 7.934 | 63.42 | 25.8% |
| SPI | 2.273 | 89.74 |  |

Example 12—Safflower (*Carthamus Tinctorius*)

Samples of commercial birdseed quality safflower were obtained from a retail feed store (Wild Birds Unlimited). A sample of an experimental high oleic safflower variety was obtained from a plant breeder. Presscake samples were prepared by extruding whole grain through a small oilseed press (Taby Type 20, Skeppsta Maskin AB, Täby Skeppsta, SE-705 94, Örebro, Sweden) to produce two presscakes.

Protein extracts were prepared by homogenizing 40 g aliquots of presscake starting material in 300-320 mLs tap water using a rotor-stator homogenizer at high speed. The slurry was adjusted to pH 11-12 with an aqueous sodium hydroxide solution and stirred for 20 minutes. The slurry was then centrifuged for 5 minutes at 2000 rpm in a centrifuge with a swinging bucket rotor (Beckman J-6).

The supernatant solution was filtered through a coarse filter paper (Whatman 113 or Fisherbrand P8) on a Buchner funnel. The meal pellet was suspended in 150-160 mLs tap water and centrifuged again, and the supernatant filtered and combined with the previous supernatant. The meal residue was dried in a vacuum oven at 60 degrees C.

The filtered aqueous solution was centrifuged at 7000 rpm in 200 mL centrifuge bottles in a fixed angle rotor. The floating emulsion layer was carefully removed with a spatula, and the aqueous layer transferred to a graduated cylinder to determine the total volume.

The solution was then placed in a beaker and stirred, and brought to a concentration of 0.15M CaCl2 by the addition of a 2M CaCl2 solution. A solution of 5N HCl was added to bring 0.15 the pH to 3.4-3.6, and the resulting slurry centrifuged at 7000 rpm for 10 minutes. The aqueous layer (SPS) was decanted into a flask, and the remaining pellet suspended in 100 mLs deionized water and centrifuged again.

The resulting wash solution supernatant was either combined with the SPS solution (high oleic safflower) or dialyzed against deionized water in a 6-8 kd MWCO dialysis tubing and freeze dried (birdseed quality safflower). The wash solutions typically yielded only ~100 mg dry material. The washed PPC pellet was suspended in a minimum volume of deionized water, frozen and lyophilized. The SPS solutions were adjusted to pH 6.5-7 by the addition of 1N NaOH.

The birdseed quality safflower extract was filtered through a 0.45 um membrane filter directly, while the high oleic safflower was centrifuged prior to filtration to remove a precipitate that had formed. The filtered solutions were concentrated by ultrafiltration on a 5 kd MWCO membrane system to ~50 mLs, and then diafiltered with ~300 mLs deionized water. The concentrated diafiltered solution was recovered, centrifuged to remove any precipitate that formed, then frozen and freeze dried.

The oil content of the PPC-1 protein was determined by exhaustive hexane extraction of an aliquot of freeze dried protein powder. The total N content of the samples were determined by Dumas combustion, and the total protein content calculated as total N×6.25. The product yields are shown in the following table:

TABLE 23

| Birdseed Quality Safflower | g | Protein | % Oil |
| --- | --- | --- | --- |
| Presscake | 40 | 22.21 | 11.4% |
| Meal Residue | 25.56 | 9.17 |  |
| Protein Concentrate | 5.59 | 76.78 | 3.7% |
| Protein Isolate | 0.87 | 100.35 |  |

TABLE 24

| High Oleic Safflower | g | % Protein | % Oil |
|---|---|---|---|
| Presscake | 40.025 | 22.9 | 16.9% |
| Meal Residue | 23.375 | 5.29 | |
| Protein Concentrate | 7.152 | 73.8 | 18.9% |
| Protein Isolate | 1.324 | 99.5 | |

Example 13—Sesame (*Sesamum Indicum*)

A sample of white oilseed sesame was obtained. Presscake samples were prepared by extruding whole grain through a small oilseed press (Taby Type 20, Skeppsta Maskin AB, Täby Skeppsta, SE-705 94, Örebro, Sweden) to produce a presscake containing 39.2% protein and 31.90% oil.

Protein extracts were prepared by homogenizing 25 g aliquots of presscake starting material in 200 mLs tap water containing 0.05M NaCl using a rotor-stator homogenizer at high speed. The slurry was adjusted to pH 11-12 with an aqueous sodium hydroxide solution and stirred for 20 minutes. The slurry was then centrifuged for 5 minutes at 2000 rpm in a centrifuge with a swinging bucket rotor (Beckman J-6).

The supernatant solution was filtered through a coarse filter paper (Whatman 113) on a Buchner funnel. The meal pellet was suspended in 200 mLs tap water and centrifuged again, and the supernatant filtered and combined with the previous supernatant. The meal residue was dried in a vacuum oven at 60 degrees C.

The filtered aqueous solution was centrifuged at 7000 rpm in 200 mL centrifuge bottles in a fixed angle rotor. The floating emulsion layer was carefully removed with a spatula, and the aqueous layer filtered through a glass fiber filter on a Buchner funnel (Fisherbrand G6 filter), then transferred to a graduated cylinder to determine the total volume.

The solution was then placed in a beaker and stirred, and brought to a concentration of 0.15M CaCl2 by the addition of a 2M CaCl2 solution. A solution of 5N HCl was added to bring the pH to 3.4-3.6, and the resulting slurry centrifuged at 7000 rpm for 10 minutes.

The aqueous layer (SPS) was decanted into a flask, and the remaining pellet suspended in 100 mLs deionized water and centrifuged again. The resulting wash solution supernatant was either combined with the SPS solution. A noticeable precipitate formed when the wash solution was added to the SPS solution. The SPS solution was centrifuged and the resulting pellet was either added back to the PPC-1 pellet (Batch A) or suspended in a minimum volume of water and freeze dried (Batch B, PPC-2 fraction).

The washed PPC-1 pellet was suspended in a minimum volume of deionized water, frozen and lyophilized. The SPS solutions were filtered through a 0.45 um membrane filter then concentrated by ultrafiltration on a 5 kd MWCO membrane system to ~50 mLs, then transferred to dialysis tubing (6-8 kd MWCO) and dialyzed against deionized water with several changes of water. The dialyzed solution was recovered, centrifuged to remove any precipitate that formed, then frozen and freeze dried.

The oil content of the PPC-1 protein was determined by exhaustive hexane extraction of an aliquot of freeze dried protein powder. The total N content of the samples were determined by Dumas combustion, and the total protein content calculated as total N×6.25. The product yields are shown in the following table:

TABLE 25

| Batch A | g | % Protein | % Oil |
|---|---|---|---|
| | White Sesame | | |
| Presscake | 25.043 | 39.23 | 31.9% |
| Meal Residue | 10.163 | 16.46 | |
| PPC | 6.263 | 70.72 | 12.1% |
| SPI | 0.518 | 96.15 | |

TABLE 26

| Batch B | g | % Protein | % Oil |
|---|---|---|---|
| | White Sesame | | |
| Presscake | 25.044 | 39.23 | 31.9% |
| Meal Residue | 9.45 | 14.84 | |
| PPC-1 | 6.417 | 64.99 | 22.6% |
| PPC-2 | 0.841 | 86.99 | |
| SPI | 1.047 | 97.54 | |

Example 14—Cottonseed (*Gossypium Hirsutum, Gossypium Barbadense*)

Samples for delinted Acala (*G. hirsutum*) and Pima (*G. barbadense*) cottonseed were obtained from Phytogen Seeds, Corcoran Ca. The Acala cotton seed samples included glandless and glanded varieties.

Presscake samples were prepared by extruding whole grain through a small oilseed press (Taby Type 20, Skeppsta Maskin AB, Täby Skeppsta, SE-705 94, Örebro, Sweden). Protein extracts were prepared by homogenizing 40 g aliquots of presscake in 300-320 mLs tap water using a rotor-stator homogenizer at high speed.

The slurry was adjusted to pH11-12 with an aqueous sodium hydroxide solution and stirred for 20 minutes. The slurry was then centrifuged for 5 minutes at 2000 rpm in a centrifuge with a swinging bucket rotor (Beckman J-6). The supernatant solution was filtered through a coarse filter paper (Whatman 113 or Fisherbrand P8) on a Buchner funnel.

The meal pellet was suspended in 150-160 mLs tap water and centrifuged again, and the supernatant filtered and combined with the previous supernatant. The meal residue was dried in a vacuum oven at 60 degrees C. The filtered aqueous solution was centrifuged at 7000 rpm in 200 mL centrifuge bottles in a fixed angle rotor.

The floating emulsion layer was carefully removed with a spatula, and the aqueous layer transferred to a graduated cylinder to determine the total volume. The solution was then placed in a beaker and stirred, and brought to a concentration of 0.15M CaCl2 by the addition of a 2M CaCl2 solution. A solution of 5N HCl was added to bring the pH to 3.4-3.6, and the resulting slurry centrifuged at 7000 rpm for 10 minutes.

The aqueous layer (SPS) was decanted into a flask, and the remaining pellet suspended in 100 mLs deionized water and centrifuged again. The resulting wash solution supernatant was either combined with the SPS solution (Pima cottonseed) or dialyzed against deionized water using 6-8 kd MWCO dialysis tubing and freeze dried (Acala cottonseed).

The wash solutions typically yielded 200-400 mg dry material. The washed PPC pellet was suspended in a minimum volume of deionized water, frozen and lyophilized. The SPS solutions were adjusted to pH 6.5-7 by the addition of 1N NaOH.

The filtered solution was concentrated by ultrafiltration on a 5 kd MWCO membrane system to ~50 mLs, then either dialyzed (Acala cottonseed) against deionized water using 5 kd dialysis tubing, or diafiltered using a 5 kd ultrafiltration membrane. The concentrated diafiltered or dialyzed solution was recovered, centrifuged to remove any precipitate that formed (insoluble isolate protein), then frozen and freeze dried.

The oil content of the PPC-1 protein was determined by exhaustive hexane extraction of an aliquot of freeze dried protein powder. The total N content of the samples were determined by Dumas combustion, and the total protein content calculated as total N×6.25. The product yields are shown in the following tables:

TABLE 27

Glandless Acala Cottonseed

|  | g | % Protein | % Oil |
|---|---|---|---|
| Presscake | 40 | 28.42 | 11.2% |
| Meal Residue | 18.456 | 4.90 |  |
| Protein Concentrate | 7.854 | 77.54 | 13.1% |
| Soluble Protein | 0.639 | 60.37 |  |
| Insoluble Isolate Protein | 0.896 | 101.18 |  |

TABLE 28

Glanded Acala Cottonseed

|  | g | % Protein | % Oil |
|---|---|---|---|
| Presscake | 40 | 32.20 | 14.8% |
| Meal Residue | 15.82 | 9.47 |  |
| Protein Concentrate | 10.969 | 78.39 | 11.0% |
| Soluble Protein | 1.195 | 81.52 |  |
| Insoluble Isolate Protein | 0.216 | 104.02 |  |

TABLE 29

Glanded Pima Cottonseed

|  | g | % Protein | % Oil |
|---|---|---|---|
| Presscake | 40.083 | 30.97 | 17.9% |
| Meal Residue | 18.807 | 9.84 |  |
| Protein Concentrate | 13.203 | 68.03 | 23.9% |
| Soluble Protein | 1.734 | 71.97 |  |
| Insoluble Isolate Protein | 0.893 | 93.78 |  |

Example 15—Soybean (*Glycine Max*)

Commercially produced soybean grain was obtained from a local grower, and was extruded through a small oilseed press (Taby Type 20, Skeppsta Maskin AB, Täby Skeppsta, SE-705 94, Örebro, Sweden) to produce a presscake that contained 43.5% protein (total N×6.25) and 10.3% oil. A 25 g sample of presscake was homogenized in 200 mLs tap water with a rotor-stator homogenizer at high speed, and the resulting slurry adjusted to pH 11.6 with an aqueous sodium hydroxide solution. The homogenate was stirred for 20 minutes and then vacuum filtered through a 250 um mesh plastic screen on a Buchner funnel.

The filter cake was washed with an additional 100 mLs tap water. The filter cake comprising the meal was dried in a vacuum oven at 60 degrees C. The aqueous solution was transferred to centrifuge bottles and centrifuged in a fixed angle rotor at 7000 rpm for 10 minutes. The bottles were uncapped, and the solid emulsion layer carefully removed with a spatula.

The floating emulsion layer was carefully removed with a spatula, and the aqueous layer filtered through a glass fiber filter on a Buchner funnel (Fisherbrand G6 filter), then transferred to a graduated cylinder to determine the total volume before transferring to a beaker with a stir bar. The stirred solution was adjusted to a concentration of 0.15M CaCl2 by addition of a 2M calcium chloride solution. The pH of the solution was then adjusted to pH 3.5 with the addition of 5N HCl.

The solution was transferred to centrifuge bottles and centrifuged at 7000 rpm in a fixed angle rotor for 10 minutes, and the aqueous supernatant decanted into a flask (SPS solution). The solid pellet was resuspended in 100 mLs deionized water and centrifuged again at 7000 rpm for 10 minutes. The supernatant (PPC wash solution) was decanted, dialyzed against deionized water using 5 kd MWCO dialysis tubing, then frozen and freeze dried. Only ~40 mg of dry material was recovered in this wash solution.

The protein pellet was suspended in a minimum amount of deionized water, transferred to a flask, frozen, and freeze dried. The recovered powder was designated as the PPC-1 fraction. The SPS solution was filtered through a 0.45 um membrane filter, and concentrated on by ultrafiltration using a 10 kd MWCO device. After the solution volume had been reduced to ~100 mLs, the solution was dialyzed against several changes of deionized water using a 6-8 kd MWCO dialysis tubing. The dialyzed solution was centrifuged to recover a precipitated protein fraction (SPS-ppt) and both the pellet and supernatant fractions were frozen and freeze dried.

The oil content of the PPC-1 protein was determined by exhaustive hexane extraction of an aliquot of freeze dried protein powder. The total N content of the samples were determined by Dumas combustion, and the total protein content calculated as total N×6.25. The product yields are shown in the following table:

TABLE 30

|  | g | % Protein | % Oil |
|---|---|---|---|
| Presscake | 25.006 | 43.46 | 10.3% |
| Meal Residue | 5.41 | 5.41 |  |
| PPC-1 | 6.772 | 75.81 | 2.4% |
| SPS-ppt | 2.345 | 97.80 |  |
| SPI | 0.441 | 82.21 |  |

Example 16—Protein Profiles in Canola Concentrates and Isolates

In order to characterize the proteins in various canola protein fractions, eight samples were submitted. They were delivered in a solid powder in clear labeled bottles.
 1. 1082-78 SPI Nexera canola soluble extract
 2. 1127-10 SPI Conventional canola soluble extract
 3. 1182-73 SPI *Brassica juncea* soluble extract
 4. 1194-11 SPI *Brassica rapa* concentrate, soluble extract 5. 1082-78 Conc Nexera canola concentrate, defatted insoluble extract 6. 1127-10 Conc Conventional canola concentrate, defatted insoluble extract 7. 1182-73 Conc *Brassica juncea* concentrate, defatted insoluble extract 8. 1194-11 Conc *Brassica rapa* concentrate, defatted insoluble extract The samples 1 through 4 are soluble in conventional buffers; the samples 5 through 8 are not soluble (requiring detergent and/or high concentration urea for solubilization).

The tasks include 1) dissolve samples in an appropriate buffer; 2) SDS PAGE to profile the proteins; 3) identification of major protein components using (a) N-terminal sequencing, (b) MALDI-TOF MS and (c) LC-MS/MS analysis. Due to time constraints, not all the samples will go through all of these analyses. For example, the insoluble samples will not be analyzed by LC-MSMS.

Methods

Sample Preparation.

For soluble SPI samples 5 mg protein each were dissolved in one milliliter of 25 mM $(NH_4)_2CO_3$ buffer (pH 8.0). For the insoluble concentrates 10 mg each was dissolved in 8 M urea, votex and sonicated for 5 min. each. The protein solutions were centrifuged at 12,000 rpm for 10 min. The supernatants were use for all the analysis described below.

SDS Page

See FIGS. 12 and 13. Invitrogen's 12% NuPAGE gels were used for all the SDS gel protein separation. MOPS SDS running buffer was supplied by Invitrogen. Five to 10 ul of protein samples prepared above were typically mixed with SDS sample loading buffer (Invitrogen), boiled for 5 min and loaded to the gel. The electrophoresis is typically performed at constant voltage of 200 V and stopped when the dye front reaches the bottom of the gel. After the electrophoresis the gels were rinsed with distill water once, stained with Coomassie Bue R250 (Bio-Rad) for one hr, destained with gel destaining solution I for one hr and destaining II until the gel background becomes clear. The image of the gel is captured using Bio-Rad's FluorS Max2 system.

Protein in-gel digestion and MALDI analysis. Bands of interest were excised and processed according to typical protocol established in the Proteomics facility. Briefly the bands were destained using 25% acetonitrile, dried using a SpeedVac, digested using trypsin in a ratio of 1:20 (trypsin: protein) over night. The tryptic peptides were extracted and cleaned using C18 ZipTip. The peptides eluted from the Ziptip were mixed with alpha-cyano-hydroxycinnamic acid solution and spotted onto stainless MALDI sample plate. Voyager DE Pro instrument was used for MALDI analysis.

Protein reduction and alkylation for LC-MSMS analysis. Only the soluble samples were treated for this analysis. One hundred microliter of each protein sample were diluted with 8 M urea and 1M $(NH_4)_2CO_3$ (pH 10.8) to a final concentration of 1 M urea and 50 mM $(NH_4)_2CO_3$ in a final volume of 200 ul. One hundred microliter of reduction/alkylation cocktail (97.5% acetonitrile, 2% iodoethanol and 0.5% triethylphosphine) was added to each sample vile. The reduction and alkylation were carried out at 37° C. for one hr. The protein samples were then dried using a SpeedVac, reconstituted with 200 ul of 25 mM $(NH_4)_2CO_3$ (pH 8.2) containing 10 ug of sequencing grade trypsin. The trypsin digestion is performed at 37° C. overnight. The digestion was stopped by adding 20 ul of formic acid, centrifuged before submitted to LC-MS/MS analysis.

LC-MS/MS analysis. Tryptic digests of the canola protein extracts were analyzed by LC-MS with data dependent MS2 designed to generate peptide sequence spectra for database searching. HPLC separation of the peptides was carried out using a capillary column (HyperSil Gold, Thermo, 50 mm×0.32 mm dia, 1.9 um particle size) operated at 40 uL/min, 70 C. An extended shallow solvent of water: acetonitrile containing 0.05% formic acid was used to maximize separation of peptides in the complex digest. Analysis was carried out using a linear ion trap mass spectrometer (LTQ, Thermo Scientific) programmed to automatically generate MS2 sequence spectra on the top 5 most abundant ions observed. The resulting data files were searched using the Mascot search algorithm using a database of *Brassica* protein sequences described below.

N-terminal sequencing. For N-terminal sequencing proteins were first separated by SDS PAGE as described above. The gels were rinsed with distilled water once, sandwiched into a Western blot apparatus (Bio-Rad). Proteins in the gels were blotted onto PVDF membrane following the protocol established in proteomics lab. After the transfer the membrane is rinsed with distilled water once, stained with Coomessie Blue for 5 seconds, destained with water until the background is clear. The bands of interest are removed from membrane, send to Procise Protein Sequencer for sequencing.

Database searching and data analysis. The protein sequence database was constructed using sequences obtained from PlantGDB (website plantgdb.org), NCBI (website ncbi.nih.gov) and Brassic ASTRA (website hornbill.cspp.latrobe.edu.au). The sequences from PlantGDB and ASTRA are EST assembly. The redundant sequences (98% identity) between PlantGDB and ASTRA were removed from the collection. The remaining unique sequences were combined with NCBI *Brassica* sequences, installed to Mascot search engine for database search.

The LC-MS/MS and MALDI data were sent to Mascot search engine for protein identification. The search results were exported to Excel sheets. Most of the sequences in the newly constructed protein database do not have a functional description. For the hit proteins without functional description a blast search of these sequences against NCBI NR database was performed. The description of top hit from the Blast search was assigned to the protein in the new database.

Protein identification. N-terminal sequences of proteins in soluble extracts. (note xx_nn denotes the sample name and estimated molecular weight of the protein)

| | | |
|---|---|---|
| 1. | br_36 | PAGPF |
| 2. | br_32 | PAGPFRIK |
| 3. | br_25 | mixture |
| 4. | br_23 | mixture |
| 5. | br_18 | DEYGNPI (not identified) |
| 6. | br_16 | PAGPFRIPKXR napin |
| 7. | bj_11 | PQGPQQRPPLLL |
| 8. | bj_9 | PAGPFRIPX |
| 9. | nc_16 | PAGPFRIP |
| 10. | nc_16 | PQGPQQR |

The following Genbank sequence contains a PAGPFRIP-KxR fragment:
LOCUS P09893 186 aa linear PLN 1 May 2007
DEFINITION Napin embryo-specific precursor (1.7S seed storage protein)
[Contains: Napin embryo-specific small chain; Napin embryo-specific large chain].
ACCESSION P09893
VERSION P09893 GI:112747
DBSOURCE swissprot: locus 2SSE_BRANA, accession P09893;
The following sequence in Genbank contains a PQG-PQQRPPLL fragment:
LOCUS AAA81909 180 aa linear PLN 28 Nov. 1995
DEFINITION napin.
ACCESSION AAA81909
VERSION AAA81909.1 GI:468022
N-Terminal Sequences of Proteins in Insoluble Extracts

```
1. Nc_26          RQSLGVPPQLGN
``` matches 11S *B. napus* cruciferin sequence
LOCUS AAK07609 489 aa linear PLN 13 Feb. 2001
DEFINITION cruciferin subunit [*Brassica napus*].
ACCESSION AAK07609
VERSION AAK07609.1 GI:12751302
Protein Identification by MALDI-TOF.

TABLE 31

Soluble proteins identified by MALDI-TOF:

| Bj | br | nc | bn | Protein ID and description |
|---|---|---|---|---|
| bj_9 | br_9 | nc_9 | cc_9 | napin storage protein (by N-term sequence) |
| bj_11 | br_11 | nc_11 | cc_11 | napin storage protein (by N-term sequence |
|  | br_23 | nc_23 | cc_23 | gi\|112740 Napin-2 precursor (1.7S seed storage protein) [Contains: Napin-2 small chain; Napin-2 large chain] |
| bj_30 | br_30 | nc_30 |  | gi\|56605421 group 3 late embryogenesis abundant protein [*Brassica napus*] |

TABLE 32

Insoluble proteins identified by MALDI-TOF:

| bj_i | br_i | nc_i | bn_i | Protein ID and description |
|---|---|---|---|---|
| bj_i_20 | br_i_20 | nc_i_20 | cc_i_20 | g\|461841 CRU4_BRANA Cruciferin CRU4 precursor (11S globulin) (12S storage protein) |
| bj_i_26 | br_i_26 | nc_i_26 | cc_i_26 | gi\|12751302 cruciferin subunit [*Brassica napus*] |
|  |  | nc_i_30 | cc_i_30 | gi\|461840 CRU3_BRANA Cruciferin CRU1 precursor (11S globulin) (12S storage protein) |
|  | br_i_33 |  |  | gi\|1345841 CRU2_BRANA Cruciferin BnC2 precursor (11S globulin) (12S storage protein) [Contains: Cruciferin BnC |
|  | br_i_34 |  |  | gi\|461840 CRU3_BRANA Cruciferin CRU1 precursor (11S globulin) (12S storage protein) |
| bj_i_35 | br_i_35 | nc_i_35 |  | gi\|12751302 cruciferin subunit [*Brassica napus*] |
|  |  | nc_i_37 |  | gi\|18402593\|ref\|NP_566660.1\|meprin and TRAF homology domain-... |
|  | br_i_53 | nc_i_53 | cc_i_53 | gi\|12751302 cruciferin subunit [*Brassica napus*] |

(note, these cruciferin sequences are very homologous, the MALDI data do not differentiate the different cruciferin sequences. But all except one show their identity to cruciferins)

Protein identification by LC-MS/MS. Several additional BLAST searches were also conducted as reported below. The rank denotes the confidence levels of protein identification. Proteins with high ranks tend to have better peptide coverage. There is a positive correlation between raking and abundance.

TABLE 33

Proteins found in soluble Nexera canola sample:

| Rank | Prot_acc | Genbank Acc_ID and description |
|---|---|---|
| 1 | Bn_42948915 | gi\|112742\|sp\|P17333\|2SS4_BRANA Napin precursor (1.7S seed storage protein) [Contains: Napin small chain; Napin large chain] |
| 2 | Bn_44648911 | gi\|1699236\|gb\|AAB37414.1\|napin large chain L1B = calmodulin antagonist/calcium-dependent protein kinase substrate [*Brassica napus* = kohirabi, rapifera, seeds, Peptide, 88 aa] |
| 3 | Bn_45648908 | gi\|112742\|sp\|P17333\|2SS4_BRANA Napin precursor (1.7S seed storage protein) [Contains: Napin small chain; Napin large chain] |

TABLE 33-continued

Proteins found in soluble Nexera canola sample:

| Rank | Prot_acc | Genbank Acc_ID and description |
|---|---|---|
| 4 | Bn_43448915 | gi|112747|sp|P09893|2SSE_BRANA Napin embryo-specific precursor (1.7S seed storage protein) [Contains: Napin embryo-specific small chain; Napin embryo-specific large chain] |
| 5 | f16_99ol_1as | gi|17878|emb|CAA46783.1|2S storage protein [*Brassica oleracea*] |
| 6 | Bn_45948911 | gi|169694|gb|AAA63470.1|storage protein |
| 7 | Bn_43248916 | gi|112747|sp|P09893|2SSE_BRANA Napin embryo-specific precursor (1.7S seed storage protein) [Contains: Napin embryo-specific small chain; Napin embryo-specific large chain] |
| 8 | Bn_43548909 | gi|112747|sp|P09893|2SSE_BRANA Napin embryo-specific precursor (1.7S seed storage protein) [Contains: Napin embryo-specific small chain; Napin embryo-specific large chain] |
| 9 | Bn_42448917 | gi|112746|sp|P27740|2SSB_BRANA Napin-B precursor (1.7S seed storage protein) [Contains: Napin-B small chain; Napin-B large chain] |
| 10 | Bn_44048909 | gi|169694|gb|AAA63470.1|storage protein |
| 11 | Bn_48527 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 12 | Bn_45548916 | gi|112742|sp|P17333|2SS4_BRANA Napin precursor (1.7S seed storage protein) [Contains: Napin small chain; Napin large chain] |
| 13 | gi|1699238 | gi|1523806|emb|CAA52813.1|2S storage prepropeptide [*Brassica carinata*] |
| 14 | Bn_45048910 | gi|21537070|gb|AAM61411.1|putative sister-chromatide cohesion protein [*Arabidopsis thaliana*] |
| 15 | Bn_48448908 | gi|169698|gb|AAA63472.1|storage protein |
| 16 | Bn_42648911 | gi|112742|sp|P17333|2SS4_BRANA Napin precursor (1.7S seed storage protein) [Contains: Napin small chain; Napin large chain] |
| 17 | Bn_43548908 | gi|112747|sp|P09893|2SSE_BRANA Napin embryo-specific precursor (1.7S seed storage protein) [Contains: Napin embryo-specific small chain; Napin embryo-specific large chain] |
| 18 | Bn_46248913 | gi|349402|gb|AAA32998.1|napin |
| 19 | Bn_45548913 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 20 | Bn_3648913 | gi|112746|sp|P27740|2SSB_BRANA Napin-B precursor (1.7S seed storage protein) [Contains: Napin-B small chain; Napin-B large chain] |
| 21 | Bn_41948914 | gi|112742|sp|P17333|2SS4_BRANA Napin precursor (1.7S seed storage protein) [Contains: Napin small chain; Napin large chain] |
| 22 | Bn_36750 | gi|85539361|emb|CAJ44305.1|rapeseed putative trypsin inhibitor 1 [*Brassica napus*] |
| 23 | Bn_45948914 | gi|112742|sp|P17333|2SS4_BRANA Napin precursor (1.7S seed storage protein) [Contains: Napin small chain; Napin large chain] |
| 24 | gi|26985163 | gi|60593486|pdb|1SM7|A Chain A, Solution Structure Of The Recombinant Pronapin Precursor, Bnib. |
| 25 | Bn_34048917 | |
| 26 | Bn_2122 | gi|15226403|ref|NP_180416.1|cupin family protein [*Arabidopsis thaliana*] |
| 27 | Bn_48348915 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 28 | gi|913407 | gi|913407|gb|AAB33170.1|acyl-binding/lipid-transfer protein isoform III, AB/LTP III [rape, seedlings, Peptide, 92 aa] |
| 29 | Bn_47248911 | gi|1699240|gb|AAB37418.1|napin large chain L2C = calmodulin antagonist/calcium-dependent protein kinase substrate [*Brassica napus* = kohlrabi, rapifera, seeds, Peptide, 91 aa] |
| 30 | Bn_22745 | gi|112746|sp|P27740|2SSB_BRANA Napin-B precursor (1.7S seed storage protein) [Contains: Napin-B small chain; Napin-B large chain] |
| 31 | Bn_34048916 | gi|18403467|ref|NP_566714.1|cupin family protein [*Arabidopsis thaliana*] |
| 32 | Bn_9998 | gi|2465461|gb|AAB72109.1|low molecular weight heat-shock protein [*Brassica rapa*] |
| 33 | Bn_2260 | gi|15238383|ref|NP_196121.1|unknown protein [*Arabidopsis thaliana*] |
| 34 | z68_99na_1bs | gi|1655824|gb|AAC08048.1|myrosinase-binding protein [*Brassica napus*] |
| 35 | Bn_11948911 | gi|30690736|ref|NP_195388.2|cupin family protein [*Arabidopsis thaliana*] |
| 36 | Bn_26048916 | gi|15228768|ref|NP_188888.1|late embryogenesis abundant protein, putative/LEA protein, putative [*Arabidopsis thaliana*] |
| 37 | gi|17805 | gi|17805|emb|CAA40980.1|cruciferin cru4 subunit [*Brassica napus*] |
| 38 | gi|17801 | gi|167136|gb|AAA32989.1|cruciferin precursor |
| 39 | Bn_2853 | gi|34365581|gb|AAQ65102.1|At2g42560 [*Arabidopsis thaliana*] |
| 40 | Bn_32519 | gi|841208|gb|AAB68964.1|trypsin inhibitor propeptide [*Brassica oleracea*] |
| 41 | Bn_32594 | gi|15228768|ref|NP_188888.1|late embryogenesis abundant protein, putative/LEA protein, putative [*Arabidopsis thaliana*] |
| 42 | Bn_2123 | gi|15226403|ref|NP_180416.1|cupin family protein [*Arabidopsis thaliana*] |
| 43 | Bn_1148914 | gi|15228768|ref|NP_188888.1|late embryogenesis abundant protein, putative/LEA protein, putative [*Arabidopsis thaliana*] |
| 44 | Bn_5648911 | gi|18421009|ref|NP_568484.1|meprin and TRAF homology domain-containing protein/MATH domain-containing protein [*Arabidopsis thaliana*] |
| 45 | Bn_28948917 | gi|4115337|gb|AAD03343.1|ubiquitin [*Pisum sativum*] |
| 46 | Bn_6020 | gi|45597904|emb|CAG15244.1|putative trypsin inhibitor I2 [*Arabidopsis lyrata* subsp. *petraea*] |

TABLE 33-continued

Proteins found in soluble Nexera canola sample:

| Rank | Prot_acc | Genbank Acc_ID and description |
|---|---|---|
| 47 | Bn_20171 | gi|22328929|ref|NP_194288.2|stress-responsive protein-related [*Arabidopsis thaliana*] |
| 48 | Bn_18681 | gi|15234781|ref|NP_195585.1|ROC1 (rotamase CyP 1); peptidyl-prolyl cis-trans isomerase [*Arabidopsis thaliana*] |
| 49 | Bn_22010 | gi|7381260|gb|AAF61460.1|AF139817_1 peroxiredoxin antioxidant [*Brassica napus*] |
| 50 | Bn_33336 | gi|16071|emb|CAA48140.1|ubiquitin [*Antirrhinum majus*] |
| 51 | Bn_45435 | gi|802164|gb|AAB33005.1|crambin precursor = thionin variant Thi2Ca3 [*Crambe abyssinica*, seeds, Peptide Partial, 133 aa] |
| 52 | b69_99na_1bs | gi|1345840|sp|P33523|CRU1_BRANA Cruciferin BnC1 precursor (11S globulin) (12S storage protein) [Contains: Cruciferin BnC1 subunit alpha; Cruciferin BnC1 subunit beta] |
| 53 | Bn_819 | gi|15230652|ref|NP_187902.1|unknown protein [*Arabidopsis thaliana*] |
| 54 | Bn_11308 | gi|3335171|gb|AAC27073.1|embryo-specific protein 3 [*Arabidopsis thaliana*] |
| 55 | Bn_35980 | gi|79410716|ref|NP_188775.2|unknown protein [*Arabidopsis thaliana*] |
| 56 | Bn_39283 | gi|3335171|gb|AAC27073.1|embryo-specific protein 3 [*Arabidopsis thaliana*] |
| 57 | Bn_30522 | gi|15242474|ref|NP_199381.1|unknown protein [*Arabidopsis thaliana*] |
| 58 | Bn_12443 | gi|21618084|gb|AAM67134.1|glutaredoxin-like protein [*Arabidopsis thaliana*] |
| 59 | Bn_21389 | gi|30687521|ref|NP_849696.1|ATPDIL1-1 (PDI-LIKE 1-1); protein disulfide isomerase [*Arabidopsis thaliana*] |
| 60 | Bn_18653 | gi|18421006|ref|NP_568483.1|meprin and TRAF homology domain-containing protein/MATH domain-containing protein [*Arabidopsis thaliana*] |
| 61 | Bn_23435 | gi|134105056|pdb|2O66|A Chain A, Crystal Structure Of *Arabidopsis Thaliana* Pii Bound To Citrate |
| 62 | Bn_39560a | gi|30914537|sp||P24565_2 [Segment 2 of 2] Napin-1A (Napin Bnla) [Contains: Napin-1A small chain; Napin-1A large chain] |
| 63 | Bn_24951 | gi|122939101|gb|ABM69132.1|lipid transfer protein precursor [*Brassica rapa* subsp. *pekinensis*] |
| 64 | Bn_15915 | gi|15231736|ref|NP_190872.1|late embryogenesis abundant protein, putative/LEA protein, putative [*Arabidopsis thaliana*] |
| 65 | gi|7488516 | #N/A |
| 66 | Bn_39491 | gi|18391081|ref|NP_563856.1|histidine acid phosphatase family protein [*Arabidopsis thaliana*] |
| 67 | Bn_43731 | gi|33284990|dbj|BAC80213.1|cruciferin [*Brassica napus*] |
| 68 | Bn_3292 | gi|77999357|gb|ABB17025.1|protein disulfide isomerase [*Brassica carinata*] |
| 69 | Bn_27350 | gi|79330664|ref|NP_001032061.1|RD29B (RESPONSIVE TO DESSICATION 29B) [*Arabidopsis thaliana*] |
| 70 | Bn_30457 | gi|18413362|ref|NP_567364.1|unknown protein [*Arabidopsis thaliana*] |
| 71 | Bn_13624 | gi|30686478|ref|NP_850250.1|unknown protein [*Arabidopsis thaliana*] |

TABLE 34

Proteins found in soluble *Brassica Juncea* sample

| Rank | Prot_acc | NCBI Acc_ID and description |
|---|---|---|
| 1 | gi|32363444 | gi|1009436|emb|CAA62910.1|allergen sin a 1.0105 [*Sinapis alba*] |
| 2 | Bn_45848916 | gi|112747|sp|P09893|2SSE_BRANA Napin embryo-specific precursor (1.7S seed storage protein) [Contains: Napin embryo-specific small chain; Napin embryo-specific large chain] |
| 3 | Bn_45448917 | gi|169698|gb|AAA63472.1|storage protein |
| 4 | Bn_43248916 | gi|112747|sp|P09893|2SSE_BRANA Napin embryo-specific precursor (1.7S seed storage protein) [Contains: Napin embryo-specific small chain; Napin embryo-specific large chain] |
| 5 | Bn_43548909 | gi|112747|sp|P09893|2SSE_BRANA Napin embryo-specific precursor (1.7S seed storage protein) [Contains: Napin embryo-specific small chain; Napin embryo-specific large chain] |
| 6 | Bn_44648911 | gi|1699236|gb|AAB37414.1|napin large chain L1B = calmodulin antagonist/calcium-dependent protein kinase substrate [*Brassica napus* = kohlrabi, rapifera, seeds, Peptide, 88 aa] |
| 7 | gi|1699240 | gi|1699240|gb|AAB37418.1|napin large chain L2C = calmodulin antagonist/calcium-dependent protein kinase substrate [*Brassica napus* = kohlrabi, rapifera, seeds, Peptide, 91 aa] |
| 8 | b05_99ni_1as | gi|17728|emb|CAA46784.1|2S storage protein [*Brassica nigra*] |
| 9 | Bn_47248913 | gi|112742|sp|P17333|2SS4_BRANA Napin precursor (1.7S seed storage protein) [Contains: Napin small chain; Napin large chain] |
| 10 | Bn_45548911 | gi|17805|emb|CAA40980.1|cruciferin cru4 subunit [*Brassica napus*] |
| 11 | Bn_45248916 | gi|1699240|gb|AAB37418.1|napin large chain L2C = calmodulin antagonist/calcium-dependent protein kinase substrate [*Brassica napus* = kohlrabi, rapifera, seeds, Peptide, 91 aa] |
| 12 | Bn_48527 | gi|108935945|sp|P80208_2 [Segment 2 of 2] Napin-3 (Napin BnIII) (Napin nIII) (1.7S seed storage protein) [Contains: Napin-3 small chain; Napin-3 large chain] |

TABLE 34-continued

Proteins found in soluble *Brassica Juncea* sample

| Rank | Prot_acc | NCBI Acc_ID and description |
|---|---|---|
| 13 | gi\|75107016 | gi\|112742\|sp\|P17333\|2SS4_BRANA Napin precursor (1.7S seed storage protein) [Contains: Napin small chain; Napin large chain] |
| 14 | Bn_42248917 | gi\|112742\|sp\|P17333\|2SS4_BRANA Napin precursor (1.7S seed storage protein) [Contains: Napin small chain; Napin large chain] |
| 15 | Bn_47448908 | gi\|112747\|sp\|P09893\|2SSE_BRANA Napin embryo-specific precursor (1.7S seed storage protein) [Contains: Napin embryo-specific small chain; Napin embryo-specific large chain] |
| 16 | gi\|913407 | gi\|913407\|gb\|AAB33170.1\|acyl-binding/lipid-transfer protein isoform III, AB/LTP III [rape, seedlings, Peptide, 92 aa] |
| 17 | Bn_45048910 | gi\|21537070\|gb\|AAM61411.1\|putative sister-chromatide cohesion protein [*Arabidopsis thaliana*] |
| 18 | Bn_42648911 | gi\|112742\|sp\|P17333\|2SS4_BRANA Napin precursor (1.7S seed storage protein) [Contains: Napin small chain; Napin large chain] |
| 19 | Bn_45048914 | gi\|12751302\|gb\|AAK07609.1\|AF319771_1 cruciferin subunit [*Brassica napus*] |
| 20 | Bn_6020 | gi\|45597904\|emb\|CAG15244.1\|putative-trypsin inhibitor I2 [*Arabidopsis lyrata* subsp. *petraea*] |
| 21 | Bn_2122 | gi\|15226403\|ref\|NP_180416.1\|cupin family protein [*Arabidopsis thaliana*] |
| 22 | Bn_28948917 | gi\|4115337\|gb\|AAD03343.1\|ubiquitin [*Pisum sativum*] |
| 23 | gi\|17801 | gi\|167136\|gb\|AAA32989.1\|cruciferin precursor |
| 24 | Bn_32593 | gi\|15228768\|ref\|NP_188888.1\|late embryogenesis abundant protein, putative/LEA protein, putative [*Arabidopsis thaliana*] |
| 25 | Bn_19932 | gi\|30690736\|ref\|NP_195388.2\|cupin family protein [*Arabidopsis thaliana*] |
| 26 | Bn_26048916 | gi\|15228768\|ref\|NP_188888.1\|late embryogenesis abundant protein, putative/LEA protein, putative [*Arabidopsis thaliana*] |
| 27 | Bn_28348914 | gi\|15231736\|ref\|NP_190872.1\|late embryogenesis abundant protein, putative/LEA protein, putative [*Arabidopsis thaliana*] |
| 28 | Bn_20171 | gi\|22328929\|ref\|NP_194288.2\|stress-responsive protein-related [*Arabidopsis thaliana*] |
| 29 | Bn_45259 | gi\|28393457\|gb\|AAO42150.1\|unknown protein [*Arabidopsis thaliana*] |
| 30 | Bn_45435 | gi\|802164\|gb\|AAB33005.1\|crambin precursor = thionin variant Thi2Ca3 [*Crambe abyssinica*, seeds, Peptide Partial, 133 aa] |
| 31 | Bn_1148914 | gi\|15228768\|ref\|NP_188888.1\|late embryogenesis abundant protein, putative/LEA protein, putative [*Arabidopsis thaliana*] |
| 32 | Bn_9998 | gi\|2465461\|gb\|AAB72109.1\|low molecular weight heat-shock protein [*Brassica rapa*] |
| 33 | gi\|17805 | gi\|17805\|emb\|CAA40980.1\|cruciferin cru4 subunit [*Brassica napus*] |
| 34 | Bn_11948911 | gi\|30690736\|ref\|NP_195388.2\|cupin family protein [*Arabidopsis thaliana*] |
| 35 | Bn_1634 | gi\|125605727\|gb\|EAZ44763.1\|hypothetical protein OsJ_028246 [*Oryza sativa* (*japonica cultivar*-group)] |
| 36 | d39_99ra_1bs | gi\|111218906\|gb\|ABH08754.1\|ubiquitin [*Arabidopsis thaliana*] |
| 37 | Bn_3726 | gi\|30690736\|ref\|NP_195388.2\|cupin family protein [*Arabidopsis thaliana*] |
| 38 | Bn_34048916 | gi\|18403467\|ref\|NP_566714.1\|cupin family protein [*Arabidopsis thaliana*] |
| 39 | Bn_5648911 | gi\|18421009\|ref\|NP_568484.1\|meprin and TRAF homology domain-containing protein/MATH domain-containing protein [*Arabidopsis thaliana*] |
| 40 | Bn_36750 | gi\|85539361\|emb\|CAJ44305.1\|rapeseed putative trypsin inhibitor 1 [*Brassica napus*] |
| 41 | Bn_16580 | gi\|18404883\|ref\|NP_030435.1\|protease inhibitor, putative [*Arabidopsis thaliana*] |
| 42 | Bn_46748915 | gi\|17807\|emb\|CAA40978.1\|cruciferin cru4 subunit [*Brassica napus*] |
| 43 | Bn_32519 | gi\|841208\|gb\|AAB68964.1\|trypsin inhibtor propeptide [*Brassica oleracea*] |
| 44 | Bn_26205 | gi\|18400173\|ref\|NP_565548.1\|unknown protein [*Arabidopsis thaliana*] |
| 45 | Bn_819 | gi\|15230652\|ref\|NP_187902.1\|unknown protein [*Arabidopsis thaliana*] |
| 46 | Bn_24926 | gi\|30698182\|ref\|NP_851278.1\|senescence-associated family protein [*Arabidopsis thaliana*] |
| 47 | Bn_2260 | gi\|15238383\|ref\|NP_196121.1\|unknown protein [*Arabidopsis thaliana*] |
| 48 | Bn_12443 | gi\|21618084\|gb\|AAM67134.1\|glutaredoxin-like protein [*Arabidopsis thaliana*] |
| 49 | Bn_24386 | gi\|18399803\|ref\|NP_565518.1\|unknown protein [*Arabidopsis thaliana*] |
| 50 | z68_99na_1bs | gi\|1655824\|gb\|AAC08048.1\|myrosinase-binding protein [*Brassica napus*] |
| 51 | Bn_6909 | gi\|15228014\|ref\|NP_181202.1\|ATECP63 (EMBRYONIC CELL PROTEIN 63) [*Arabidopsis thaliana*] |
| 52 | Bn_41548912 | gi\|17805\|emb\|CAA40980.1\|cruciferin cru4 subunit [*Brassica napus*] |
| 53 | u55_99ra_1as | gi\|61211685\|sp\|Q9LEZ3\|BIM1_ARATH Transcription factor BIM1 (BES1-interacting Myc-like protein 1) (Transcription factor EN 126) (Basic helix-loop-helix protein 46) (bHLH 46) (AtbHLH046) |
| 54 | Bn_47869 | gi\|15222937\|ref\|NP_172827.1\|CYP78A5 (cytochrome P450, family 78, subfamily A, polypeptide 5); oxygen binding [*Arabidopsis thaliana*] |

TABLE 35

Proteins found in soluble *Brassica napus* sample

| Rank | Prot_acc | GI_ID |
|---|---|---|
| 1 | Bn_42948915 | gi\|112742\|sp\|P17333\|2SS4_BRANA Napin precursor (1.7S seed storage protein) [Contains: Napin small chain; Napin large chain] |

TABLE 35-continued

Proteins found in soluble *Brassica napus* sample

| Rank | Prot_acc | GI_ID |
|---|---|---|
| 2 | Bn_44648911 | gi|1699236|gb|AAB37414.1|napin large chain L1B = calmodulin antagonist/calcium-dependent protein kinase substrate [*Brassica napus* = kohlrabi, rapifera, seeds, Peptide, 88 aa] |
| 3 | Bn_43448915 | gi|112747|sp|P09893|2SSE_BRANA Napin embryo-specific precursor (1.7S seed storage protein) [Contains: Napin embryo-specific small chain; Napin embryo-specific large chain] |
| 4 | f16_99ol_1as | gi|17878|emb|CAA46783.1|2S storage protein [*Brassica oleracea*] |
| 5 | Bn_45648908 | gi|112742|sp|P17333|2SS4_BRANA Napin precursor (1.7S seed storage protein) [Contains: Napin small chain; Napin large chain] |
| 6 | Bn_45348914 | gi|468018|gb|AAA81907.1|napin |
| 7 | Bn_46048913 | gi|112742|sp|P17333|2SS4_BRANA Napin precursor (1.7S seed storage protein) [Contains: Napin small chain; Napin large chain] |
| 8 | Bn_42448917 | gi|112746|sp|P27740|2SSB_BRANA Napin-B precursor (1.7S seed storage protein) [Contains: Napin-B small chain; Napin-B large chain] |
| 9 | Bn_43248916 | gi|112747|sp|P09893|2SSE_BRANA Napin embryo-specific precursor (1.7S seed storage protein) [Contains: Napin embryo-specific small chain; Napin embryo-specific large chain] |
| 10 | Bn_43548909 | gi|112747|sp|P09893|2SSE_BRANA Napin embryo-specific precursor (1.7S seed storage protein) [Contains: Napin embryo-specific small chain; Napin embryo-specific large chain] |
| 11 | Bn_48248913 | gi|112747|sp|P09893|2SSE_BRANA Napin embryo-specific precursor (1.7S seed storage protein) [Contains: Napin embryo-specific small chain; Napin embryo-specific large chain] |
| 12 | Bn_45948911 | gi|169694|gb|AAA63470.1|storage protein |
| 13 | Bn_44048909 | gi|169694|gb|AAA63470.1|storage protein |
| 14 | gi|1699238 | gi|1523806|emb|CAA52813.1|2S storage prepropeptide [*Brassica carinata*] |
| 15 | Bn_22745 | gi|112746|sp|P27740|2SSB_BRANA Napin-B precursor (1.7S seed storage protein) [Contains: Napin-B small chain; Napin-B large chain] |
| 16 | Bn_45048910 | gi|21537070|gb|AAM61411.1|putative sister-chromatide cohesion protein [*Arabidopsis thaliana*] |
| 17 | Bn_48527 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 18 | Bn_41948914 | gi|112742|sp|P17333|2SS4_BRANA Napin precursor (1.7S seed storage protein) [Contains: Napin small chain; Napin large chain] |
| 19 | Bn_42648911 | gi|112742|sp|P17333|2SS4_BRANA Napin precursor (1.7S seed storage protein) [Contains: Napin small chain; Napin large chain] |
| 20 | Bn_3648913 | gi|112746|sp|P27740|2SSB_BRANA Napin-B precursor (1.7S seed storage protein) [Contains: Napin-B small chain; Napin-B large chain] |
| 21 | Bn_45948914 | gi|112742|sp|P17333|2SS4_BRANA Napin precursor (1.7S seed storage protein) [Contains: Napin small chain; Napin large chain] |
| 22 | gi|913407 | gi|913407|gb|AAB33170.1|acyl-binding/lipid-transfer protein isoform III, AB/LTP III [rape, seedlings, Peptide, 92 aa] |
| 23 | Bn_48348915 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 24 | Bn_11948911 | gi|30690736|ref|NP_195388.2| cupin family protein [*Arabidopsis thaliana*] |
| 25 | Bn_48448908 | gi|169698|gb|AAA63472.1|storage protein |
| 26 | Bn_46548910 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 27 | Bn_46248913 | gi|349402|gb|AAA32998.1|napin |
| 28 | Bn_2122 | gi|15226403|ref|NP_180416.1|cupin family protein [*Arabidopsis thaliana*] |
| 29 | Bn_3726 | gi|30690736|ref|NP_195388.2|cupin family protein [*Arabidopsis thaliana*] |
| 30 | Bn_34048917 | #N/A |
| 31 | Bn_45259 | gi|28393457|gb|AAO42150.1|unknown protein [*Arabidopsis thaliana*] |
| 32 | Bn_28948917 | gi|4115337|gb|AAD03343.1|ubiquitin [*Pisum sativum*] |
| 33 | Bn_36750 | gi|85539361|emb|CAJ44305.1|rapeseed putative trypsin inhibitor 1 [*Brassica napus*] |
| 34 | Bn_32593 | gi|15228768|ref|NP_188888.1|late embryogenesis abundant protein, putative/ LEA protein, putative [*Arabidopsis thaliana*] |
| 35 | Bn_47248911 | gi|1699240|gb|AAB37418.1|napin large chain L2C = calmodulin antagonist/calcium-dependent protein kinase substrate [*Brassica napus* = kohlrabi, rapifera, seeds, Peptide, 91 aa] |
| 36 | Bn_6020 | gi|45597904|emb|CAG15244.1|putative trypsin inhibitor 12 [*Arabidopsis lyrata* subsp. *petraea*] |
| 37 | Bn_2260 | gi|15238383|ref|NP_196121.1|unknown protein [*Arabidopsis thaliana*] |
| 38 | z68_99na_1bs | gi|1655824|gb|AAC08048.1|myrosinase-binding protein [*Brassica napus*] |
| 39 | Bn_32519 | gi|841208|gb|AAB68964.1|trypsin inhibitor propeptide [*Brassica oleracea*] |
| 40 | Bn_5648911 | gi|18421009|ref|NP_568484.1|meprin and TRAF homology domain-containing protein/MATH domain-containing protein [*Arabidopsis thaliana*] |
| 41 | Bn_43624 | gi|15234781|ref|NP_195585.1|ROC1 (rotamase CyP 1); peptidyl-prolyl cis-trans isomerase [*Arabidopsis thaliana*] |
| 42 | Bn_34048916 | gi|18403467|ref|NP_566714.1|cupin family protein [*Arabidopsis thaliana*] |
| 43 | Bn_45435 | gi|802164|gb|AAB33005.1|crambin precursor = thionin variant Thi2Ca3 [*Crambe abyssinica*, seeds, Peptide Partial, 133 aa] |
| 44 | Bn_18653 | gi|18421006|ref|NP_568483.1|meprin and TRAF homology domain-containing protein/MATH domain-containing protein [*Arabidopsis thaliana*] |

TABLE 35-continued

Proteins found in soluble *Brassica napus* sample

| Rank | Prot_acc | GI_ID |
|---|---|---|
| 45 | Bn_42348911 | gi|1699240|gb|AAB37418.1|napin large chain L2C = calmodulin antagonist/calcium-dependent protein kinase substrate [*Brassica napus* = kohlrabi, rapifera, seeds, Peptide, 91 aa] |
| 46 | Bn_6459 | gi|27373045|gb|AA012209.1|thaumatin-like cytokinin-binding protein [*Brassica oleracea*] |
| 47 | Bn_14224 | gi|15218740|ref|NP_171821.1|extracellular dermal glycoprotein, putative/ EDGP, putative [*Arabidopsis thaliana*] |
| 48 | Bn_1148914 | gi|15228768|ref|NP_188888.1|late embryogenesis abundant protein, putative/ LEA protein, putative [*Arabidopsis thaliana*] |
| 49 | Bn_26457 | gi|79410716|ref|NP_188775.2|unknown protein [*Arabidopsis thaliana*] |
| 50 | d74_99na_1as | gi|15234637|ref|NP_192427.1|PSBQ/PSBQ-2 (photosystem II subunit Q-2); calcium ion binding [*Arabidopsis thaliana*] |
| 51 | Bn_2853 | gi|34365581|gb|AAQ65102.1|At2g42560 [*Arabidopsis thaliana*] |
| 52 | Bn_11720 | gi|15230476|ref|NP_187845.1|nascent polypeptide associated complex alpha chain protein, putative/alpha-NAC, putative [*Arabidopsis thaliana*] |
| 53 | Bn_22010 | gi|7381260|gb|AAF61460.1|AF139817_1 peroxiredoxin antioxidant [*Brassica napus*] |
| 54 | Bn_15468 | gi|15242674|ref|NP_198853.1|glutaredoxin, putative [*Arabidopsis thaliana*] |
| 55 | d71_99ol_1as | gi|8250119|emb|CAB93512.1|HSP17.7-a protein [*Brassica oleracea* var. alboglabra] |
| 56 | Bn_811 | gi|15233587|ref|NP_193860.1|PSBQ/PSBQ-1/PSBQA; calcium ion binding [*Arabidopsis thaliana*] |
| 57 | gi|17805 | gi|17805|emb|CAA40980.1|cruciferin cru4 subunit [*Brassica napus*] |
| 58 | gi|17801 | gi|167136|gb|AAA32989.1|cruciferin precursor |
| 59 | Bn_11948910 | gi|30690736|ref|NP_195388.2|cupin family protein [*Arabidopsis thaliana*] |
| 60 | Bn_5307 | gi|27754300|gb|AAO22603.1|putative cysteine proteinase inhibitor [*Arabidopsis thaliana*] |
| 61 | Bn_39560a | gi|30914537|sp||P24565_2 [Segment 2 of 2] Napin-1A (Napin Bnla) [Contains: Napin-1A small chain; Napin-1A large chain] |
| 62 | gi|228365 | gi|30914536|sp||P24565_1 [Segment 1 of 2] Napin-1A (Napin Bnla) [Contains: Napin-1A small chain; Napin-1A large chain] |
| 63 | Bn_220 | gi|30683369|ref|NP_850097.1|CAM2 (CALMODULIN-2); calcium ion binding [*Arabidopsis thaliana*] |
| 64 | Bn_819 | gi|15230652|ref|NP_187902.1|unknown protein [*Arabidopsis thaliana*] |
| 65 | Bn_23435 | gi|134105056|pdb|2O66|A Chain A, Crystal Structure Of *Arabidopsis Thaliana* Pii Bound To Citrate |
| 66 | Bn_11308 | gi|3335171|gb|AAC27073.1|embryo-specific protein 3 [*Arabidopsis thaliana*] |
| 67 | Bn_15915 | gi|15231736|ref|NP_190872.1|late embryogenesis abundant protein, putative/ LEA protein, putative [*Arabidopsis thaliana*] |
| 68 | Bn_19126 | gi|18076088|emb|CAC80550.1|cyclophilin [*Ricinus communis*] |
| 69 | Bn_39283 | gi|3335171|gb|AAC27073.1|embryo-specific protein 3 [*Arabidopsis thaliana*] |
| 70 | i44_99ra_1bs | gi|15229872|ref|NP_189996.1|MD-2-related lipid recognition domain-containing protein/ML domain-containing protein [*Arabidopsis thaliana*] |
| 71 | Bn_12443 | gi|21618084|gb|AAM67134.1|glutaredoxin-like protein [*Arabidopsis thaliana*] |
| 72 | Bn_27350 | gi|79330664|ref|NP_001032061.1|RD29B (RESPONSIVE TO DESSICATION 29B) [*Arabidopsis thaliana*] |
| 73 | gi|7488516 | |
| 74 | Bn_30948913 | gi|32395581|gb|AAP37972.1|seed specific protein Bn15033A [*Brassica napus*] |
| 75 | b69_99na_1bs | gi|1345840|sp|P33523|CRU1_BRANA Cruciferin BnC1 precursor (11S globulin) (12S storage protein) [Contains: Cruciferin BnC1 subunit alpha; Cruciferin BnC1 subunit beta] |
| 76 | o85_99ra_1bs | gi|21593447|gb|AAM65414.1|40S ribosomal protein S17-like [*Arabidopsis thaliana*] |
| 77 | Bn_27148913 | gi|110738350|dbj|BAF01102.1|putative proline-rich protein [*Arabidopsis thaliana*] |
| 78 | Bn_30002 | gi|32395573|gb|AAP37968.1|seed specific protein Bn15D12A [*Brassica napus*] |
| 79 | Bn_15146 | gi|2305111|gb|AAD05576.1|Cu/Zn superoxide dismutase [*Raphanus sativus*] |
| 80 | Bn_37873 | gi|15228048|ref|NP_181225.1|MAT3 (METHIONINE ADENOSYLTRANSFERASE 3); methionine adenosyltransferase [*Arabidopsis thaliana*] |

TABLE 36

Proteins found in soluble *Brassica rapa* sample

| Rank | Prot_acc | NCBI Acc_ID and description |
|---|---|---|
| 1 | Bn_42948915 | gi|112742|sp|P17333|2SS4_BRANA Napin precursor (1.7S seed storage protein) [Contains: Napin small chain; Napin large chain] |
| 2 | Bn_44648911 | gi|1699236|gb|AAB37414.1|napin large chain L1B = calmodulin antagonist/calcium-dependent protein kinase substrate [*Brassica napus* = kohlrabi, rapifera, seeds, Peptide, 88 aa] |
| 3 | Bn_44048909 | gi|169694|gb|AAA63470.1|storage protein |

TABLE 36-continued

Proteins found in soluble *Brassica rapa* sample

| Rank | Prot_acc | NCBI Acc_ID and description |
|---|---|---|
| 4 | Bn_45148917 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 5 | gi|108935945 | gi|112742|sp|P17333|2SS4_BRANA Napin precursor (1.7S seed storage protein) [Contains: Napin small chain; Napin large chain] |
| 6 | Bn_45948911 | gi|169694|gb|AAA63470.1|storage protein |
| 7 | Bn_43448915 | gi|112747|sp|P09893|2SSE_BRANA Napin embryo-specific precursor (1.7S seed storage protein) [Contains: Napin embryo-specific small chain; Napin embryo-specific large chain] |
| 8 | gi|913407 | gi|913407|gb|AAB33170.1|acyl-binding/lipid-transfer protein isoform III, AB/LTP III [rape, seedlings, Peptide, 92 aa] |
| 9 | Bn_45048910 | gi|21537070|gb|AAM61411.1|putative sister-chromatide cohesion protein [*Arabidopsis thaliana*] |
| 10 | Bn_42648911 | gi|112742|sp|P17333|2SS4_BRANA Napin precursor (1.7S seed storage protein) [Contains: Napin small chain; Napin large chain] |
| 11 | gi|17835 | gi|112746|sp|P27740|2SSB_BRANA Napin-B precursor (1.7S seed storage protein) [Contains: Napin-B small chain; Napin-B large chain] |
| 12 | Bn_45948912 | gi|169694|gb|AAA63470.1|storage protein |
| 13 | Bn_45048914 | gi|12751302|gb|AAK07609.1|AF319771_1 cruciferin subunit [*Brassica napus*] |
| 14 | Bn_48348917 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 15 | Bn_47848912 | gi|169694|gb|AAA63470.1|storage protein |
| 16 | Bn_43748917 | gi|15232227|ref|NP_189403.1|OLEO4 (OLEOSIN4) [*Arabidopsis thaliana*] |
| 17 | Bn_48148917 | gi|2494843|sp|Q39366|LGUL_BRAOG Putative lactoylglutathione lyase (Methylglyoxalase) (Aldoketomutase) (Glyoxalase I) (Glx I) (Ketone-aldehyde mutase) (S-D-lactoylglutathione methylglyoxal lyase) |
| 18 | Bn_41948914 | gi|112742|sp|P17333|2SS4_BRANA Napin precursor (1.7S seed storage protein) [Contains: Napin small chain; Napin large chain] |
| 19 | Bn_48448908 | gi|169698|gb|AAA63472.1|storage protein |
| 20 | Bn_48527 | gi|108935945|sp||P80208_2 [Segment 2 of 2] Napin-3 (Napin BnIII) (Napin nIII) (1.7S seed storage protein) [Contains: Napin-3 small chain; Napin-3 large chain] |
| 21 | Bn_2122 | gi|15226403|ref|NP_180416.1|cupin family protein [*Arabidopsis thaliana*] |
| 22 | Bn_43548909 | gi|112747|sp|P09893|2SSE_BRANA Napin embryo-specific precursor (1.7S seed storage protein) [Contains: Napin embryo-specific small chain; Napin embryo-specific large chain] |
| 23 | Bn_32519 | gi|841208|gb|AAB68964.1|trypsin inhibitor propeptide [*Brassica oleracea*] |
| 24 | Bn_22745 | gi|112746|sp|P27740|2SSB_BRANA Napin-B precursor (1.7S seed storage protein) [Contains: Napin-B small chain; Napin-B large chain] |
| 25 | Bn_45948914 | gi|112742|sp|P17333|2SS4_BRANA Napin precursor (1.7S seed storage protein) [Contains: Napin small chain; Napin large chain] |
| 26 | Bn_15248912 | gi|841208|gb|AAB68964.1|trypsin inhibitor propeptide [*Brassica oleracea*] |
| 27 | Bn_2290 | gi|15226403|ref|NP_180416.1|cupin family protein [*Arabidopsis thaliana*] |
| 28 | Bn_3726 | gi|30690736|ref|NP_195388.2|cupin family protein [*Arabidopsis thaliana*] |
| 29 | g04_99ra_1as | gi|2465461|gb|AAB72109.1|low molecular weight heat-shock protein [*Brassica rapa*] |
| 30 | Bn_39283 | gi|3335171|gb|AAC27073.1|embryo-specific protein 3 [*Arabidopsis thaliana*] |
| 31 | Bn_34048917 | |
| 32 | Bn_28948917 | gi|4115337|gb|AAD03343.1|ubiquitin [Pisum sativum] |
| 33 | Bn_40048 | gi|1655824|gb|AAC08048.1|myrosinase-binding protein [*Brassica napus*] |
| 34 | Bn_26048916 | gi|15228768|ref|NP_188888.1|late embryogenesis abundant protein, putative/ LEA protein, putative [*Arabidopsis thaliana*] |
| 35 | Bn_43761 | gi|2494843|sp|Q39366|LGUL_BRAOG Putative lactoylglutathione lyase (Methylglyoxalase) (Aldoketomutase) (Glyoxalase I) (Glx I) (Ketone-aldehyde mutase) (S-D-lactoylglutathione methylglyoxal lyase) |
| 36 | Bn_6020 | gi|45597904|emb|CAG15244.1|putative trypsin inhibitor I2 [Arabidopsis lyrata subsp. *petraea* |
| 37 | Bn_45259 | gi|28393457|gb|AAO42150.1|unknown protein [*Arabidopsis thaliana*] |
| 38 | Bn_20627 | gi|22330379|ref|NP_176419.2|aspartyl protease family protein [*Arabidopsis thaliana*] |
| 39 | Bn_20014 | gi|34539778|gb|AAQ74768.1|dehydrin [*Brassica napus*] |
| 40 | Bn_18653 | gi|18421006|ref|NP_568483.1|meprin and TRAF homology domain-containing protein/MATH domain-containing protein [*Arabidopsis thaliana*] |
| 41 | Bn_33336 | gi|16071|emb|CAA48140.1|ubiquitin [*Antirrhinum majus*] |
| 42 | gi|913408 | gi|913408|gb|AAB33171.1|acyl-binding/lipid-transfer protein isoform II, AB/LTP II [rape, seedlings, Peptide, 93 aa] |
| 43 | Bn_3648913 | gi|112746|sp|P27740|2SSB_BRANA Napin-B precursor (1.7S seed storage protein) [Contains: Napin-B small chain; Napin-B large chain] |
| 44 | Bn_2260 | gi|15238383|ref|NP_196121.1|unknown protein [*Arabidopsis thaliana*] |
| 45 | Bn_26205 | gi|18400173|ref|NP_565548.1|unknown protein [*Arabidopsis thaliana*] |
| 46 | Bn_1148914 | gi|15228768|ref|NP_188888.1|late embryogenesis abundant protein, putative/ LEA protein, putative [*Arabidopsis thaliana*] |
| 47 | Bn_6459 | gi|27373045|gb|AAO12209.1|thaumatin-like cytokinin-binding protein [*Brassica oleracea*] |
| 48 | Bn_32593 | gi|15228768|ref|NP_188888.1|late embryogenesis abundant protein, putative/ LEA protein, putative [*Arabidopsis thaliana*] |
| 49 | d39_99ra_1bs | gi|111218906|gb|ABH08754.1|ubiquitin [*Arabidopsis thaliana*] |

TABLE 36-continued

Proteins found in soluble *Brassica rapa* sample

| Rank | Prot_acc | NCBI Acc_ID and description |
|---|---|---|
| 50 | Bn_22010 | gi|7381260|gb|AAF61460.1|AF139817_1 peroxiredoxin antioxidant [*Brassica napus*] |
| 51 | Bn_220 | gi|30683369|ref|NP_850097.1|CAM2 (CALMODULIN-2); calcium ion binding [*Arabidopsis thaliana*] |
| 52 | Bn_12774 | gi|15221030|ref|NP_173259.1|calcium-binding protein, putative [*Arabidopsis thaliana*] |
| 53 | Bn_1027 | gi|1216389|gb|AAC49181.1|myrosinase-associated protein |
| 54 | Bn_39560a | gi|30914537|sp||P24565_2 [Segment 2 of 2] Napin-1A (Napin Bnla) [Contains: Napin-1A small chain; Napin-1A large chain] |
| 55 | Bn_24386 | gi|18399803|ref|NP_565518.1|unknown protein [*Arabidopsis thaliana*] |
| 56 | Bn_11720 | gi|15230476|ref|NP_187845.1|nascent polypeptide associated complex alpha chain protein, putative/alpha-NAC, putative [*Arabidopsis thaliana*] |
| 57 | Bn_20171 | gi|22328929|ref|NP_194288.2|stress-responsive protein-related [*Arabidopsis thaliana*] |
| 58 | Bn_1307 | gi|15239594|ref|NP_197391.1|oxidoreductase, 2OG-Fe(II) oxygenase family protein [*Arabidopsis thaliana*] |
| 59 | Bn_45435 | gi|802164|gb|AAB33005.1|crambin precursor = thionin variant Thi2Ca3 [*Crambe abyssinica*, seeds, Peptide Partial, 133 aa] |
| 60 | Bn_12882 | gi|21594024|gb|AAM65942.1|unknown [*Arabidopsis thaliana*] |
| 61 | Bn_27148913 | gi|110738350|dbj|BAF01102.1|putative proline-rich protein [*Arabidopsis thaliana*] |
| 62 | Bn_28490 | gi|15227965|ref|NP_181784.1|late embryogenesis abundant domain-containing protein/LEA domain-containing protein [*Arabidopsis thaliana*] |
| 63 | Bn_28348914 | gi|15231736|ref|NP_190872.1|late embryogenesis abundant protein, putative/LEA protein, putative [*Arabidopsis thaliana*] |
| 64 | Bn_30488 | gi|841208|gb|AAB68964.1|trypsin inhibitor propeptide [*Brassica oleracea*] |
| 65 | b66_99ra_1bs | gi|21593095|gb|AAM65044.1|60S acidic ribosomal protein P2 [*Arabidopsis thaliana*] |
| 66 | Bn_36750 | gi|85539361|emb|CAJ44305.1|rapeseed putative trypsin inhibitor 1 [*Brassica napus*] |
| 67 | Bn_12443 | gi|21618084|gb|AAM67134.1|glutaredoxin-like protein [*Arabidopsis thaliana*] |
| 68 | Bn_23435 | gi|134105056|pdb|2O66|A Chain A, Crystal Structure Of Arabidopsis Thaliana Pii Bound To Citrate |
| 69 | Bn_23403 | gi[16388|emb|CAA47902.1|lti65 [*Arabidopsis thaliana*] |
| 70 | Bn_26312 | gi|77744889|gb|ABB02398.1|temperature-induced lipocalin [*Brassica napus*] |
| 71 | Bn_30847 | gi|15222928|ref|NP_177728.1|unknown protein [*Arabidopsis thaliana*] |
| 72 | Bn_3441 | gi|8809633|dbj|BAA97184.1|unnamed protein product [*Arabidopsis thaliana*] |
| 73 | gi|17805 | gi|17805|emb|CAA40980.1|cruciferin cru4 subunit [*Brassica napus*] |
| 74 | i44_99ra_1bs | gi|15229872|ref|NP_189996.1|MD-2-related lipid recognition domain-containing protein/ML domain-containing protein [*Arabidopsis thaliana*] |
| 75 | gi|24421235 | gi|24421235|gb|AAN60796.1|superoxide dismutase [*Brassica juncea*] |
| 76 | Bn_8312 | gi|15004984|dbj|BAB62170.1|glutamate dehydrogenase [*Brassica napus*] |
| 77 | Bn_29948910 | gi|21554270|gb|AAM63345.1|adenylate kinase [*Arabidopsis thaliana*] |
| 78 | Bn_15915 | gi|15231736|ref|NP_190872.1|late embryogenesis abundant protein, putative/LEA protein, putative [*Arabidopsis thaliana*] |
| 79 | Bn_15723 | gi|30793991|gb|AAP40445.1|unknown protein [*Arabidopsis thaliana*] |
| 80 | b69_99na_1bs | gi|1345840|sp|P33523|CRU1_BRANA Cruciferin BnC1 precursor (11S globulin) (12S storage protein) [Contains: Cruciferin BnC1 subunit alpha; Cruciferin BnC1 subunit beta] |
| 81 | r14_99ra_1as | gi|77744889|gb|ABB02398.1|temperature-induced lipocalin [*Brassica napus*] |
| 82 | b05_99na_1bs | gi|840725|emb|CAA55685.1|myrosinase [*Brassica napus*] |
| 83 | Bn_41672 | gi|18404883|ref|NP_030435.1|protease inhibitor, putative [*Arabidopsis thaliana*] |
| 84 | Bn_15468 | gi|15242674|ref|NP_198853.1|glutaredoxin, putative [*Arabidopsis thaliana*] |
| 85 | Bn_19161 | gi|18423748|ref|NP_568824.1|protease inhibitor/seed storage/lipid transfer protein (LTP) family protein [*Arabidopsis thaliana*] |
| 86 | Bn_27350 | gi|79330664|ref|NP_001032061.1|RD29B (RESPONSIVE TO DESSICATION 29B) [*Arabidopsis thaliana*] |
| 87 | o85_99ra_1bs | gi|21593447|gb|AAM65414.1|40S ribosomal protein S17-like [*Arabidopsis thaliana*] |
| 88 | Bn_44948915 | gi|112742|sp|P17333|2SS4_BRANA Napin precursor (1.7S seed storage protein) [Contains: Napin small chain; Napin large chain] |

Remarks and Results.
1. Napins are the major component in the soluble extracts. There are other seed specific proteins in the soluble fractions as demonstrated by LC-MS/MS based protein identification.
2. There are two major classes of napins in these samples
3. The insoluble fractions contain mostly cruciferins as evidenced by MALDI-MS and N-terminal sequencing analyses. Due to the lack of protocol for insoluble protein digestion these samples were not analyzed by LC-MS/MS SDS PAGE Protein Profile FIG. 12—SDS PAGE of the Soluble Extracts nc: Nexera canola; cc: conventional canola; bj: *Brassica Juncea*; br: *Brassica rapa*. Triangles denote that the bands were processed for N-terminal sequencing and MALDI-TOF analysis FIG. 13—SDS PAGE of the Insoluble Extracts nc: Nexera canola; cc: conventional canola; bj: *Brassica Juncea*; br: *Brassica rapa*. All marked bands were analyzed by MALDI-TOF; Bands marked with dots were also sequenced at their N-termini.

Example 17—Amino Acid Residue Analysis of NOP Samples

One objective of this study was to use HPLC-FLD amino acid analysis to determine the amino acid residue composition of Nexera canola, conventional canola, *Brassica juncea*, and *Brassica rapa* novel oil processed samples (NOP). Amino acid residues that will be quantitated with this analysis are asparagine, glutamine, serine, histidine, glycine, threonine, tyrosine, valine, methionine, phenylalanine, isoleucine, leucine, lysine, and proline. Some results are reported in FIG. 14.

Sample Description

There were a total of 8 dry/powdery samples in various glass vials with a bar code label on each. Each sample is described as follows:

| Barcode | Description | Seed |
|---|---|---|
| 2006-1082-78 | SPI | Nexera Canola Samples |
| 2006-1082-86 | Defatted PPC | |
| 2006-1127-10 | SPI | Conventional Canola Samples |
| 2006-1127-21 | Defatted PPC | |
| 2006-1182-73 | CPI | *Brassica juncea* |
| 2006-1182-74 | Defatted PPC | |
| 2006-1194-11 | SPI | *Brassica rapa* |
| 2006-1194-13 | Defatted PPC | |

Reagents
   12N HCl (Sigma #96208)
   Water (Sigma #14211)
   Phenol (Sigma #P5566)
   10N NaOH (Sigma #13171)
   0.4N Borate Buffer (Agilent #5061-3339 pH 10.2)
   FMOC (Agilent #5061-3337)
   OPA (Agilent #5061-3335)
   $HK_2PO_4$ (Sigma #229903)
   MeOH (Sigma #65 548)
   Acetonitrile (Sigma #00687)
   $H_3PO_4$ (Sigma #345245 85% in water)
   Acetic Acid (Sigma #338826)
   Amino Acid Standard (Agilent 5061-3330 1 nmol/μL)
   Supplemental Amino Acids (Agilent 5062-2478 NVA, SAR, ASN, GLN, TRP, HYP, 1 g each)
   Methionine Sulfone (Sigma #MO876)

Materials
   Micro centrifuge tubes (Fisher #02-681-375—high temp.)
   Mini-Uniprep vials (Whatman #UN203NPUGMF—glass fiber)
   4 mm diameter glass beads (Fisher #21-312B)
Instrumentation
   Agilent 1100 HPLC System: Degasser (G1316A), Binary Pump (G1312A), Auto Sampler (G1313A), Column Heater (G316A), Florescence Detector (G1321 A)
   Analytical Balance (Metler AT20)
Preparation of Hydrolysis Solution
   Dissolve 250 mg phenol into 5 ml water
   Add 5 ml 12N HCl to the phenol solution
   Mix with a glass rod
   Let solution equilibrate to room temperature before use
Preparation of Standard Solutions
   Dissolve 5.9 mg norvaline (NVA) into 5 ml 0.1N HCl (10 nmol/μL of NVA internal standard)
   Dissolve 4.5 mg methionine sulfone into 10 ml 0.1N HCl (1 nmol/μL)
   Aliquot 1 ml of amino acid standard solution into a glass injection vial
   Aliquot 1 ml of methionine sulfone standard solution into a glass injection vial
   Add 100 μL internal standard solution to each and cap for analysis (909.1 pmol/μL final standard concentration)
Sample Hydrolysis
   Place 5 glass beads into a micro centrifuge tube
   Weigh ~1 mg sample into the micro centrifuge
   Add 1 ml hydrolysis solution
   Purge with argon or nitrogen and cap tightly
   Homogenize on a vertical shaker for 1 minute
   Place samples into a heating block at 100° C. for 24 hours
   Cool to room temperature, add 100 μL IS and mix
   Aliquot 500 μL into a Mini-Uniprep vial, press filter and analyze by HPLC-FLD
Preparation of HPLC Eluent
Phase A: 20 mM $HK_2PO_4$ (2.3 g per liter) titrated with $H_3PO_4$ to pH 7.8
Phase B: acetonitrile:methanol:water 45:45:10 v/v/v
HPLC-FLD Method
Column: Phenomenex Luna C18(2) 100×3.0 mm 2.5 μm
Column temperature: 50° C.
Gradient:

| Time (min) | % B | Flow | Max. Press. (bar) |
|---|---|---|---|
| 0 | 2 | 0.5 | 250 |
| 17 | 28.4 | 0.5 | 250 |
| 28 | 39.8 | 0.5 | 250 |
| 30 | 100 | 0.5 | 250 |
| 34 | 100 | 0.5 | 250 |
| 35 | 2 | 0.5 | 250 |
| 38 | 2 | 0.5 | 250 |

Detector: 340 nm excitation, 450 nm emission, PMT gain 10, 0-31 minutes
   266 gm excitation, 305 nm emission, PMT gain 9, 31-45 minutes
Auto Sampler Routine:

| Line | Command |
|---|---|
| 1 | // Neturalize |
| 2 | DRAW 1.5 μl from vial 91 |
| 3 | DRAW 0.5 μl from sample, 5.0 mm offset |

-continued

| Line | Command |
|---|---|
| 4 | DRAW 2.0 µl from air, 50 µl/min speed |
| 5 | MIX 2.0 µl in air, max. speed, 5 times |
| 6 | EJECT 2.0 µl into vial 96, 50 µl/min speed |
| 7 | // Buffer |
| 8 | DRAW 5.0 µl from vial 92 |
| 9 | DRAW 2.0 µl from air, 50 µl/min speed |
| 10 | MIX 7.0 µl in air, max. speed, 5 times |
| 11 | EJECT 2.0 µl into vial 97, 50 µl/min speed |
| 12 | // OPA |
| 13 | DRAW 1.0 µl from vial 93 |
| 14 | DRAW 2.0 µl from air, 50 µl/min speed |
| 15 | MIX 8.0 µl in air, max. speed, 5 times |
| 16 | EJECT 2.0 µl into vial 98, 50 µl/min speed |
| 17 | // FMOC |
| 18 | DRAW 1.0 µl from vial 94 |
| 19 | DRAW 2.0 µl from air, 50 µl/min speed |
| 20 | MIX 9.0 µl in air, max. speed, 5 times |
| 21 | EJECT 2.0 µl into vial 99, 50 µl/min speed |
| 22 | // Acidity |
| 23 | DRAW 1.0 µl from vial 95 |
| 24 | DRAW 2.0 µl from air, 50 µl/min speed |
| 25 | MIX 10.0 µl in air, max. speed, 5 times |
| 26 | EJECT 2.0 µl into vial 100, 50 µl/min speed |
| 27 | INJECT |

Reagent Tray Positions:

| Vial | Description |
|---|---|
| 91 | 2N NaOH |
| 92 | 0.4N Borate Buffer |
| 93 | OPA |
| 94 | FMOC |
| 95 | Acetic Acid |
| 96 | Water |
| 97 | Water |
| 98 | Water |
| 99 | Water |
| 100 | Water |

Data Analysis

Chromatography integration was performed using Chemstation software (version Rev. B.01.03). The generated peak areas for were exported to a custom Microsoft Excel workbook for data analysis.

Single point internal standard methodology is used for the quantitation of all amino acid residues and is expressed as pmol/µL. The following equations are used:

$$IRF_{SC} = (Area_{IS} \times Amount_{SC}) / (Amount_{IS} \times Area_{SC})$$

$$pmol/\mu L = (Amount_{IS} \times Area_{SC} \times IRF_{SC}) / Area_{IS}$$

IS=Internal Standard (909.1 pmol/µL)
SC=Specific Compound of Interest
IRF=Internal Response Factor After initial quantitation, a mass is calculated based on the amino acid residue formula weight of each targeted amino acid. The following equation is used:

$$D = (((A \times B) \times 10^{-12}) \times C) \times 10^3)$$

A=pmol/µL
B=hydrolysis solution used in µL
C=residue mass
D=mg of amino acid residue Once residue mass is calculated, the residue composition is determined for each targeted amino acid reside using the following equation:

$$C = (A/B) \times 100$$

A=mg of amino acid residue
B=mg of total amino acid residue quantitated
C=percent composition of total amino acid residue mass analyzed Asparagine and glutamine are both deaminated into aspartic acid and glutamic acid respectively during hydrolysis. It is not possible for this analysis to distinguish how much asparagine or glutamine contributed to the total quantitated amounts of aspartic or glutamic acid.

Methionine is partially oxidized into both methionine sulfone and methionine sulfoxide. Methionine sulfone is quantitated in pmol/µL and added to the total methionine quantitated prior to mass calculation. Methionine sulfoxide can not be quantitated as it co-elutes with OPA derivative byproducts. Recovery test of methionine show >85% is recovered without taking into account the methionine sulfoxide product.

| Calibration Table | | | | | | | | | |
|---|---|---|---|---|---|---|---|---|---|
| Calibration (pmol/uL) | | | | | | | | | |
| | ASP | GLU | SER | HIS | GLY | THR | ARG | ALA | TYR |
| r-mass | 115 | 129 | 87 | 137 | 57 | 101 | 71 | 156 | 163 |
| std 1 | 3822 | 3228 | 4338 | 1719 | 3784 | 4331 | 5519 | 4367 | 4703 |
| std 2 | 3845 | 3850 | 4365 | 1699 | 3820 | 4339 | 5550 | 4394 | 4722 |
| std 3 | 3604 | 3596 | 4062 | 1620 | 3538 | 4075 | 5180 | 4096 | 4422 |
| norm 1 | 1.6 | 1.6 | 1.8 | 0.7 | 1.5 | 1.8 | 2.3 | 1.8 | 1.9 |
| norm 2 | 1.6 | 1.6 | 1.8 | 0.7 | 1.5 | 1.8 | 2.3 | 1.8 | 1.9 |
| norm 3 | 1.6 | 1.6 | 1.8 | 0.7 | 1.5 | 1.8 | 2.3 | 1.8 | 1.9 |
| average | 1.6 | 1.6 | 1.8 | 0.7 | 1.5 | 1.8 | 2.3 | 1.8 | 1.9 |
| std. dev | 0.0066 | 0.0034 | 0.0015 | 0.0093 | 0.0031 | 0.0089 | 0.0042 | 0.0022 | 0.0066 |
| %RSD | 0.4 | 0.2 | 0.1 | 1.3 | 0.2 | 0.5 | 0.2 | 0.1 | 0.3 |
| Rf | 0.0017 | 0.0017 | 0.0019 | 0.0008 | 0.0017 | 0.0019 | 0.0025 | 0.0020 | 0.0021 |
| pmol/UL | 909.1 | digest (ml) | 1.1 | | | | | | |

| Calibration (pmol/uL) | | | | | | | | | |
|---|---|---|---|---|---|---|---|---|---|
| | VAL | MET | MET Sulfone | NVA (IS) | PHE | ILE | LEU | LYS | PRO |
| r-mass | 99 | 131 | | | 147 | 113 | 113 | 128 | 97 |
| std 1 | 5335 | 5262 | 5160 | 2448 | 5210 | 5519 | 5470 | 420 | 4951 |

-continued

| | | | | | | | | | |
|---|---|---|---|---|---|---|---|---|---|
| std 2 | 5365 | 5292 | 5189 | 2468 | 5240 | 5543 | 5583 | 415 | 5297 |
| std 3 | 5040 | 4937 | 4836 | 2295 | 4892 | 5196 | 5158 | 390 | 4720 |
| norm 1 | 2.2 | 2.1 | 2.1 | | 2.1 | 2.3 | 2.2 | 0.2 | 2.0 |
| norm 2 | 2.2 | 2.1 | 2.1 | | 2.1 | 2.2 | 2.3 | 0.2 | 2.1 |
| norm 3 | 2.2 | 2.2 | 2.1 | | 2.1 | 2.3 | 2.2 | 0.2 | 2.1 |
| average | 2.2 | 2.1 | 2.1 | | 2.1 | 2.3 | 2.2 | 0.2 | 2.1 |
| std. dev | 0.0119 | 0.0036 | 0.0027 | | 0.0043 | 0.0090 | 0.0142 | 0.0018 | 0.0643 |
| %RSD | 0.5 | 0.2 | 0.1 | | 0.2 | 0.4 | 0.6 | 1.1 | 3.1 |
| Rf | 0.0024 | 0.0024 | 0.0023 | | 0.0023 | 0.0025 | 0.0025 | 0.0002 | 0.0023 |

Response Values

Integrated Pa

| | ASP | GLU | SER | HIS | GLY | THR | ARG | ALA | TYR |
|---|---|---|---|---|---|---|---|---|---|
| SPI - Nexero | 570 | 4636 | 928 | 240 | 1041 | 758 | 1194 | 1302 | 286 |
| Defatted PPC - Nexero | 1916 | 2979 | 1290 | 178 | 1515 | 1202 | 1655 | 1730 | 754 |
| SPI - Conventional | 709 | 6017 | 1224 | 303 | 1347 | 1010 | 1572 | 1697 | 376 |
| Defatted PPC - Conventional | 1319 | 1969 | 937 | 132 | 1076 | 868 | 1145 | 1233 | 541 |
| CPI - Brassica Juncea | 595 | 5885 | 1213 | 311 | 1313 | 915 | 2063 | 1600 | 314 |
| Defatted PPC - Brassica Juncea | 1911 | 3173 | 1379 | 203 | 1599 | 1308 | 1845 | 1883 | 833 |
| SPI - Brassica Rapa | 788 | 5296 | 1220 | 294 | 1339 | 1046 | 1395 | 1698 | 406 |
| Defatted PPC - Brassica Rapa | 1557 | 2342 | 1015 | 138 | 1205 | 937 | 1287 | 1354 | 578 |

Integrated Pa

| | VAL | MET | MET Sulfone | NVA | PHE | ILE | LEU | LYS | PRO |
|---|---|---|---|---|---|---|---|---|---|
| SPI - Nexero | 1349 | 279 | 127 | 2545 | 636 | 966 | 1652 | 76 | 1351 |
| Defatted PPC - Nexero | 2065 | 258 | 145 | 2556 | 1107 | 1592 | 2467 | 80 | 1316 |
| SPI - Conventional | 1762 | 429 | 178 | 2458 | 805 | 1267 | 2193 | 111 | 2491 |
| Defatted PPC - Conventional | 1421 | 94 | 143 | 2450 | 758 | 1087 | 1715 | 51 | 791 |
| CPI - Brassica Juncea | 1445 | 351 | 144 | 2674 | 862 | 1269 | 2160 | 46 | 2364 |
| Defatted PPC - Brassica Juncea | 2155 | 250 | 162 | 2640 | 1182 | 1669 | 2613 | 47 | 1407 |
| SPI - Brassica Rapa | 1668 | 437 | 154 | 2458 | 766 | 1141 | 2002 | 107 | 2338 |
| Defatted PPC - Brassica Rapa | 1615 | 151 | 144 | 2565 | 853 | 1241 | 1932 | 54 | 956 |

2006-1082-78 SPI Nexera Canola

| | ASP | GLU | SER | HIS | GLY | THR | ARG | ALA | TYR |
|---|---|---|---|---|---|---|---|---|---|
| Composition (%) | 3.7 | 33.3 | 4.0 | 4.1 | 3.3 | 3.8 | 3.3 | 9.9 | 2.1 |
| Residue (mg) | 0.016 | 0.150 | 0.018 | 0.018 | 0.015 | 0.017 | 0.015 | 0.045 | 0.010 |
| Residue (pmol/uL) | 130 | 1059 | 187 | 122 | 241 | 153 | 189 | 261 | 53 |

| | VAL | MET | MET Sulfone | NVA (IS) | PHE | ILE | LEU | LYS | PRO |
|---|---|---|---|---|---|---|---|---|---|
| Composition (%) | 5.3 | 1.5 | | | 3.8 | 4.2 | 7.2 | 5.0 | 5.5 |
| Residue (mg) | 0.024 | 0.007 | | | 0.017 | 0.019 | 0.033 | 0.022 | 0.025 |
| Residue (pmol/uL) | 221 | 46 | 22 | | 107 | 153 | 262 | 159 | 232 |

2006-1082-86 PPC Nexera Canola

| | ASP | GLU | SER | HIS | GLY | THR | ARG | ALA | TYR |
|---|---|---|---|---|---|---|---|---|---|
| Composition (%) | 10.1 | 17.7 | 4.6 | 2.5 | 4.0 | 4.9 | 3.8 | 10.9 | 4.6 |
| Residue (mg) | 0.055 | 0.96 | 0.025 | 0.014 | 0.022 | 0.027 | 0.020 | 0.059 | 0.025 |
| Residue (pmol/uL) | 436 | 678 | 259 | 91 | 349 | 242 | 261 | 345 | 140 |

| | VAL | MET | MET Sulfone | NVA (IS) | PHE | ILE | LEU | LYS | PRO |
|---|---|---|---|---|---|---|---|---|---|
| Composition (%) | 6.7 | 1.1 | | | 5.5 | 5.7 | 8.9 | 4.4 | 4.4 |
| Residue (mg) | 0.037 | 0.006 | | | 0.030 | 0.031 | 0.048 | 0.024 | 0.024 |
| Residue (pmol/uL) | 336 | 43 | 25 | | 185 | 251 | 390 | 168 | 225 |

-continued

2006-1127-10 SPI Conventional Canola

|  | ASP | GLU | SER | HIS | GLY | THR | ARG | ALA | TYR |
|---|---|---|---|---|---|---|---|---|---|
| Composition (%) | 3.4 | 32.2 | 3.9 | 3.9 | 3.2 | 3.7 | 3.2 | 9.6 | 2.1 |
| Residue (mg) | 0.021 | 0.202 | 0.024 | 0.024 | 0.020 | 0.023 | 0.020 | 0.060 | 0.013 |
| Residue (pmol/uL) | 168 | 1423 | 256 | 160 | 322 | 211 | 258 | 352 | 72 |

|  | VAL | MET | MET Sulfone | NVA (IS) | PHE | ILE | LEU | LYS | PRO |
|---|---|---|---|---|---|---|---|---|---|
| Composition (%) | 5.2 | 1.7 |  |  | 3.6 | 4.1 | 7.2 | 5.4 | 7.6 |
| Residue (mg) | 0.032 | 0.011 |  |  | 0.023 | 0.026 | 0.045 | 0.034 | 0.047 |
| Residue (pmol/uL) | 298 | 74 | 31 |  | 140 | 208 | 361 | 242 | 444 |

2006-1127-21 PPC Conventional Canola

|  | ASP | GLU | SER | HIS | GLY | THR | ARG | ALA | TYR |
|---|---|---|---|---|---|---|---|---|---|
| Composition (%) | 10.2 | 17.1 | 4.9 | 2.7 | 4.2 | 5.2 | 3.8 | 11.4 | 4.8 |
| Residue (mg) | 0.040 | 0.066 | 0.019 | 0.011 | 0.016 | 0.020 | 0.015 | 0.044 | 0.019 |
| Residue (pmol/uL) | 313 | 467 | 196 | 70 | 258 | 182 | 188 | 257 | 104 |

|  | VAL | MET | MET Sulfone | NVA (IS) | PHE | ILE | LEU | LYS | PRO |
|---|---|---|---|---|---|---|---|---|---|
| Composition (%) | 6.8 | 0.6 |  |  | 5.5 | 5.7 | 9.1 | 4.1 | 3.9 |
| Residue (mg) | 0.026 | 0.002 |  |  | 0.021 | 0.022 | 0.035 | 0.016 | 0.015 |
| Residue (pmol/uL) | 242 | 16 | 25 |  | 132 | 179 | 283 | 112 | 141 |

2006-1182-73 CPI Brassica Juncea

|  | ASP | GLU | SER | HIS | GLY | THR | ARG | ALA | TYR |
|---|---|---|---|---|---|---|---|---|---|
| Composition (%) | 3.0 | 33.6 | 4.1 | 4.2 | 3.4 | 3.6 | 4.5 | 9.7 | 1.8 |
| Residue (mg) | 0.016 | 0.182 | 0.022 | 0.023 | 0.018 | 0.020 | 0.024 | 0.052 | 0.010 |
| Residue (pmol/uL) | 129 | 1280 | 223 | 151 | 289 | 176 | 311 | 305 | 56 |

|  | VAL | MET | MET Sulfone | NVA (IS) | PHE | ILE | LEU | LYS | PRO |
|---|---|---|---|---|---|---|---|---|---|
| Composition (%) | 4.5 | 1.5 |  |  | 4.1 | 4.4 | 7.5 | 2.4 | 7.6 |
| Residue (mg) | 0.025 | 0.008 |  |  | 0.022 | 0.024 | 0.041 | 0.013 | 0.041 |
| Residue (pmol/uL) | 225 | 56 | 23 |  | 138 | 191 | 327 | 91 | 387 |

2006-1182-74 PPC Brassica Juncea

|  | ASP | GLU | SER | HIS | GLY | THR | ARG | ALA | TYR |
|---|---|---|---|---|---|---|---|---|---|
| Composition (%) | 9.7 | 18.1 | 4.7 | 2.7 | 4.1 | 5.2 | 4.0 | 11.4 | 4.9 |
| Residue (mg) | 0.053 | 0.099 | 0.026 | 0.015 | 0.022 | 0.028 | 0.022 | 0.062 | 0.027 |
| Residue (pmol/uL) | 421 | 699 | 268 | 100 | 357 | 255 | 282 | 364 | 149 |

|  | VAL | MET | MET Sulfone | NVA (IS) | PHE | ILE | LEU | LYS | PRO |
|---|---|---|---|---|---|---|---|---|---|
| Composition (%) | 6.7 | 1.1 |  |  | 5.6 | 5.8 | 9.1 | 2.5 | 4.5 |
| Residue (mg) | 0.037 | 0.006 |  |  | 0.031 | 0.032 | 0.050 | 0.013 | 0.025 |
| Residue (pmol/uL) | 340 | 40 | 26 |  | 191 | 255 | 400 | 96 | 234 |

2006-1194-11 SPI Brassica Rapa

|  | ASP | GLU | SER | HIS | GLY | THR | ARG | ALA | TYR |
|---|---|---|---|---|---|---|---|---|---|
| Composition (%) | 4.0 | 30.1 | 4.1 | 4.0 | 3.4 | 4.1 | 3.0 | 10.2 | 2.4 |
| Residue (mg) | 0.024 | 0.178 | 0.024 | 0.023 | 0.020 | 0.024 | 0.018 | 0.060 | 0.014 |
| Residue (pmol/uL) | 187 | 1253 | 255 | 156 | 321 | 219 | 229 | 352 | 78 |

|  | VAL | MET | MET Sulfone | NVA (IS) | PHE | ILE | LEU | LYS | PRO |
|---|---|---|---|---|---|---|---|---|---|
| Composition (%) | 5.2 | 1.8 |  |  | 3.6 | 3.9 | 6.9 | 5.6 | 7.5 |
| Residue (mg) | 0.031 | 0.011 |  |  | 0.022 | 0.023 | 0.041 | 0.033 | 0.044 |
| Residue (pmol/uL) | 283 | 75 | 27 |  | 133 | 187 | 329 | 233 | 417 |

| 2006-1194-13 PPC Brassica Rapa | | | | | | | | |
|---|---|---|---|---|---|---|---|---|
| | ASP | GLU | SER | HIS | GLY | THR | ARG | ALA | TYR |
| Composition (%) | 10.6 | 17.9 | 4.6 | 2.5 | 4.1 | 5.0 | 3.8 | 11.0 | 4.6 |
| Residue (mg) | 0.045 | 0.075 | 0.019 | 0.011 | 0.017 | 0.021 | 0.016 | 0.046 | 0.019 |
| Residue (pmol/uL) | 353 | 531 | 203 | 70 | 276 | 188 | 202 | 269 | 107 |

| | VAL | MET | MET Sulfone | NVA (IS) | PHE | ILE | LEU | LYS | PRO |
|---|---|---|---|---|---|---|---|---|---|
| Composition (%) | 6.8 | 0.9 | | | 5.5 | 5.8 | 9.0 | 3.7 | 4.2 |
| Residue (mg) | 0.029 | 0.004 | | | 0.023 | 0.024 | 0.038 | 0.016 | 0.017 |
| Residue (pmol/uL) | 262 | 25 | 24 | | 142 | 195 | 305 | 112 | 163 |

Average analysis variability: 0.6% RSD

The invention claimed is:

1. A method of producing a food composition, said method comprising:
    removing at least a portion of oil from canola oil seeds by mechanically pressing said canola oil seeds to produce a presscake composition, wherein the oil seeds comprise at least 70% oleic acid by weight and no more than 3% α-linolenic acid by weight;
    wet milling said presscake composition to produce milled particles, wherein at least 10% of said milled particles are less than 20 microns in size;
    extracting protein at pH 10 or greater from said milled particles;
    precipitating the extracted protein to produce a precipitated protein concentrate (PPC) by adjusting the pH to pH 5 or lower, said precipitated protein concentrate (PPC) comprises from about 10% to about 11% oil by weight (dry basis), a crude fiber content of less than 1% by weight, and about 9% by weight leucine; and
    incorporating said precipitated protein concentrate (PPC) into said food composition.

2. The method of claim 1, wherein the food composition comprises from 10% to 20% oil by weight (dry basis).

3. An animal feed composition comprising a precipitated protein concentrate (PPC) from canola oil seeds comprising: an oil content of from about 10% to about 11% oil by weight (dry basis), a crude fiber content of less than 1% by weight, and about 9% by weight leucine.

4. The animal feed composition of claim 3, wherein the precipitated protein concentrate (PPC) comprises a crude fiber content of less than 0.2% by weight.

5. The animal feed composition of claim 3, wherein said animal is a fish.

6. The method of claim 1, further comprising exposing the extracted protein to $CaCl_2$.

7. The method of claim 1, wherein the precipitated protein concentrate (PPC) comprises a crude fiber content of less than 0.2% by weight.

8. The method of claim 1, wherein said milling step is performed using at least one apparatus or device selected from the group consisting of: an orbital mill, a high-shear mixer, a homogenizer, a colloid mill, a cone mill, and a rotor/stator mixer.

9. The method of claim 1, the precipitated protein concentrate (PPC) further comprises about 6% valine, about 5% isoleucine, about 5% threonine, about 4% phenylalanine, and about 4% by weight lysine.

10. The animal feed composition of claim 3, wherein the animal feed composition comprises an undetectable amount of phytate.

11. The animal feed composition of claim 3, the precipitated protein concentrate (PPC) further comprises about 6% valine, about 5% isoleucine, about 5% threonine, about 4% phenylalanine, and about 4% by weight lysine.

* * * * *